US011784772B2

(12) United States Patent
Liu et al.

(10) Patent No.: US 11,784,772 B2
(45) Date of Patent: Oct. 10, 2023

(54) METHOD AND APPARATUS FOR TRANSMITTING PHYSICAL LAYER PROTOCOL DATA UNIT

(71) Applicant: HUAWEI TECHNOLOGIES CO., LTD., Shenzhen (CN)

(72) Inventors: Chenchen Liu, Shenzhen (CN); Dandan Liang, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/066,933

(22) Filed: Dec. 15, 2022

(65) Prior Publication Data

US 2023/0119491 A1 Apr. 20, 2023

Related U.S. Application Data

(63) Continuation of application No. PCT/CN2021/110080, filed on Aug. 2, 2021.

(30) Foreign Application Priority Data

Aug. 3, 2020 (CN) ......................... 202010769451.7
Aug. 21, 2020 (CN) ......................... 202010851834.9
Sep. 7, 2020 (CN) ......................... 202010930892.0

(51) Int. Cl.

*H04W 84/12* (2009.01)
*H04L 5/00* (2006.01)
*H04L 27/26* (2006.01)

(52) U.S. Cl.

CPC .......... *H04L 5/0048* (2013.01); *H04L 27/262* (2013.01); *H04W 84/12* (2013.01)

(58) Field of Classification Search

CPC ..... H04L 5/0048; H04L 27/262; H04W 84/12

(Continued)

(56) References Cited

U.S. PATENT DOCUMENTS

2015/0023272 A1 1/2015 Choi et al.
2017/0373911 A1* 12/2017 Lee .................... H04L 27/3872

(Continued)

FOREIGN PATENT DOCUMENTS

CN 110138421 A 8/2019
CN 110324268 A 10/2019
CN 112821998 A 5/2021

OTHER PUBLICATIONS

R2-154369, HTC, UE radio access capability for WLAN. 3GPP TSG-RAN2#91bis meeting, Malmo, Sweden, Oct. 5-9, 2015, 7 pages.

(Continued)

*Primary Examiner* — Christopher R Crompton
(74) *Attorney, Agent, or Firm* — HUAWEI TECHNOLOGIES CO., LTD.

(57) ABSTRACT

This application relates to the field of wireless communication technologies, and in particular, to a method and an apparatus for transmitting a physical layer protocol data unit, and for example, is applied to a wireless local area network. The method includes: A first communications device generates a PPDU and may send the PPDU, where the PPDU includes an LTF sequence; and correspondingly, a second communications device receives the PPDU, and parses the PPDU to obtain the LTF sequence included in the PPDU. Embodiments of this application can be used to design an LTF sequence that has a relatively low PAPR on entire bandwidth, on a single resource unit, on a combined resource unit, and in a considered multi-stream scenario.

12 Claims, 9 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2018/0091349 | A1 | 3/2018 | Lin et al. | |
| 2022/0311566 | A1 * | 9/2022 | Liang | H04L 27/262 |
| 2023/0113305 | A1 * | 4/2023 | Chun | H04L 5/00<br>370/329 |

OTHER PUBLICATIONS

Doc.: IEEE 802.11-20/0825r0, Jinyoung Chun et al, EHT-L TF sequences considering the new tone plan, Mar. 2020, 17 pages, XP068168131.

IEEE P802.11ax/D6.0, Nov. 2019 (amendment to IEEE P802.11REVmd/D3.0), IEEE P802.11ax /D6.0, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, 780 pages.

Doc.: IEEE 802.11-20/0825r1, Jinyoung Chun et al, EHT-LTF sequences considering the new tone plan, Jun. 2020, 14 pages, XP068169447.

Doc.: IEEE 802.11-20/1066r0, Jinyoung Chun et al, 4x EHT-LTF sequence, Jul. 2020, 14 pages, XP068172893.

* cited by examiner 1 6 20 26

Type A RU26

1 7 21 26

Type B RU26

METHOD AND APPARATUS FOR TRANSMITTING PHYSICAL LAYER PROTOCOL DATA UNIT

CROSS-REFERENCE TO RELATED APPLICATIONS

This application is a continuation of International Application No. PCT/CN2021/110080, filed on Aug. 2, 2021, which claims priority to Chinese Patent Application No. 202010769451.7, filed on Aug. 3, 2020 and Chinese Patent Application No. 202010851834.9, filed on Aug. 21, 2020 and Chinese Patent Application No. 202010930892.0, filed on Sep. 7, 2020. All of the aforementioned patent applications are hereby incorporated by reference in their entireties.

TECHNICAL FIELD

Embodiments of this application relate to the field of wireless communication technologies, and in particular, to a method and an apparatus for transmitting a physical layer protocol data unit.

BACKGROUND

Because performance of a wireless communications system is greatly affected by a radio channel, such as shadow fading and frequency selective fading, a propagation path between a transmitter and a receiver is very complicated. Therefore, channel estimation needs to be performed in coherent detection of an orthogonal frequency division multiplexing (OFDM) system. Channel estimation is a process of estimating, under a specific criterion, a parameter of a channel through which a radio signal passes. Accuracy of channel estimation directly affects the performance of the whole system.

Therefore, in wireless local area network (WLAN) standards that use an OFDM technology as a core, such as Institute of Electrical and Electronics Engineers (IEEE) 802.11g/a, 802.11n, and 802.11ac, a common point is that a long training field (LTF) sequence that may be used for channel estimation is specified in a physical layer. To improve a system throughput, an orthogonal frequency division multiple access (OFDMA) technology is used in an 802.11ax standard, and an LTF sequence used for channel estimation is also specified in the 802.11ax standard. However, with the development of the mobile Internet and popularization of intelligent terminals, data traffic rapidly increases, and users have increasingly higher requirements for communication service quality. The 802.11ax standard can hardly meet user requirements in aspects such as a high throughput, low jitter, and a low latency. Therefore, there is an urgent need to develop a next-generation WLAN technology, for example, an IEEE 802.11be standard, an extremely high throughput (extremely high throughput, EHT) standard, or a Wi-Fi 7 standard.

For different channel bandwidth (for example, 80 MHz, 160 MHz, 240 MHz, or 320 MHz), how to design an LTF sequence included in a physical layer protocol data unit ((Physical Layer) PHY protocol data unit, PPDU) is an urgent problem to be resolved, so that the LTF sequence has a relatively low peak to average power ratio (PAPR) on entire bandwidth, on a single resource unit, on a combined resource unit, and in a considered multi-stream scenario.

SUMMARY

Embodiments of this application provide a method and an apparatus for transmitting a physical layer protocol data unit, to provide an LTF sequence that has a relatively low PAPR on entire bandwidth, on a single resource unit, on a combined resource unit, and in a considered multi-stream scenario.

According to a first aspect, a method for transmitting a physical layer protocol data unit is provided, including: generating a physical layer protocol data unit PPDU, where the PPDU includes a long training field LTF sequence; and sending the PPDU.

According to a second aspect, a method for transmitting a physical layer protocol data unit is provided, including: receiving a PPDU; and parsing the received PPDU to obtain a long training field LTF sequence included in the PPDU.

With reference to the first aspect and the second aspect, in some implementations, an 80 MHz 2x LTF sequence is:

2xEHT_LTF_80M$_{-500:500}$={2xEHT_LTF_partA, $0_5$, 2xEHT_LTF_partB}, where 2xEHT_LTF_partA is 2xEHT_LTF_partA in DESCRIPTION OF EMBODIMENTS in the specification, 2xEHT_LTF_partB is 2xEHT_LTF_partB in DESCRIPTION OF EMBODIMENTS in the specification, and $0_5$ represents 5 consecutive 0s.

With reference to the first aspect and the second aspect, in some implementations, a 160 MHz 2x LTF sequence is:

2xEHT_LTF_160M$_{-1012:1012}$= {2xEHT_LTF_80M$_{-500:500}$, $0_{23}$, 2xEHT_LTF_80M$_{-500:500}$};

herein, $0_{23}$ represents 23 consecutive 0s.

With reference to the first aspect and the second aspect, in some implementations, a 240 MHz 2x LTF sequence is:

2xEHT_LTF_240M$_{-1524:1524}$= {−2xEHT_LTF_160M$_{-1012:1012}$, $0_{23}$, 2xEHT_LTF_80M$_{-500:500}$}; or

2xEHT_LTF_240M$_{-1524:1524}$= {−2xEHT_LTF_80M$_{-500:500}$, $0_{23}$, 2xEHT_LTF_160M$_{-1012:1012}$};

herein, −2xEHT_LTF_80M$_{-500:500}$ represents negation of all elements in the sequence 2xEHT_LTF_80M$_{-500:500}$; −2xEHT_LTF_160M$_{-1012:1012}$ represents negation of all elements in the sequence 2xEHT_LTF_160M$_{-1012:1012}$; and $0_{23}$ represents 23 consecutive 0s.

With reference to the first aspect and the second aspect, in some implementations, a 320 MHz 2x LTF sequence is:

2xEHT_LTF_320M$_{-2036:2036}$= {−2xEHT_LTF_$0_{23}$, 2xEHT_LTF_160M$_{-1012:1012}$};

herein, −2xEHT_LTF_160M$_{-1012:1012}$ represents negation of all elements in the sequence 2xEHT_LTF_160M$_{-1012:1012}$; and $0_{23}$ represents 23 consecutive 0s.

With reference to the first aspect and the second aspect, in some implementations, an 80 MHz 2x LTF sequence is a sequence obtained after one or more operations in first operations are performed on 2xEHT_LTF_80M$_{-500:500}$;

a 160 MHz 2x LTF sequence is a sequence obtained after one or more operations in the first operations are performed on 2xEHT_LTF_160M$_{-1012:1012}$;

a 240 MHz 2x LTF sequence is a sequence obtained after one or more operations in the first operations are performed on 2xEHT_LTF_240M$_{-1524:1524}$;

a 320 MHz 2x LTF sequence is a sequence obtained after one or more operations in the first operations are performed on 2xEHT_LTF_320M$_{-2036:2036}$; and the first operations include multiplying elements in a sequence by −1, reversing an order of elements in a sequence, and multiplying an even-numbered or odd-numbered element in non-zero elements in a sequence by −1.

With reference to the first aspect and the second aspect, in some implementations, an 80 MHz 4x LTF sequence is:

$4xEHT\_LTF\_80M_{-500:500}=$ $\{4xEHT\_LTF\_partA,\ 0_5,\ 4xEHT\_LTF\_partB\}$, where 4xEHT_LTF_partA is 4xEHT_LTF_partA in DESCRIPTION OF EMBODIMENTS in the specification, 4xEHT_LTF_partB is 4xEHT_LTF_partB in DESCRIPTION OF EMBODIMENTS in the specification, and $0_5$ represents 5 consecutive 0s.

With reference to the first aspect and the second aspect, in some implementations, a 160 MHz 4x LTF sequence is:

$4xEHT\_LTF\_160M_{-1012:1012}=$ $\{-4xEHT\_LTF\_80M_{-500:500},\ 0_{23},\ 4xEHT\_LTF\_80M_{-500:500}\}$;

herein, $-4xEHT\_LTF\_80M_{-500:500}$ represents negation of all elements in the sequence $4xEHT\_LTF\_80M_{-500:500}$; and $0_{23}$ represents 23 consecutive 0s.

With reference to the first aspect and the second aspect, in some implementations, a 240 MHz 4x LTF sequence is:

$4xEHT\_LTF\_240M_{-1524:1524}=$ $\{4xEHT\_LTF\_160M_{-1012:1012},\ 0_{23},\ 4xEHT\_LTF\_80M_{-500:500}\}$; or $4xEHT\_LTF\_240M_{-1524:1524}=$ $\{-4xEHT\_LTF\_80M_{-500:500},\ 0_{23},\ 4xEHT\_LTF\_160M_{-1012:1012}\}$;

herein, $-4xEHT\_LTF\_80M_{-500:500}$ represents negation of all elements in the sequence $4xEHT\_LTF\_80M_{-500:500}$; and $0_{23}$ represents 23 consecutive 0s.

With reference to the first aspect and the second aspect, in some implementations, a 320 MHz 4x LTF sequence is:

$4xEHT\_LTF\_320M_{-2036:2036}=$ $\{4xEHT\_LTF\_160M_{-1012:1012},\ 0_{23},\ -4xEHT\_LTF\_160M_{-1012:1012}\}$;

herein, $0_{23}$ represents 23 consecutive 0s, and $-4xEHT\_LTF\_160M_{-1012:1012}$ represents negation of all elements in the sequence $4xEHT\_LTF\_160M_{-1012:1012}$.

With reference to the first aspect and the second aspect, in some implementations, an 80 MHz 4x LTF sequence is a sequence obtained after one or more operations in first operations are performed on $4xEHT\_LTF\_80M_{-500:500}$;

a 160 MHz 4x LTF sequence is a sequence obtained after one or more operations in the first operations are performed on $4xEHT\_LTF\_160M_{-1012:1012}$.

a 240 MHz 4x LTF sequence is a sequence obtained after one or more operations in the first operations are performed on $4xEHT\_LTF\_240M_{-1524:1524}$;

a 320 MHz 4x LTF sequence is a sequence obtained after one or more operations in the first operations are performed on $4xEHT\_LTF\_320M_{-2036:2036}$; and the first operations include multiplying elements in a sequence by −1, reversing an order of elements in a sequence, and multiplying an element at an even-numbered or odd-numbered position in a sequence by −1.

For the sequence provided in this embodiment of this application, a PAPR in a multi-stream scenario is considered, a PAPR value on a single resource unit (resource unit, RU) is relatively low, a PAPR value on a combined RU is relatively low, and a PAPR value on entire bandwidth is also relatively low.

According to a third aspect, an apparatus for transmitting a physical layer protocol data unit is provided. The apparatus is configured to perform the method provided in any one of the first aspect or the possible implementations of the first aspect. Specifically, the apparatus includes a unit configured to perform any one of the first aspect or the possible implementations of the first aspect.

For example, the apparatus includes:

a processing unit, configured to generate a physical layer protocol data unit PPDU, where the PPDU includes a long training field LTF sequence; and a transceiver unit, configured to send the PPDU.

According to a fourth aspect, an apparatus for transmitting a physical layer protocol data unit is provided. The apparatus is configured to perform the method provided in any one of the second aspect or the possible implementations of the second aspect. Specifically, the apparatus may include a unit configured to perform any one of the second aspect or the possible implementations of the second aspect.

For example, a transceiver unit is configured to receive a PPDU, and a processing unit is configured to parse the received PPDU to obtain a long training field LTF sequence included in the PPDU.

With reference to the third aspect and the fourth aspect, in some implementations, an 80 MHz 2x LTF sequence is:

$2xEHT\_LTF\_80M_{-500:500}=\{2xEHT\_LTF\_partA,\ 0_5,\ 2xEHT\_LTF\_partB\}$, where 2xEHT_LTF_partA is 2xEHT_LTF_partA in DESCRIPTION OF EMBODIMENTS in the specification, 2xEHT_LTF_partB is 2xEHT_LTF_partB in DESCRIPTION OF EMBODIMENTS in the specification, and $0_5$ represents 5 consecutive 0s.

With reference to the third aspect and the fourth aspect, in some implementations, a 160 MHz 2x LTF sequence is:

$2xEHT\_LTF\_160M_{-1012:1012}=$ $\{2xEHT\_LTF\_80M_{-500:500},\ 0_{23},\ 2xEHT\_LTF\_80M_{-500:500}\}$;

herein, $0_{23}$ represents 23 consecutive 0s.

With reference to the third aspect and the fourth aspect, in some implementations, a 240 MHz 2x LTF sequence is:

$2xEHT\_LTF\_240M_{-1524:1524}=$ $\{-2xEHT\_LTF\_160M_{-1012:1012},\ 0_{23},\ 2xEHT\_LTF\_80M_{-500:500}\}$; or $2xEHT\_LTF\_240M_{-1524:1524}=$ $\{-2xEHT\_LTF\_80M_{-500:500},\ 0_{23},\ 2xEHT\_LTF\_160M_{-1012:1012}\}$;

herein, $-2xEHT\_LTF\_80M_{-500:500}$ represents negation of all elements in the sequence $2xEHT\_LTF\_80M_{-500:500}$; $-2xEHT\_LTF\_160M_{-1012:1012}$ represents negation of all elements in the sequence $2xEHT\_LTF\_160M_{-1012:1012}$; and $0_{23}$ represents 23 consecutive 0s.

With reference to the third aspect and the fourth aspect, in some implementations, a 320 MHz 2x LTF sequence is:

$2xEHT\_LTF\_320M_{-2036:2036}=$ $\{-2xEHT\_LTF\_0_{23},\ 2xEHT\_LTF\_160M_{-1012:1012}\}$;

herein, $-2xEHT\_LTF\_160M_{-1012:1012}$ represents negation of all elements in the sequence $2xEHT\_LTF\_160M_{-1012:1012}$; and $0_{23}$ represents 23 consecutive 0s.

With reference to the third aspect and the fourth aspect, in some implementations, an 80 MHz 2x LTF sequence is a sequence obtained after one or more operations in first operations are performed on $2xEHT\_LTF\_80M_{-500:500}$; a 160 MHz 2x LTF sequence is a sequence obtained after one or more operations in the first operations are performed on $2xEHT\_LTF\_160M_{-1012:1012}$; a 240 MHz 2x LTF sequence is a sequence obtained after one or more operations in the first operations are performed on $2xEHT\_LTF\_240M_{-1524:1524}$; a 320 MHz 2x LTF sequence is a sequence obtained after one or more operations in the first operations are performed on $2xEHT\_LTF\_320M_{-2036:2036}$; and the first operations include multiplying elements in a sequence by −1, reversing an order of elements in a sequence, and multiplying an even-numbered or odd-numbered element in non-zero elements in a sequence by −1.

With reference to the third aspect and the fourth aspect, in some implementations, an 80 MHz 4x LTF sequence is:

$4xEHT\_LTF\_80M_{-500:500}=$ $\{4xEHT\_LTF\_partA,\ 0_5,\ 4xEHT\_LTF\_partB\}$, where 4xEHT_LTF_partA is 4xEHT_LTF_partA in DESCRIPTION OF EMBODIMENTS in the specification, 4xEHT_LTF_partB is 4xEHT_LTF_partB in DESCRIPTION OF EMBODIMENTS in the specification, and $0_5$ represents 5 consecutive 0s.

With reference to the third aspect and the fourth aspect, in some implementations, a 160 MHz 4x LTF sequence is:

$4xEHT\_LTF\_160M_{-1012:1012}=$ $\{-4xEHT\_LTF\_80M_{-500:500},\ 0_{23},\ 4xEHT\_LTF\_80M_{-500:500}\}$;

herein, $-4xEHT\_LTF\_80M_{-500:500}$ represents negation of all elements in the sequence $4xEHT\_LTF\_80M_{-500:500}$; and $0_{23}$ represents 23 consecutive 0s.

With reference to the third aspect and the fourth aspect, in some implementations, a 240 MHz 4x LTF sequence is:

$4xEHT\_LTF\_240M_{-1524:1524}=$ $\{4xEHT\_LTF\_160M_{-1012:1012},\ 0_{23},\ 4xEHT\_LTF\_80M_{-500:500}\}$; or $4xEHT\_LTF\_240M_{-1524:1524}=$ $\{-4xEHT\_LTF\_80M_{-500:500},\ 0_{23},\ 4xEHT\_LTF\_160M_{-1012:1012}\}$;

herein, $-4xEHT\_LTF\_80M_{-500:500}$ represents negation of all elements in the sequence $4xEHT\_LTF\_80M_{-500:500}$; and $0_{23}$ represents 23 consecutive 0s.

With reference to the third aspect and the fourth aspect, in some implementations, a 320 MHz 4x LTF sequence is:

$4xEHT\_LTF\_320M_{-2036:2036}=$ $\{4xEHT\_LTF\_160M_{-1012:1012},\ 0_{23},\ -4xEHT\_LTF\_160M_{-1012:1012}\}$;

herein, $0_{23}$ represents 23 consecutive 0s, and $-4xEHT\_LTF\_160M_{-1012:1012}$ represents negation of all elements in the sequence $4xEHT\_LTF\_160M_{-1012:1012}$.

With reference to the third aspect and the fourth aspect, in some implementations, an 80 MHz 4x LTF sequence is a sequence obtained after one or more operations in first operations are performed on $4xEHT\_LTF\_80M_{-500:500}$; a 160 MHz 4x LTF sequence is a sequence obtained after one or more operations in the first operations are performed on $4xEHT\_LTF\_160M_{-1012:1012}$; a 240 MHz 4x LTF sequence is a sequence obtained after one or more operations in the first operations are performed on $4xEHT\_LTF\_240M_{-1524:1524}$; a 320 MHz 4x LTF sequence is a sequence obtained after one or more operations in the first operations are performed on $4xEHT\_LTF\_320M_{-2036:2036}$; and the first operations include multiplying elements in a sequence by −1, reversing an order of elements in a sequence, and multiplying an element at an even-numbered or odd-numbered position in a sequence by −1.

According to a fifth aspect, an embodiment of this application provides an apparatus for transmitting a physical layer protocol data unit. The apparatus includes a processor and a transceiver that is internally connected to the processor for communication. The processor is configured to generate a physical layer protocol data unit PPDU, where the PPDU includes a long training field LTF sequence. The transceiver is configured to send the PPDU.

The apparatus for transmitting a physical layer protocol data unit provided in the fifth aspect is configured to perform any one of the first aspect or the possible implementations of the first aspect. For specific details, refer to any one of the first aspect or the possible implementations of the first aspect. Details are not described herein.

According to a sixth aspect, an embodiment of this application provides an apparatus for transmitting a physical layer protocol data unit. The apparatus includes a processor and a transceiver that is internally connected to the processor for communication. The transceiver is configured to receive a PPDU. The processor is configured to parse the received PPDU to obtain a long training field LTF sequence included in the PPDU.

The apparatus for transmitting a physical layer protocol data unit provided in the sixth aspect is configured to perform any one of the second aspect or the possible implementations of the second aspect. For specific details, refer to any one of the second aspect or the possible implementations of the second aspect. Details are not described herein.

According to a seventh aspect, an embodiment of this application provides an apparatus for transmitting a physical layer protocol data unit. The apparatus includes a processing circuit and an output interface that is internally connected to the processing circuit for communication. The processing circuit is configured to generate a physical layer protocol data unit PPDU, where the PPDU includes a long training field LTF sequence. The output interface is configured to send the PPDU.

The apparatus for transmitting a physical layer protocol data unit provided in the seventh aspect is configured to perform any one of the first aspect or the possible implementations of the first aspect. For specific details, refer to any one of the first aspect or the possible implementations of the first aspect. Details are not described herein.

According to an eighth aspect, an embodiment of this application provides an apparatus for transmitting a physical layer protocol data unit. The apparatus includes a processing circuit and an input interface that is internally connected to the processing circuit for communication. The input interface is configured to receive a PPDU. The processing circuit is configured to parse the received PPDU to obtain a long training field LTF sequence included in the PPDU.

The apparatus for transmitting a physical layer protocol data unit provided in the eighth aspect is configured to perform any one of the second aspect or the possible implementations of the second aspect. For specific details, refer to any one of the second aspect or the possible implementations of the second aspect. Details are not described herein.

According to a ninth aspect, an embodiment of this application provides a computer-readable storage medium, configured to store a computer program, where the computer program includes instructions used to perform any one of the first aspect or the possible implementations of the first aspect.

According to a tenth aspect, an embodiment of this application provides a computer-readable storage medium, configured to store a computer program, where the computer program includes instructions used to perform any one of the second aspect or the possible implementations of the second aspect.

According to an eleventh aspect, an embodiment of this application provides a computer program, where the computer program includes instructions used to perform any one of the first aspect or the possible implementations of the first aspect.

According to a twelfth aspect, an embodiment of this application provides a computer program, where the computer program includes instructions used to perform any one of the second aspect or the possible implementations of the second aspect.

DESCRIPTION OF EMBODIMENTS

Figure 1:
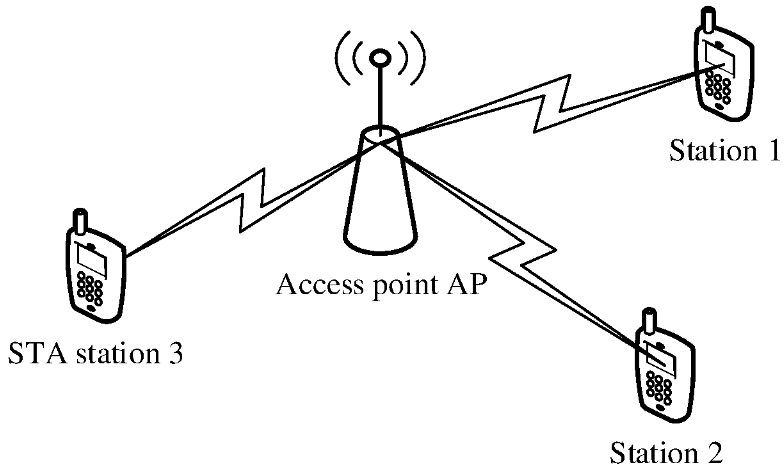
FIG. 1 is a schematic diagram of a communications system applicable to a method according to an embodiment of this application.

The following describes in detail the embodiments of this application with reference to the accompanying drawings.

To greatly improve a service transmission rate of a WLAN system, the IEEE 802.11ax standard further uses an orthogonal frequency division multiple access (OFDMA) technology based on an existing orthogonal frequency division multiplexing (OFDM) technology. The OFDMA technology is a combination of OFDM and FDMA technologies, which is applicable to multi-user access. The OFDM technology is generally applied to a unidirectional broadcast channel, and most actual communications systems support multi-user concurrent communication. Therefore, based on the OFDM technology, the new multiple access technology OFDMA is obtained by allocating one or more subcarrier groups in subcarriers to each user. In OFDMA, a physical channel is divided into a plurality of resource units, each resource unit further includes a plurality of subcarriers (subchannels), and each user may occupy one resource unit for transmission. Therefore, a plurality of users can perform parallel transmission, thereby reducing time overheads and a collision probability of multi-user contention access. In addition, in the OFDMA technology, because subcarriers overlap each other, spectrum utilization is greatly improved, so that multipath interference and inter-carrier interference can be effectively resisted, and equalization at a receive end is simple. The OFDMA technology supports a plurality of nodes in sending and receiving data simultaneously. This achieves multi-station diversity gains.

In recent years, wireless traffic increases at a very high speed, and users have increasingly higher requirements for communication service quality, such as a low latency and ultra-reliability. As a key technology for carrying a wireless traffic service, a wireless local area network continuously develops and evolves to meet increasingly higher requirements of people for wireless transmission. Existing IEEE 802.11ax can hardly meet user requirements in aspects such as a high throughput, low jitter, and a low latency. Therefore, there is an urgent need to develop a next-generation WLAN technology, for example, an IEEE 802.11be standard, an extremely high throughput (EHT) standard, or a Wi-Fi 7 standard, to meet the foregoing extreme performance requirements. The following uses an 802.11be standard as an example for description.

IEEE 802.11be continues to use the OFDMA transmission mode used in 802.11ax. Different from 802.11ax, 802.11ax uses a maximum of 160 MHz bandwidth, but 802.11be uses ultra-high bandwidth of 240 MHz and 320 MHz to achieve an ultra-high transmission rate and support an ultra-dense user scenario.

As everyone knows, OFDM uses a frequency domain equalization technology. Therefore, accuracy of channel estimation greatly affects communication performance. However, an OFDM system has a disadvantage of a high PAPR, and especially in high bandwidth, more subcarriers lead to a more severe PAPR. The high PAPR leads to nonlinear signal distortion and degrades system performance. Because the OFDMA technology is evolved from the OFDM technology, the OFDMA technology inevitably inherits a high-PAPR characteristic of the OFDM technology. Therefore, in an OFDMA system, a PAPR is still an important consideration in a design of an LTF sequence. In particular, because the OFDMA system uses a channel binding technology, in the LTF sequence design, not only a PAPR of the entire sequence is considered, but also a PAPR of the sequence on a single resource unit (RU), a PAPR of the sequence on a combined RU, and a PAPR in a considered case of phase rotation caused by a P-matrix when there are a plurality of streams are considered.

In the existing IEEE 802.11ax standard, an LTF that has a low-PAPR characteristic and that is applicable to resource unit distribution (tone plan) in the 802.11ax standard is designed. Resource unit distribution (tone plan) and pilot positions in the 802.11be standard are different from resource unit distribution (tone plan) and pilot positions in the 802.11ax standard. If an 80 MHz LTF sequence in 802.11ax is directly applied to the 802.11be standard, the LTF sequence has relatively high PAPR values on some resource units, and PAPR values on some resource units are already greater than an average PAPR value of a data part. On the other hand, because a combined RU is used in 802.11be, even if a PAPR value on a single RU is relatively low, a PAPR value on a combined RU obtained by combining a plurality of RUs may also be relatively high. It may be understood that combining a plurality of RUs means allocating the plurality of RUs to one STA. A position of each RU includes a data subcarrier position and a pilot subcarrier position of the RU. Therefore, to make channel estimation more accurate, a low-PAPR LTF sequence for channel estimation needs to be redesigned in IEEE 802.11be.

Based on this, the embodiments of this application provide a method for designing an LTF sequence and a method for transmitting a physical layer protocol data unit PPDU. For an LTF sequence in the embodiments of this application, a PAPR in a multi-stream scenario is considered, a PAPR value on a single RU is relatively low, a PAPR value on a combined RU is relatively low, and a PAPR value on entire bandwidth is also relatively low.

For ease of understanding of technical solutions in the embodiments of this application, the following briefly describes a system architecture of a method for transmitting a PPDU provided in the embodiments of this application. It may be understood that system architectures described in the embodiments of this application are intended to more clearly describe the technical solutions in the embodiments of this application, and does not constitute a limitation on the technical solutions provided in the embodiments of this application.

The technical solutions in the embodiments of this application may be applied to various communications systems, such as a wireless local area network (WLAN) communications system, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communications system, a subsequent 6th generation (6G) system, or new radio (NR).

The following is used as an example for description. An application scenario of the embodiments of this application and the method in the embodiments of this application are described only by using a wireless local area network (WLAN) system as an example.

Specifically, the embodiments of this application may be applied to a wireless local area network (WLAN), and the embodiments of this application may be applied to any protocol in the institute of electrical and electronics engineers (IEEE) 802.11 series protocols currently used in the WLAN. The WLAN may include one or more basic service sets (BSSs). A network node in the basic service set includes an access point (AP) and a station (STA).

For ease of understanding of the embodiments of this application, a communications system shown in FIG. 1 is first used as an example to describe in detail a communications system to which the embodiments of this application are applicable. A scenario system shown in FIG. 1 may be a WLAN system. The WLAN system in FIG. 1 may include one or more APs and one or more STAs. In FIG. 1, one AP and three STAs are used as an example. Wireless communication may be performed between the AP and each of the STAs according to various standards. For example, wireless communication between the AP and the STA may be performed by using a single-user multiple-input multiple-output (SU-MIMO) technology or a multi-user multiple-input multiple-output (multi-user multiple-input multiple-output, MU-MIMO) technology.

Optionally, FIG. 1 is merely a schematic diagram. In addition to being applied to a scenario in which an AP communicates with one or more STAs, the method for transmitting a PPDU provided in the embodiments of this application may be applied to a scenario in which an AP communicates with an AP, and is also applicable to a scenario in which a STA communicates with a STA.

The method for transmitting a PPDU in this application may be implemented by a communications device in a wireless communications system, or a chip or a processor in a communications device. The communications device may be an access point (AP) device or a station (STA) device. The communications device may alternatively be a wireless communications device that supports parallel transmission over a plurality of links. For example, the communications device may be referred to as a multi-link device or a multi-band device. Compared with a communications device that supports only single-link transmission, the multi-link device has higher transmission efficiency and a higher throughput.

An access point (AP) is an apparatus having a wireless communication function, supports communication by using a WLAN protocol, has a function of communicating with another device (for example, a station or another access point) in a WLAN network, and certainly may further have a function of communicating with another device. In a WLAN system, an access point may be referred to as an access point station (AP STA). The apparatus having a wireless communication function may be a device of an entire system, or may be a chip, a processing system, or the like installed in the device of the entire system. The device in which the chip or the processing system is installed may implement the method and functions in the embodiments of this application under control of the chip or the processing system. The AP in the embodiments of this application is an apparatus that provides a service for a STA, and may support 802.11 series protocols. For example, the AP may be a communications entity such as a communications server, a router, a switch, or a network bridge. The AP may include macro base stations, micro base stations, relay stations, or the like in various forms. Certainly, the AP may alternatively be chips and processing systems in the devices in various forms, to implement the method and the functions in the embodiments of this application. The AP is also referred to as a wireless access point, a hotspot, a bridge, or the like. The AP may access a server or a wireless network. APs are access points for mobile users to access wired networks, and are mainly deployed in homes, buildings, and campuses, or are deployed outdoors. The AP is equivalent to a bridge that connects a wired network and a wireless network. A main function of the AP is to connect wireless network clients together, and then connect the wireless network to the Ethernet. Specifically, the AP may be a terminal device or a network device with a wireless fidelity (wireless fidelity, Wi-Fi) chip. Optionally, the AP may be a device that supports a plurality of WLAN standards such as 802.11.

Figure 2A:
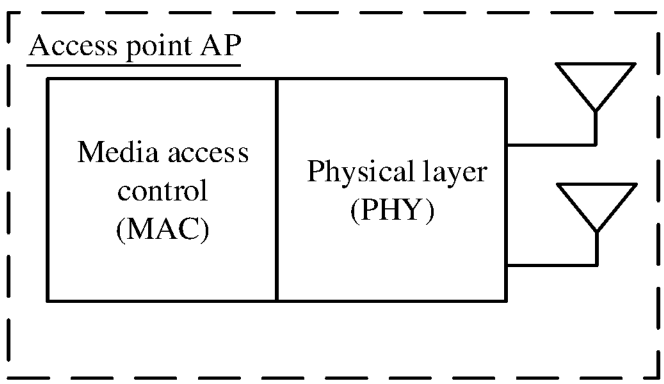
FIG. 2*a* is a diagram of an internal structure of an access point applicable to an embodiment of this application.

FIG. 2*a* shows a diagram of an internal structure of an AP product. The AP may have a plurality of antennas or may have a single antenna. In FIG. 2*a*, the AP includes a physical layer (physical layer, PHY) processing circuit and a media access control (media access control, MAC) processing circuit. The physical layer processing circuit may be configured to process a physical layer signal, and the MAC layer processing circuit may be configured to process a MAC layer signal.

A station (for example, the STA in FIG. 1) is an apparatus having a wireless communication function, supports communication by using a WLAN protocol, and has a capability of communicating with another station or an access point in a WLAN network. In a WLAN system, a station may be referred to as a non-access point station (non-AP STA). For example, the STA is any user communications device that allows a user to communicate with an AP and then communicate with a WLAN. The apparatus having a wireless communication function may be a device of an entire system, or may be a chip, a processing system, or the like installed in the device of the entire system. The device in which the chip or the processing system is installed may implement the method and functions in the embodiments of this application under control of the chip or the processing system. For example, the STA may be user equipment that may be connected to a network, such as a tablet computer, a desktop computer, a laptop computer, a notebook computer, an ultra-mobile personal computer (UMPC), a handheld computer, a netbook, a personal digital assistant (PDA), or a mobile phone, or an Internet of Things node in the Internet of Things, or a vehicle-mounted communications apparatus, entertainment device, game device or system, global positioning system device, or the like in the Internet of Vehicles. The STA may alternatively be a chip and a processing system in the foregoing terminals. A station may also be referred to as a system, a subscriber unit, an access terminal, a mobile station, a remote station, a remote terminal, a mobile device, a user terminal, a terminal, a wireless communications device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device having a wireless local area network (for example, Wi-Fi) communication function, a wearable device, a computing device, or another processing device connected to a wireless modem.

Figure 2B:
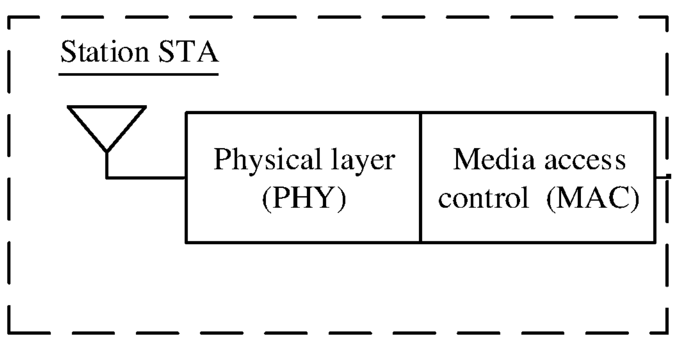
FIG. 2*b* is a diagram of an internal structure of a station applicable to an embodiment of this application.
Figure 3:
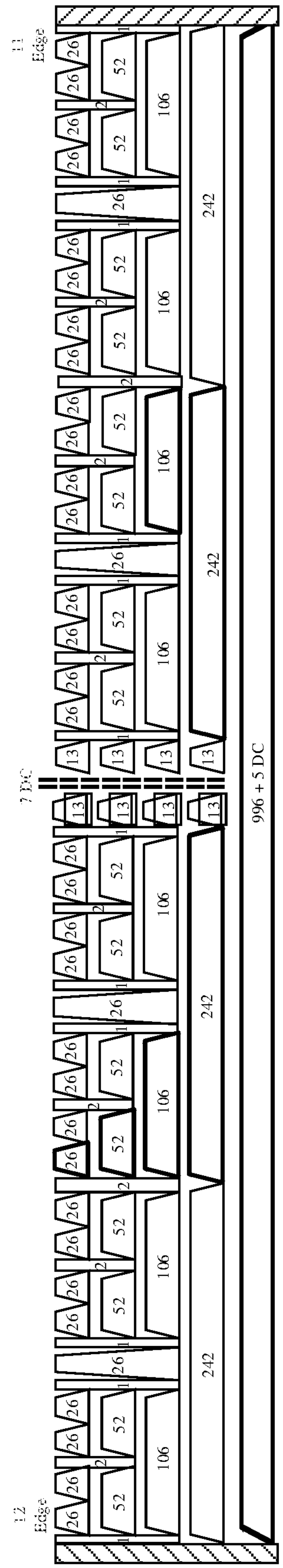
FIG. 3 is a schematic diagram of an 80 MHz carrier plan (tone plan) in 802.11ax applicable to an embodiment of this application.

FIG. 2*b* shows a structural diagram of a STA with a single antenna. In an actual scenario, the STA may alternatively be a device with a plurality of antennas, and may be a device with more than two antennas. In FIG. 3, the STA may include a physical layer (PHY) processing circuit and a media access control (MAC) processing circuit. The physical layer processing circuit may be configured to process a physical layer signal, and the MAC layer processing circuit may be configured to process a MAC layer signal.

The foregoing briefly describes the system architecture of the embodiments of this application. For ease of understanding of the embodiments of this application, the following first briefly describes several nouns or terms used in this application.

(1) Subcarrier

Wireless communications signals have limited bandwidth. Bandwidth may be divided, by using the OFDM technology, into a plurality of frequency components within channel bandwidth at a specific frequency interval. These components are referred to as tones. Subscripts of subcarriers are consecutive integers, where a subcarrier whose subscript is 0 corresponds to a direct current component, a subcarrier whose subscript is a negative number corresponds to a frequency component lower than a direct current frequency, and a subcarrier whose subscript is a positive number corresponds to a frequency component higher than the direct current frequency.

(2) 802.11ax Carrier Plan/Resource Unit Distribution (Tone Plan)

Resource unit distribution may also be understood as distribution of subcarriers that carry data, and different channel bandwidth may correspond to different tone plans. When OFDMA and multi-user multiple-input multiple-output (MU-MIMO) technologies are applied, an AP divides spectrum bandwidth into several resource units (RUs). As specified in the IEEE 802.11ax protocol, spectrum bandwidth of 20 MHz, 40 MHz, 80 MHz, and 160 MHz is divided into a plurality of types of resource units. FIG. 3 is a schematic diagram of an 80 MHz carrier plan (tone plan) in 802.11ax according to an embodiment of this application, including 36 resource unit (RU) 26s, or 16 RU52s, or eight RU106s, or four RU242s, or two RU484s, or one RU996 and five direct current subcarriers. There is no gap between a first RU242 and a second RU242. There are seven direct current subcarriers/null subcarriers between the second RU242 and a third RU242. There is also no gap between the third RU242 and a fourth RU242. It should be noted that RUs that can be supported by different total bandwidth have different types and quantities, but in same bandwidth, hybrid-type resource units can be supported.

(3) 802.11be Carrier Plan/Resource Unit Distribution (Tone Plan)

In 802.11be, bandwidth is expanded from 160 MHz to 240 MHz and 320 MHz, to meet requirements of a user for ultra-high bandwidth, an ultra-high transmission rate, and an extremely high throughput. 240 MHz may be considered as direct splicing of three 80 MHz subcarriers in 802.11be, and 320 MHz may be considered as direct splicing of four 80 MHz subcarriers in 802.11be.

Figure 4:
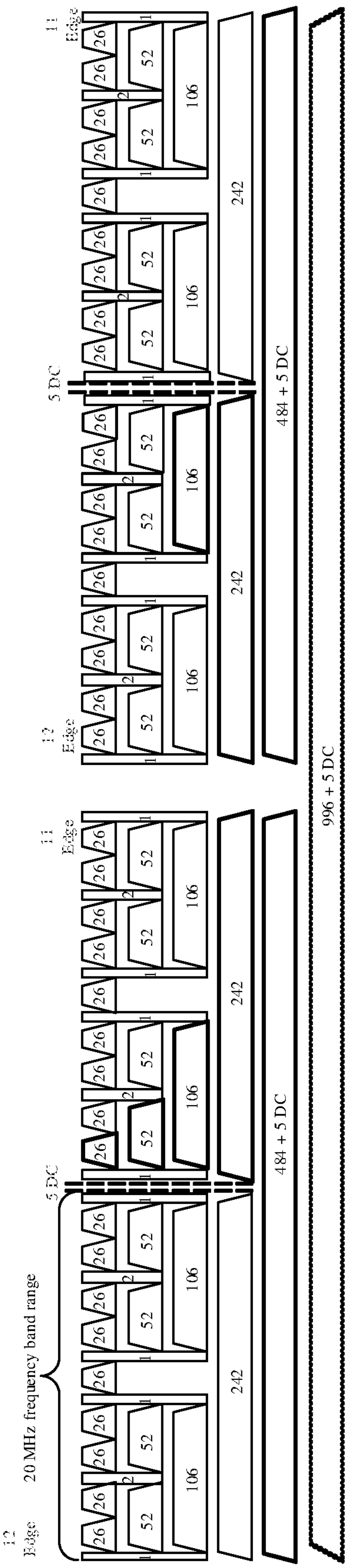
FIG. 4 is a schematic diagram of an 80 MHz carrier plan (tone plan) in 802.11be applicable to an embodiment of this application.

FIG. 4 is a schematic diagram of an 80 MHz carrier plan (tone plan) in 802.11be according to an embodiment of this application. 80 MHz bandwidth in 802.11be includes 36 RU26s, or 16 RU52s, or eight RU106s, or four RU242s, or two RU484s and five direct current subcarriers/null subcarriers (that is, two RU489s, where each RU489 includes one RU484 and five direct current subcarriers/null subcarriers), or one RU996 and five direct current subcarriers. There are five direct current subcarriers between a first RU242 and a second RU242. There are also five direct current subcarriers between a third RU242 and a fourth RU242.

It may be understood that the RU26 may refer to a resource unit including 26 subcarriers. It may be further understood that the 26 subcarriers may be consecutive or inconsecutive. Similarly, the RU52 may refer to a resource unit including 52 subcarriers, the RU106 may refer to a resource unit including 106 subcarriers, the RU242 may refer to a resource unit including 242 subcarriers, and so on.

Pilot distribution of the tone plan shown in FIG. 3 and pilot distribution of the tone plan shown in FIG. 4 are also different. Table 1 to Table 6 subsequently describe the pilot distribution of the tone plan shown in FIG. 4. For the pilot distribution of the tone plan shown in FIG. 3, refer to a conventional technology, and details are not described.

In an OFDMA system, a multi-user data packet includes a combination of RUs of a plurality of sizes, and one RU may be allocated to each user. There are the following optional RUs that may be allocated to the user:

(1) an RU including 26 consecutive subcarriers, including: 24 data subcarriers and 2 pilot subcarriers;

(2) an RU including 52 consecutive subcarriers, including: 48 data subcarriers and 4 pilot subcarriers;

(3) an RU including 106 consecutive subcarriers, including: 102 data subcarriers and 4 pilot subcarriers;

(4) an RU including 242 consecutive subcarriers, including: 234 data subcarriers and 8 pilot subcarriers;

(5) an RU including 484 consecutive subcarriers, including: 468 data subcarriers and 16 pilot subcarriers; and (6) an RU including 996 consecutive subcarriers, including: 980 data subcarriers and 16 pilot subcarriers.

An RU484 is used in 40 MHz multi-user transmission, and a RU996 is used in 80 MHz or 160 MHz multi-user transmission. It should be understood that a 160 MHz tone plan may be considered as two 80 MHz tone plans, a 240 MHz tone plan may be considered as three 80 MHz tone plans, and a 320 MHz tone plan may be considered as four 80 MHz tone plans. Details are not described herein.

The following separately describes positions of different RUs in 80 MHz bandwidth in 802.11be.

(a) In an 80 MHz subcarrier design in FIG. 4, data subcarrier and pilot subcarrier indexes of RU26s are shown in Table 1 below. One RU26 includes 24 data subcarriers and 2 pilot subcarriers.

TABLE 1

| Data subcarrier and pilot subcarrier indexes of RU26s | | | |
|---|---|---|---|
| | Positions of $1^{st}$ to $18^{th}$ RU26s | Positions of $19^{th}$ to $36^{th}$ RU26s | Pilot Positions |
| 26-tone RU | [−499 −474] | [13 38] | {−494, −480}, {−468, −454}, |
| | [−473 −448] | [39 64] | {−440, −426}, {−414, −400}, |
| | [−445 −420] | [67 92] | {−386, −372}, {−360, −346}, |
| | [−419 −394] | [93 118] | {−334, −320}, {−306, −292}, |
| | [−392 −367] | [120 145] | {−280, −266}, {−246, −232}, |
| | [−365 −340] | [147 172] | {−220, −206}, {−192, −178}, |
| | [−339 −314] | [173 198] | {−166, −152}, {−140, −126}, |
| | [−311 −286] | [201 226] | {−112, −98}, {−86, −72}, |
| | [−285 −260] | [227 252] | {−58, −44}, {−32, −18}, |
| | [−252 −227] | [260 285] | {18, 32}, {44, 58}, |
| | [−226 −201] | [286 311] | {72, 86}, {98, 112}, |
| | [−198 −173] | [314 339] | {126, 140}, {152, 166}, |
| | [−172 −147] | [340 365] | {178, 192}, {206, 220}, |
| | [−145 −120] | [367 392] | {232, 246}, 5DC, |
| | [−118 −93] | [394 419] | {266, 280}, {292, 306}, |
| | [−92 −67] | [420 445] | {320, 334}, {346, 360}, |
| | [−64 −39] | [448 473] | {372, 386}, {400, 414}, |
| | [−38 −13] | [474 499] | {426, 440}, {454, 468}, {480, 494} |

Each row in a second column and a third column in Table 1 above indicates one RU26. For example, the last row in the second column indicates an 18th RU26 [−38, −13], and a position of the 18th RU26 is from a subcarrier numbered −38 to a subcarrier numbered −13. For another example, a fifth row in the third column indicates a $23^{rd}$ RU26 [120, 145], and a position of the $23^{rd}$ RU26 is from a subcarrier numbered 120 to a subcarrier numbered 145. A fourth column in Table 1 above indicates pilot subcarrier indexes of corresponding 26-tone RUs in sequence. For example, a first 26-tone RU is a subcarrier numbered −499 to a subcarrier numbered −474, and pilot subcarriers are a subcarrier numbered −494 and a subcarrier numbered −480. For another example, a second 26-tone RU is a subcarrier numbered −473 to a subcarrier numbered −448, and pilot subcarriers are a subcarrier numbered −468 and a subcarrier numbered −454. For still another example, a $36^{th}$ 26-tone RU is a subcarrier numbered 474 to a subcarrier numbered 499, and pilot subcarriers are a subcarrier numbered 480 and a subcarrier numbered 494. It may be understood that the 26-tone RU and the RU26 may be interchangeably used.

(b) In the 80 MHz subcarrier design in FIG. 4, data subcarrier and pilot subcarrier indexes of RU52s are shown in Table 2 below. One RU52 includes 48 data subcarriers and four pilot subcarriers.

TABLE 2

| Data subcarrier and pilot subcarrier indexes of RU52s | | |
|---|---|---|
| | Positions of $1^{st}$ to $16^{th}$ RU52s | Pilot Positions |
| 52-tone RU | [−499 −448] | {−494, −480, −468, −454}, |
| | [−445 −394] | {−440, −426, −414, −400}, |
| | [−365 −314] | {−360, −346, −334, −320}, |
| | [−311 −260] | {−306, −292, −280, −266}, |
| | [−252 −201] | {−246, −232, −220, −206}, |
| | [−198 −147] | {−192, −178, −166, −152}, |
| | [−118 −67] | {−112, −98, −86, −72}, |
| | [−64 −13] | {−58, −44, −32, −18}, |
| | [13 64] | {18, 32, 44, 58}, |
| | [67 118] | {72, 86, 98, 112}, |
| | [147 198] | {152, 166, 178, 192}, |
| | [201 252] | {206, 220, 232, 246}, |
| | [260 311] | {266, 280, 292, 306}, |
| | [314 365] | {320, 334, 346, 360}, |
| | [394 445] | {400, 414, 426, 440}, |
| | [448 499] | {454, 468, 480, 494} |

Each row in a second column in Table 2 above indicates one RU. For example, a first row in the second column indicates a first RU52 [−499, −448], and a position of the first RU52 is from a subcarrier numbered −499 to a subcarrier numbered −448. A third column in Table 2 above indicates pilot subcarrier indexes of corresponding 52-tone RUs in sequence. For example, a second 52-tone RU is a subcarrier numbered −445 to a subcarrier numbered −394, and pilot subcarriers are a subcarrier numbered −440, a subcarrier numbered −426, a subcarrier numbered −414, and a subcarrier numbered −400. It may be understood that the 52-tone RU and the RU52 may be interchangeably used.

It should be understood that the following tables express the same meaning, and the meaning is not repeated below.

(c) In the 80 MHz subcarrier design in FIG. 4, data subcarrier and pilot subcarrier indexes of RU106s are shown in Table 3 below. One RU106 includes 102 data subcarriers and four pilot subcarriers. It may be understood that a 106-tone RU and the RU106 may be interchangeably used.

TABLE 3

| Data subcarrier and pilot subcarrier indexes of RU106s | | |
|---|---|---|
| | Positions of $1^{st}$ to $8^{th}$ RU106s | Pilot Positions |
| 106-tone RU | [−499 −394] | {−494, −468, −426, −400}, |
| | [−365 −260] | {−360, −334, −292, −266}, |
| | [−252 −147] | {−246, −220, −178, −152}, |
| | [−118 −13] | {−112, −86,−44, −18}, |
| | [13 118] | {18, 44, 86, 112}, |
| | [147 252] | {152, 178, 220, 246}, |
| | [260 365] | {266, 292, 334, 360}, |
| | [394 499] | {400, 426, 468, 494} |

(d) In the 80 MHz subcarrier design in FIG. 4, data subcarrier and pilot subcarrier indexes of RU242s are shown in Table 4 below. One RU242 includes 234 data subcarriers and eight pilot subcarriers. It may be understood that a 242-tone RU and the RU242 may be interchangeably used.

TABLE 4

| Data subcarrier and pilot subcarrier indexes of RU242s | | |
|---|---|---|
| | Positions of $1^{st}$ to $4^{th}$ RU242s | Pilot Positions |
| 242-tone RU | [−500 −259] | {−494, −468, −426, −400, −360, −334, −292, −266}, |
| | [−253 −12] | {−246, −220, −178, −152, −112, −86, −44, −18}, |
| | [12 253] | {18, 44, 86, 112, 152, 178, 220, 246}, |
| | [259 500] | {266, 292, 334, 360, 400, 426, 468, 494} |

(e) In the 80 MHz subcarrier design in FIG. 4, data subcarrier and pilot subcarrier indexes of RU484s are shown in Table 5 below. A 484-tone RU and the RU484 may be interchangeably used. It may be understood that an 80 MHz 484-tone RU in 802.11ax is an RU including 484 consecutive subcarriers; an 80 MHz 484-tone RU in 802.11be is still 468 data subcarriers and 16 pilot subcarriers, but has five direct current subcarriers or null subcarriers in the middle. For example, a first 484-tone RU is subcarriers numbered from −500 to −12, where five direct current subcarriers are numbered −258, −257, −256, −255, and −254, and 16 pilot subcarriers are numbered −494, −468, −426, −400, −360, −334, −292, −266, −246, −220, −178, −152, −112, −86, −44, and −18.

TABLE 5

Data subcarrier and pilot subcarrier indexes of RU484s

| | Positions of 1st to 2nd RU484s | Pilot Positions |
|---|---|---|
| 484-tone RU | [−500 −259 −253 −12] | {−494, −468, −426, −400, 360, −334, −292, −266, −246, −220, −178, −152, −112, −86, −44, −18}, |
| | [12 253 259 500] | {18, 44, 86, 112, 152, 178, 220, 246, 266, 292, 334, 360, 400, 426, 468, 494} |

(f) In the 80 MHz subcarrier design in FIG. 4, data subcarrier and pilot subcarrier indexes of an RU996 are shown in Table 6 below. A 996-tone RU and the RU996 may be interchangeably used. An 80 MHz 996-tone RU in 802.11be has 980 data subcarriers and 16 pilot subcarriers, and has five direct current subcarriers in the middle. For example, a first 996-tone RU is subcarriers numbered from −500 to 500, where five direct current subcarriers are numbered −2, −1, 0, 1, and 2, and 16 pilot subcarriers are numbered −468, −400, −334, −266, −220, −152, −86, −18, +18, +86, +152, +220, +266, +334, +400, +468.

TABLE 6

Data subcarrier and pilot subcarrier indexes of an RU996

| | Position of the RU996 | Pilot Positions |
|---|---|---|
| 996-tone RU | [−500 −3 3 500] | {−468, −400, −334, −266, −220, −152, −86, −18, +18, +86, +152, +220, +266, +334, +400, +468} |

Optionally, an LTF sequence included in the PPDU provided in the embodiments of this application is used in 240 MHz bandwidth and 320 MHz bandwidth, and the 240 MHz bandwidth and the 320 MHz bandwidth may be constructed by using the 80 MHz tone plan shown in FIG. 4. A subcarrier design of 160 MHz bandwidth is based on two 80 MHz tone plans, that is, [RU subcarrier index, pilot position subcarrier index] in 80 MHz−512: [RU subcarrier index, pilot position subcarrier index] in 80 MHz+512. Similarly, a sub carrier design of the 240 MHz bandwidth is based on three 80 MHz tone plans. A subcarrier design of the 320 MHz bandwidth is based on two 160 MHz tone plans, that is, [Pilot indices in 160 MHz/pilot indexes in 160 MHz]−1024: [Pilot indices in 160 MHz/pilot indexes in 160 MHz]+1024.

(4) Peak to Average Power Ratio

Based on observation in time domain, an amplitude of a radio signal continuously varies. Therefore, transmit power of the radio signal is not constant. The peak to average power ratio (peak to average power ratio, PAPR) is a peak to average ratio for short. The peak to average power ratio may be a ratio of an instantaneous power peak value of a continuous signal to an average signal power value in one symbol. The ratio may be represented by using the following formula:

$$PAPR = 10 \cdot \log_{10}\left(\frac{\max(X_i^2)}{\text{mean}(X_i^2)}\right).$$

Herein, $X_i$ represents a time domain discrete value of a sequence, $\max(X_i^2)$ represents a maximum value of a square of the time domain discrete value, and $\text{mean}(X_i^2)$ represents an average value of the square of the time domain discrete value.

An OFDM symbol is obtained by superimposing a plurality of independently modulated subcarrier signals. When phases of subcarriers are the same or similar, superimposed signals are modulated by a same initial phase signal, resulting in a relatively large instantaneous power peak value. This leads to a relatively large PAPR. An OFDM system has a disadvantage of a high PAPR, and especially in high bandwidth, more subcarriers lead to a more severe PAPR. Because a dynamic range of a general power amplifier is limited, a MIMO-OFDM signal with a relatively large peak to average ratio is very likely to enter a nonlinear area of the power amplifier. The high PAPR causes nonlinear signal distortion, resulting in obvious spectrum spreading interference and in-band signal distortion. This reduces system performance. Therefore, when a sequence is designed, a smaller PAPR of the sequence is better.

(5) 4x, 2x, and 1x Modes of a Long Training Field Sequence

Figure 5:
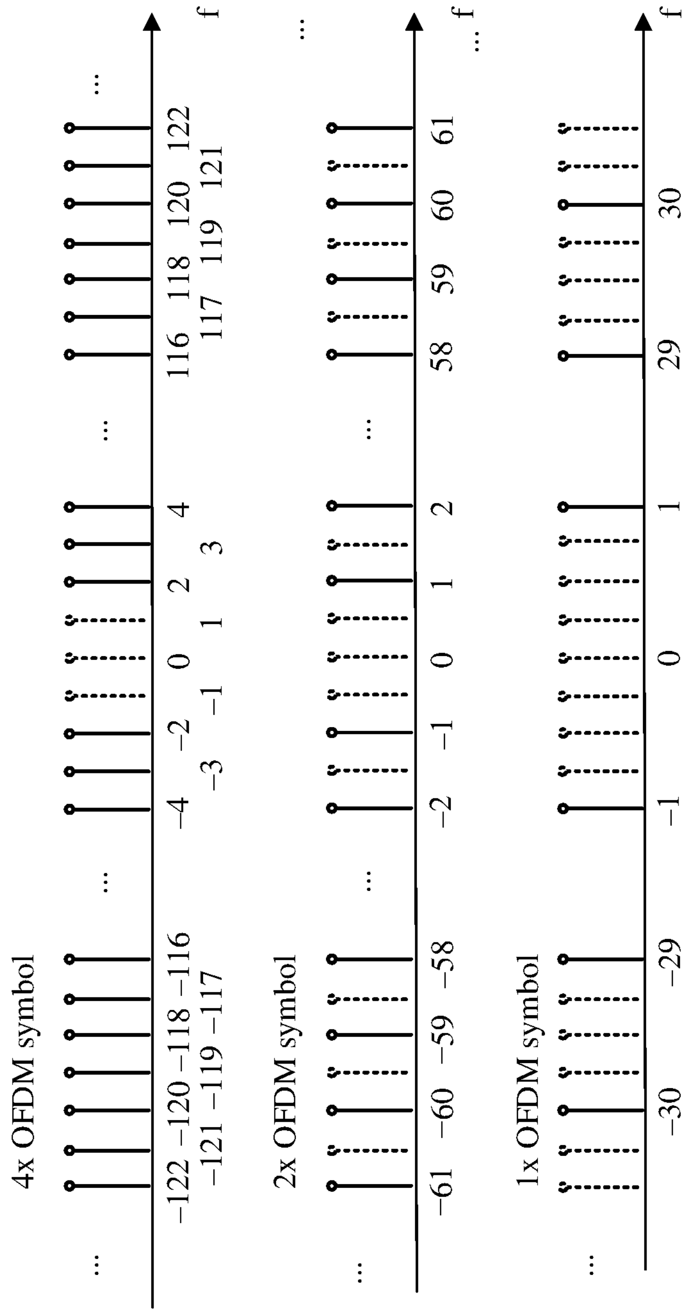
FIG. 5 is a schematic diagram of sequences in 1x, 2x, and 4x modes applicable to an embodiment of this application.

To further improve system efficiency in different scenarios, an LTF field needs to support 4x, 2x, and 1x modes. FIG. 5 is a schematic diagram of 4x, 2x, and 1x modes applicable to an embodiment of this application. 20 MHz bandwidth is used as an example. When positions of subcarriers are marked as −128, −127, . . . , −2, −1, 0, 1, 2, . . . , and 127, subcarriers that are of a 4x HE-LTF element and that carry a long training field sequence are located at −122, −121, . . . , −3, −2, 2, 3, . . . , 121, and 122. Remaining subcarriers are null subcarriers, and a subcarrier spacing is $\Delta_F^{4\times}$; =20 MHz/256=78.125 kHz. Subcarriers that are of a 2x HE-LTF element and that carry a long training field sequence are located at −122, −120, . . . , −4, −2, 2, 4, . . . , 120, and 122, and remaining subcarriers are null subcarriers. Equivalently, the positions of the subcarriers may be marked as −64, −63, . . . , −2, −1, 0, 1, 2, . . . , and 63. In this case, subcarriers that are of a 2x HE-LTF element and that carry a long training field sequence are located at −61, −60, . . . , −2, −1, 1, 2, . . . , 60, and 61. Remaining subcarriers are null subcarriers, and a subcarrier spacing is $\Delta_F^{2\times}$; =20 MHz/128=156.25 kHz. Similarly, subcarriers that are of a 1x HE-LTF element and that carry a long training field sequence are centrally located at −120, −116, . . . , −8, −4, 4, 8, . . . , 116, and 120, and remaining subcarriers are null subcarriers. Equivalently, the positions of the subcarriers may be marked as −32, −31, . . . , −2, −1, 0, 1, 2, . . . , and 31. In this case, subcarriers that are of a 1x HE-LTF element and that carry a long training field sequence are located at −30, −29, . . . , −2, −1, 1, 2, . . . , 29, and 30. Remaining subcarriers are null subcarriers, and a subcarrier spacing is $\Delta_F^{1\times}$; =20 MHz/64=312.5 kHz.

That is, four adjacent elements in a sequence form a group. If only one element in the group is not 0, the 1x mode is used. If two elements in the group are not 0, the 2x mode is used. If none of the four elements in the group is 0, the 4x mode is used.

(6) When a Wi-Fi signal is sent in a single-stream pilot mode, a pilot subcarrier and a data subcarrier on each LTF symbol of an LTF field corresponding to the Wi-Fi signal are multiplied by different values, thereby changing a structure of an original LTF sequence. This may cause a PAPR value of the signal of the LTF field to be high when multiplied by some coefficients.

In an OFDM technology, a plurality of LTF fields are used to help a station estimate channels of a plurality of spatial streams. To accurately estimate the channels of the spatial streams and keep LTFs of the streams orthogonal, a Wi-Fi standard proposes to multiply the LTFs by elements of a P-matrix. Specifically, a data subcarrier of an $n^{th}$ LTF symbol sent in an $m^{th}$ spatial stream is multiplied by an element in an $m^{th}$ row and an $n^{th}$ column of the P-matrix, and a pilot subcarrier is multiplied by an element in an $m^{th}$ row and an $n^{th}$ column of an R-matrix. Each row of the R-matrix is equal to a first row of the P-matrix. When the data subcarrier and the pilot subcarrier are multiplied by a same value, a PAPR of an obtained new sequence does not change. When the data subcarrier and the pilot subcarrier are multiplied by different values, a PAPR of an obtained new sequence may change.

A size of the P-matrix is generally 2×2, 4×4, 6×6, 8×8, 10×10, 12×12, 14×14, 16×16, or the like. For example, when four LTFs need to be sent in one spatial stream, orthogonality may be implemented by using a P-matrix of a size 4×4.

For example, the P-matrix mainly includes the following types:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

$$P_{8\times 8} = \begin{bmatrix} P_{4\times 4} & P_{4\times 4} \\ P_{4\times 4} & -P_{4\times 4} \end{bmatrix}$$

$$P_{6\times 6} = \begin{bmatrix} w^{0*0} & -w^{0*1} & w^{0*2} & w^{0*3} & w^{0*4} & -w^{0*5} \\ w^{1*0} & -w^{1*1} & w^{1*2} & w^{1*3} & w^{1*4} & -w^{1*5} \\ w^{2*0} & -w^{2*1} & w^{2*2} & w^{2*3} & w^{2*4} & -w^{2*5} \\ w^{3*0} & -w^{3*1} & w^{3*2} & w^{3*3} & w^{3*4} & -w^{3*5} \\ w^{4*0} & -w^{4*1} & w^{4*2} & w^{4*3} & w^{4*4} & -w^{4*5} \\ w^{5*0} & -w^{5*1} & w^{5*2} & w^{5*3} & w^{5*4} & -w^{5*5} \end{bmatrix}$$

$$w = \exp(-j2\pi/6)$$

Elements in P-matrices of different sizes are different, and may indicate different rotated phases. For example, elements in P-matrices of sizes 4*4, 8*8, and 16*16 are all 1 and −1, and correspond to a same rotated phase. For example, pilot position * 1, and non-pilot position * 1; or pilot position * 1, and non-pilot position * −1; or pilot position * −1, and non-pilot position * 1; or pilot position * −1, and non-pilot position * −1. When the pilot position and the non-pilot position are multiplied by a same value, a PAPR that is of a sequence obtained after phase rotation and that is on a single RU, on a combined RU, or on entire bandwidth does not change relative to a PAPR of an original sequence. When the pilot position and the non-pilot position are multiplied by different values, a PAPR that is of a sequence obtained after phase rotation and that is on a single RU, on a combined RU, or on entire bandwidth changes relative to a PAPR of an original sequence. Generally, four sequences with different PAPRs may be obtained after phase rotation is performed on one sequence.

In this application, phase rotation is considered for the LTF sequence, and a PAPR of an obtained rotated sequence is relatively low on a single RU, on a combined RU, and on entire bandwidth. Therefore, a PAPR of the sequence is relatively low in a multi-stream scenario.

(7) PAPR Value of an HE-LTF Sequence with 80 MHz Bandwidth in 802.11Ax Applied to a Resource Unit with 80 MHz Bandwidth in 802.11be It may be learned from comparison between FIG. 3 and FIG. 4 that there is no spacing between a first RU242 and a second RU242 in 802.11ax, and there are five direct current subcarriers between a first RU242 and a second RU242 in 802.11be. Therefore, if the HE-LTF sequence with 80 MHz bandwidth in 802.11ax is directly applied to 80 MHz bandwidth in 802.11be, PAPR values on some resource units in 802.11be are relatively high. As shown in Table 7 below, a second row in Table 7 represents average PAPR values of a data part on different resource units, a third row represents PAPR values on different resource units when a 2x HE-LTF sequence with 80 MHz bandwidth in 802.11ax is applied to 80 MHz bandwidth in 802.11be, and a fourth row represents PAPR values on different resource units when a 4x HE-LTF sequence with 80 MHz bandwidth in 802.11ax is applied to 80 MHz bandwidth in 802.11be. It may be learned from Table 7 that PAPR values on resource units (RU26, RU52, and RU484+RU242) in a second column, a third column, and the last column in Table 7 are greater than average PAPR values of the data part.

TABLE 7

PAPR value of an LTF field on each resource unit when an 80 MHz LTF in 802.11ax is applied to an 802.11be standard shown in FIG. 4

| Max PAPR | RU26 | RU52 | RU106 | RU242 | RU484 | RU996 | RU52 + RU26 | RU106 + RU26 | RU484 + RU242 |
|---|---|---|---|---|---|---|---|---|---|
| Data (16QAM) | 6.52 | 7.17 | 7.76 | 8.36 | 8.82 | 9.22 | 7.54 | 7.94 | 9.08 |
| LTF 2x | 7.95 | 7.43 | 6.71 | 8.23 | 7.33 | 6.48 | 6.37 | 6.64 | 9.65 |
| LTF 4x | 7.29 | 8.48 | 6.69 | 7.07 | 7.36 | 6.74 | 6.90 | 7.42 | 8.46 |

(8) Type A and Type B RUs

Figure 6:
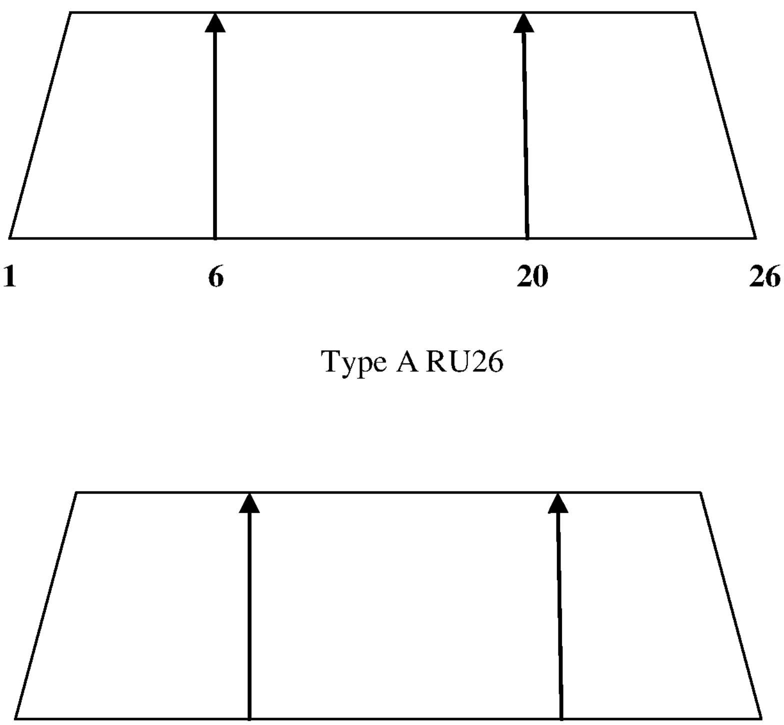
FIG. 6 is a schematic diagram of two different types of RU26s applicable to an embodiment of this application.

By analyzing resource unit division and pilot positions in 802.11be in 80 MHz bandwidth in Table 1 (data subcarrier and pilot subcarrier indexes of RU26s), it may be found that, in the 36 RU26s, pilot subcarriers of some RU26 resource units are located at $6^{th}$ and $20^{th}$ subcarriers of the 26 subcarriers, as shown in FIG. 6. This type of RU26 is referred to as a Type A RU26 in this application. However, pilot subcarriers of some other RU26 resource units are located at $7^{th}$ and $21^{st}$ subcarriers of the 26 subcarriers. This type of RU26 is referred to as a Type B RU26 in this application.

For example, a first 26-tone RU is a subcarrier numbered −499 to a subcarrier numbered −474, and pilot subcarriers are a subcarrier numbered −494 and a subcarrier numbered −480. For another example, a second 26-tone RU is a subcarrier numbered −473 to a subcarrier numbered −448, and pilot subcarriers are a subcarrier numbered −468 and a subcarrier numbered −454. That is, pilot subcarriers are located at 6th and $20^{th}$ subcarriers of the 26 subcarriers. For still another example, a fifth 26-tone RU is a subcarrier numbered −392 to a subcarrier numbered −367, and pilot subcarriers are a subcarrier numbered −386 and a subcarrier numbered −372. That is, pilot subcarriers are located at 7th and 21st subcarriers of the 26 subcarriers.

Correspondingly, an RU52 including two RU26s also has two types. One type is an RU52 including two Type A RU26s, and this type of RU52 is referred to as a Type A RU52 in this application. The other type is an RU52 including two Type B RU26s, and this type of RU52 is referred to as a Type B RU52 in this application.

Correspondingly, an RU106 including two RU52s also has two types. One type is an RU106 including two Type A RU52s, and this type of RU106 is referred to as a Type A RU106 in this application. The other type is an RU106 including two Type B RU52s, and this type of RU106 is referred to as a Type B RU106 in this application.

Figure 7A:
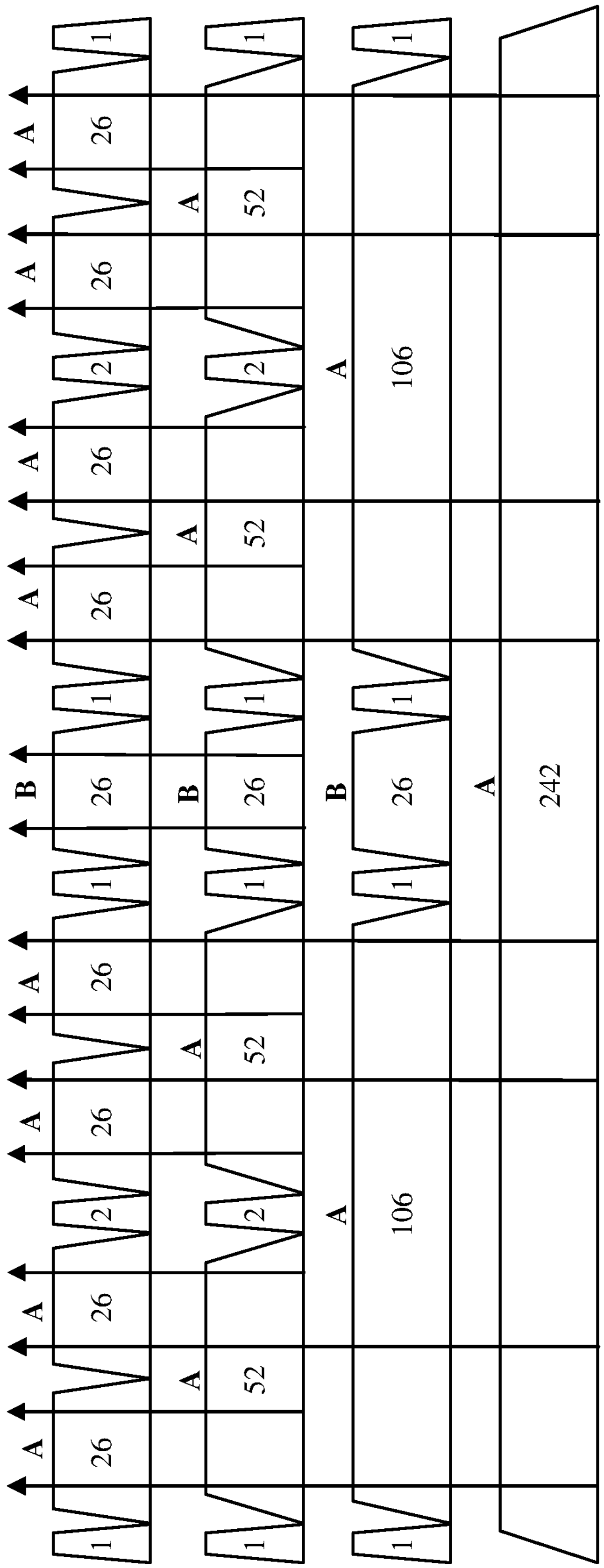
FIG. 7*a* is a schematic diagram of a division structure and pilot subcarrier distribution of an RU with 20 MHz bandwidth applicable to an embodiment of this application.
Figure 7B:
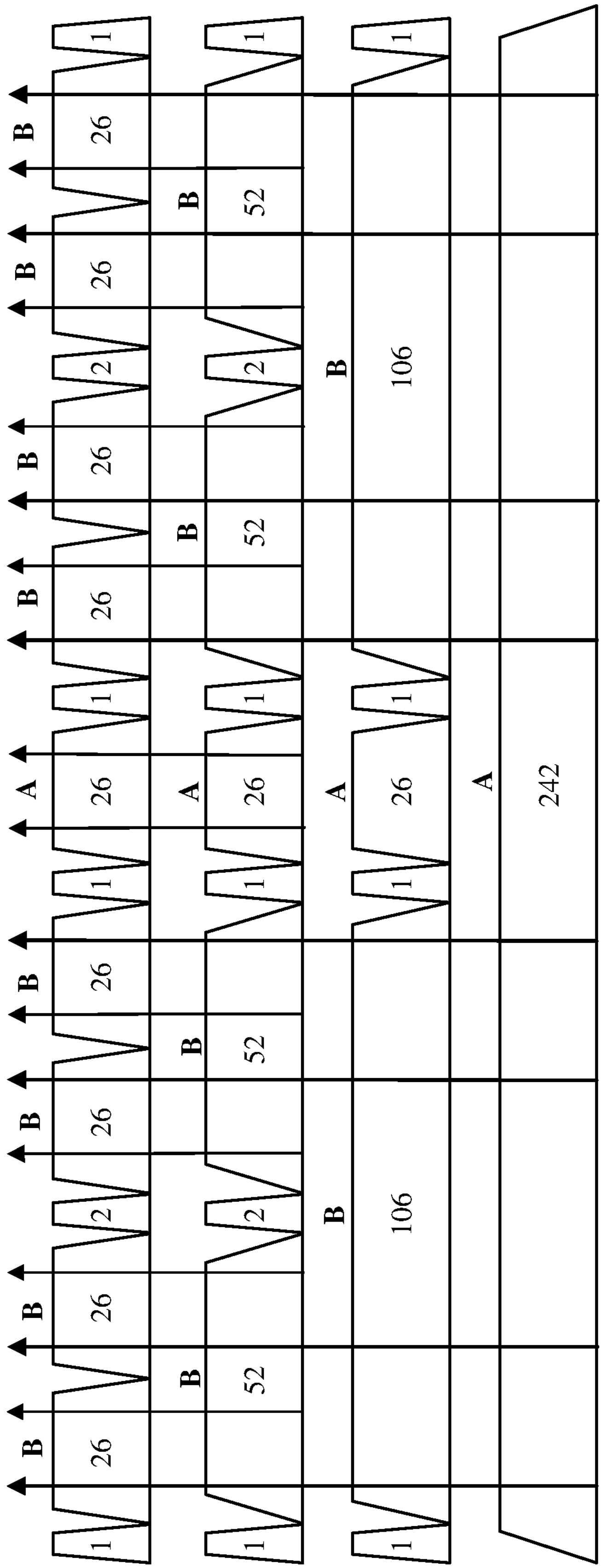
FIG. 7*b* is a schematic diagram of a division structure and pilot subcarrier distribution of another RU with 20 MHz bandwidth applicable to an embodiment of this application.

Correspondingly, an RU242 including nine RU26s has a more complicated structure, but also has two types. As shown in FIG. 7*a*, one type of RU242 includes eight Type A RU26s and one Type B RU26, and this type of RU242 is referred to as a Type A RU242 in this application. As shown in FIG. 7*b*, the other type of RU242 includes eight Type B RU26s and one Type A RU26, and this type of RU242 is referred to as a Type B RU242 in this application.

Further, it is found that an only difference between a Type A resource unit and a Type B resource unit lies in that pilot positions are different. If a head and a tail of one type of resource unit are reversed (which may also be referred to as reversed sorting), the other type of resource unit is obtained. That is, a reverse order of a Type A resource unit is a Type B resource unit, and a reverse order of a Type B resource unit is a Type A resource unit. For example, pilot subcarriers of a Type A RU26 are located at 6th and 20th subcarriers of the 26 subcarriers, and pilot subcarriers of a Type B RU26 are located at $7^{th}$ and 21st subcarriers of the 26 subcarriers. If a Type A RU26 is viewed in a reverse order, pilot subcarriers are located at 7th and 21st subcarriers of the 26 subcarriers, that is, a Type B RU26 is viewed. If a Type B RU26 is viewed in a reverse order, pilot subcarriers are located at 6th and 20th subcarriers of the 26 subcarriers, that is, a Type A RU26 is viewed. An example of order reversing or head-tail reversing is further described for ease of understanding. For example, if Type A is 1, 2, 3, and 4, Type B is 4, 3, 2, and 1.

The foregoing describes content related to the embodiments of this application. The following describes, in detail with reference to more accompanying drawings, the method for transmitting a PPDU provided in the embodiments of this application. The embodiments of this application may be applied to a plurality of different scenarios, including the scenario shown in FIG. 1, but are not limited to the scenario. For example, for uplink transmission, a STA may be used as a transmit end, and an AP may be used as a receive end. For downlink transmission, the AP may be used as a transmit end, and the STA may be used as a receive end. For other transmission scenarios, for example, for data transmission between APs, one AP may be used as a transmit end, and the other AP may be used as a receive end. For another example, for data transmission between STAs, one STA may be used as a transmit end, and the other STA may be used as a receive end. In the embodiments of this application, the method is described by using a first communications device and a second communications device. It may be understood that the first communications device may be an AP or a STA (for example, the AP or the STA shown in FIG. 1), and the second communications device may also be an AP or a STA (for example, the AP or the STA shown in FIG. 1).

The embodiments of this application provide a plurality of possible LTF sequences. These LTF sequences have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth. It may be understood that a smaller PAPR value indicates a lower requirement on a linear power amplifier and better performance.

Embodiment 1

Embodiment 1 of this application describes a possible procedure of the method for transmitting a physical layer protocol data unit PPDU provided in this application.

Figure 8:
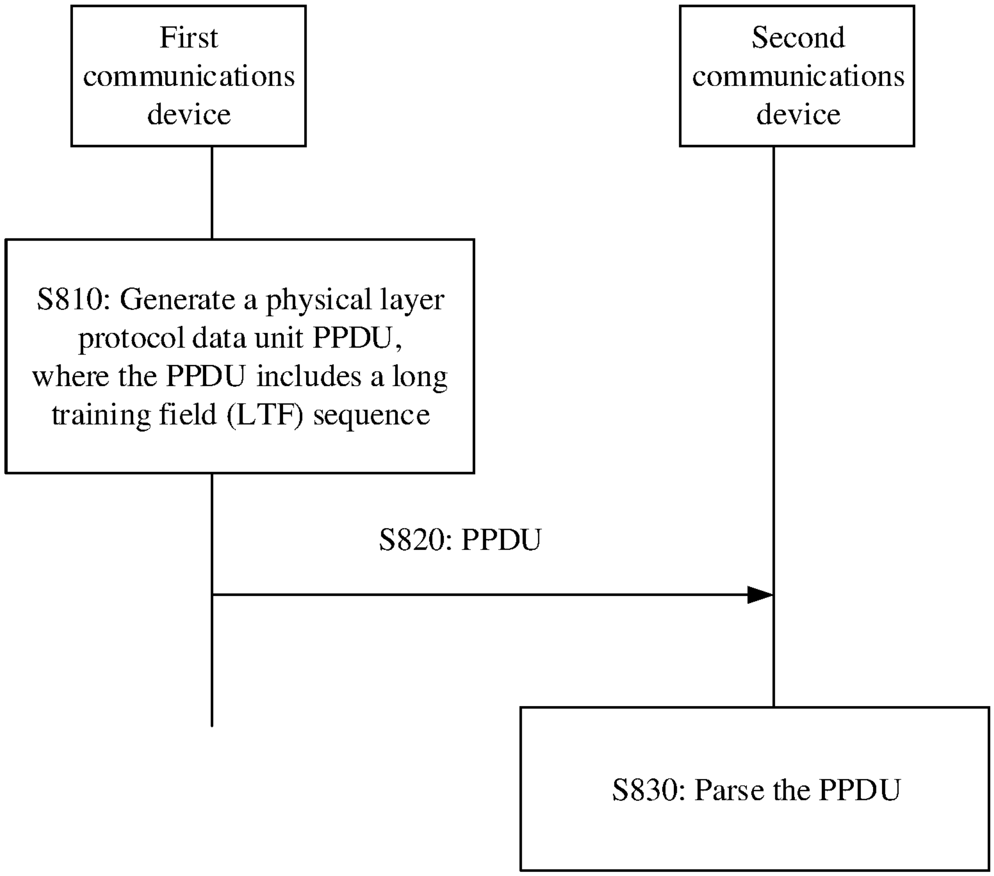
FIG. 8 is a schematic diagram of PPDU transmission applicable to an embodiment of this application.

Referring to FIG. 8, FIG. 8 is a schematic flowchart of a method 800 for transmitting a PPDU according to an embodiment of this application. The method 800 shown in FIG. 8 may include but is not limited to the following steps:

S810: A first communications device generates a physical layer protocol data unit PPDU, where the PPDU includes a long training field LTF, and the long training field carries an LTF sequence.

Specifically, a method for generating the LTF sequence by the first communications device is subsequently described.

S820: The first communications device sends the PPDU. Correspondingly, a second communications device receives the PPDU.

S830: The second communications device parses the PPDU to obtain the LTF sequence in the PPDU. For a specific parsing manner, refer to an existing description. No limitations are imposed herein.

It may be understood that the "LTF sequence" mentioned in this application may be a frequency domain sequence of an LTF, or may be referred to as a frequency domain sequence of a long training field.

Then, a method for generating the LTF sequence in S810 is described. Specifically, the following steps are included.

Step 1: Determine a Type A RU26 basic sequence set $S_{RU26}{}^{A}$ and a Type B RU26 basic sequence set $S_{RU26}{}^{B}$.

A1. A sequence of an appropriate length is selected based on an application scenario and an application requirement of the LTF sequence. The length is generally a sequence length corresponding to a minimum resource unit in a tone plan. For example, when the minimum resource unit is an RU26, a length of a basic sequence is 26 bits.

Generally, an element of an LTF sequence is limited to 1 or −1, and certainly, is not limited to this. Only a case of two elements 1 or −1 is considered for an EHT LTF sequence. In a case of 1x, there are 2^6=64 possible sequences that are of a Type A RU26 and that may be selected. In a case of 2x, there are 2^13=8192 possible sequences that are of a Type A RU26 and that may be selected. In a case of 4x, there are 2^26=8192*8192 possible sequences that are of a Type A RU26 and that may be selected. A sequence of a Type B RU26 resource unit has a same quantity of possibilities.

For a possible sequence of a Type A RU26, all possible rotated sequences of the sequence of the Type A RU26 are determined (PAPRs of all possible rotated sequences in this application include a PAPR of an original sequence). Then, a PAPR value of each rotated sequence on the Type A RU26 may be calculated. If the PAPR value of each rotated sequence is less than a specified threshold (the specified threshold may be a PAPR average value, median value, or the like of a data part of the Type A RU26), the sequence of the Type A RU26 may be used as a basic sequence that meets a condition. The basic sequence may be added to the Type A RU26 basic sequence set.

The foregoing process is repeated, to traverse each possible sequence of the Type A RU26 and add a basic sequence with a relatively low PAPR value to the Type A RU26 basic sequence set. Optionally, a quantity of basic sequences in the Type A RU26 basic sequence set may be limited. If a relatively large quantity of basic sequences are selected by specifying a threshold, some sequences whose PAPR values are relatively low may be selected from sequences whose PAPRs are less than the specified threshold and added to the Type A RU26 basic sequence set.

PAPR values of sequences in the Type A RU26 basic sequence set are relatively low on the Type A RU26, and PAPR values of rotated sequences of these sequences are also relatively low on the Type A RU26.

B1. A sequence set formed after head-tail reversing (reversed sorting) is performed on all basic sequences in the Type A RU26 basic sequence set is the Type B RU26 basic sequence set $S_{RU26}^{B}$.

There are two basic principles: One basic principle is that a PAPR value of a new sequence formed after head-tail reversing of any sequence is the same as a PAPR value of the original sequence. The other basic principle is that, after head-tail reversing is performed on either of a sequence corresponding to a Type A resource unit and a sequence corresponding to a Type B resource unit in this application, a position of a pilot subcarrier of the sequence exactly corresponds to a pilot position of the sequence corresponding to the resource unit of the other type. A PAPR of a sequence is not changed after head-tail reversing is performed on the sequence, and a pilot point of a Type A sequence after head-tail reversing exactly corresponds to a position of a pilot point of a Type B sequence. Therefore, the sequence set formed after head-tail reversing is performed on all basic sequences in the Type A RU26 basic sequence set is the Type B RU26 basic sequence set. PAPRs of sequences in the Type B RU26 basic sequence set are relatively low on the Type B RU26, and PAPR values of rotated sequences of these basic sequences are also relatively low on the Type B RU26.

Step 2: Determine a Type A RU52 basic sequence set $S_{RU52}^{A}$ and a Type B RU52 basic sequence set $S_{RU52}^{B}$.

A2. Two RU26 basic sequences are selected from the Type A RU26 basic sequence set obtained in A1 of step 1, and are spliced into a sequence of a Type A RU52. PAPR values that are on the Type A RU52 and that are of a plurality of rotated sequences corresponding to the spliced sequence of the Type A RU52 are calculated. If the PAPR value of each rotated sequence is less than a specified threshold (the specified threshold may be a PAPR average value, median value, or the like of a data part of the Type A RU52), the sequence of the Type A RU52 may be used as a basic sequence that meets a condition. The basic sequence may be added to the Type A RU52 basic sequence set.

The foregoing process is repeated, to traverse each possible sequence of the Type A RU52 and add a basic sequence with a relatively low PAPR value to the Type A RU52 basic sequence set. Optionally, a quantity of sequences in the Type A RU52 basic sequence set may be limited. If a relatively large quantity of basic sequences are selected by specifying a threshold, some sequences whose PAPR values are relatively low may be selected from sequences whose PAPRs are less than the specified threshold and added to the Type A RU52 basic sequence set.

PAPR values of sequences in the Type A RU52 basic sequence set obtained in this manner are relatively low on the Type A RU52, and PAPR values of rotated sequences of these basic sequences are also relatively low on the Type A RU52. In addition, PAPR values on all sub-RU resource units (for example, Type A RU26s) included in the Type A RU52 are also relatively low.

B2. A sequence set formed after head-tail reversing (reversed sorting) is performed on all basic sequences in the Type A RU52 basic sequence set is the Type B RU52 basic sequence set $S_{RU52}^{B}$. PAPR values of basic sequences in the Type B RU52 basic sequence set are relatively low on the Type B RU52, and PAPR values of rotated sequences of these basic sequences are also relatively low on the Type B RU52. In addition, PAPR values on all sub-RU resource units (for example, Type B RU26s) included in the Type B RU52 are also relatively low.

Step 3: Determine a Type A RU106 basic sequence set $S_{RU106}^{A}$ and a Type B RU106 basic sequence set $S_{RU106}^{B}$.

A3. Two RU52 basic sequences are selected from the Type A RU52 basic sequence set obtained in A2 of step 2, and are spliced into a sequence of a Type A RU106 by considering possible values corresponding to two intermediate idle carriers. PAPR values that are on the Type A RU106 and that are of a plurality of rotated sequences corresponding to the spliced sequence of the Type A RU106 are calculated. If the PAPR value of each rotated sequence is less than a specified threshold (the specified threshold may be a PAPR average value, median value, or the like of a data part of the Type A RU106), the sequence of the Type A RU106 may be used as a basic sequence that meets a condition. The basic sequence may be added to the Type A RU106 basic sequence set.

The foregoing process is repeated, to traverse each possible sequence of the Type A RU106 and add a basic sequence with a relatively low PAPR value to the Type A RU106 basic sequence set. Optionally, a quantity of sequences in the Type A RU106 basic sequence set may be limited. A limiting manner is the same as the limiting manner of the Type A RU26 basic sequence set described above, and details are not described again.

PAPR values of basic sequences in the Type A RU106 basic sequence set obtained in this manner are relatively low on the Type A RU106, and PAPR values of rotated sequences of these basic sequences are also relatively low on the Type A RU106. In addition, PAPR values on all sub-RU resource units (for example, Type A RU52s and Type A RU26s) included in the Type A RU106 are also relatively low.

B3. A sequence set formed after head-tail reversing (reversed sorting) is performed on all basic sequences in the Type A RU106 basic sequence set is the Type B RU106 basic sequence set $S_{RU106}^{B}$. PAPR values of basic sequences in the Type B RU106 basic sequence set are relatively low on the Type B RU106, and PAPR values of rotated sequences of these basic sequences are also relatively low on the Type B RU106. In addition, PAPR values on all sub-RU resource units (for example, Type B RU52s and Type B RU26s) included in the Type B RU106 are also relatively low.

Step 4: Determine a basic sequence set $S_{MRU106}^{A}$ and a basic sequence set $S_{MRU106}^{B}$.

A4. An RU106 basic sequence is selected from the Type A RU106 basic sequence set obtained in A3 of step 3, and a basic sequence of a first Type A RU52 in the RU106 basic sequence and a basic sequence of a Type A RU26 (a first Type A RU26 in a second Type A RU52) adjacent to the first Type A RU52 are spliced into a multiple-resource unit (MRU) sequence. PAPR values that are on the corresponding Type A RU52+RU26 and that are of a plurality of rotated sequences corresponding to the spliced multiple-resource unit sequence are calculated. If the PAPR value of each rotated sequence is less than a specified threshold, the multiple-resource unit sequence may be used as a basic sequence that meets a condition. The multiple-resource unit sequence may be added to the basic sequence set $S_{MRU106}^{A}$.

Each possible multiple-resource unit sequence is traversed, and the foregoing process is performed to add a basic sequence with a relatively low PAPR value to the basic sequence set $S_{RU106}^{A}$. Optionally, a quantity of sequences in the basic sequence set $S_{MRU106}^{A}$ may be limited. A limiting manner is the same as the limiting manner of the Type A RU26 basic sequence set described above, and details are not described again.

Each sequence in the basic sequence set $S_{MRU106}^{A}$ and a corresponding rotated sequence have relatively low PAPRs on a corresponding Type A RU106, and have relatively low PAPRs on all sub-RU resource units (for example, Type A RU52s and Type A RU26s) included in the Type A RU106. In addition, the multiple-resource unit sequence obtained by combining the first Type A RU52 and the Type A RU26 adjacent to the first Type A RU52 also has a relatively low PAPR value on the corresponding Type A RU52+RU26.

B4. A sequence set formed after head-tail reversing (reversed sorting) is performed on all basic sequences in the basic sequence set $S_{MRU106}^{A}$ is $S_{MRU106}^{B}$.

Each sequence in the basic sequence set $S_{MRU106}^{B}$ and a corresponding rotated sequence have relatively low PAPRs on a corresponding Type B RU106, and have relatively low PAPRs on all sub-RU resource units (for example, Type B RU52s and Type B RU26s) included in the Type B RU106. In addition, a multiple-resource unit sequence obtained by combining a first Type B RU52 and a Type B RU26 adjacent to the first Type B RU52 also has a relatively low PAPR value on a corresponding Type B RU.

Step 5: Determine a basic sequence set $S_{RU106A+RU26B}$ and a basic sequence set $S_{RU26A+RU106B}$.

A5. An EHT standard supports a resource unit combination of a Type A RU106 and a Type B RU26. Therefore, one basic sequence may be separately selected from $S_{RU106}^{A}$ obtained in A3 of step 3 and $S_{RU26}^{B}$ obtained in B1 of step 1 for splicing. A PAPR value of each rotated sequence corresponding to a spliced sequence is calculated. If the PAPR value of each rotated sequence is less than a specified threshold (the specified threshold may be a PAPR average value, median value, or the like of a data part of a combined RU of the Type A RU106 and the Type B RU26), the spliced sequence may be used as a basic sequence that meets a condition, and may be added to $S_{RU106A+RU26B}$.

The foregoing process is repeated, to traverse each possible spliced sequence and add a basic sequence with a relatively low PAPR value to the basic sequence set $S_{RU106A+RU26B}$. Optionally, a quantity of sequences in the basic sequence set $S_{RU106A+RU26B}$ may be limited. A limiting manner is the same as the limiting manner of the Type A RU26 basic sequence set described above, and details are not described again.

Each sequence in the basic sequence set $S_{RU106A+RU26B}$ and a corresponding rotated sequence have relatively low PAPRs on the corresponding Type A RU106, have relatively low PAPRs on all sub-RU resource units (for example, Type A RU52s and Type A RU26s) included in the Type A RU106, have relatively low PAPRs on the corresponding Type B RU26, and also have relatively low PAPRs on the combined RU of the Type A RU106 and the Type B RU26.

B5. The EHT standard also supports a resource unit combination of a Type A RU26 and a Type B RU106. Therefore, a sequence set formed after head-tail reversing (reversed sorting) is performed on all sequences in the basic sequence set $S_{RU106A+RU26B}$ is $S_{RU26A+RU106B}$. Each sequence in the basic sequence set $S_{RU26A+RU106B}$ and a corresponding rotated sequence have relatively low PAPRs on the corresponding Type B RU106, have relatively low PAPRs on all sub-RU resource units (for example, Type B RU52s and Type B RU26s) included in the Type B RU106, have relatively low PAPRs on the corresponding Type A RU26, and also have relatively low PAPRs on a combined RU of the Type B RU106 and the Type A RU26.

Step 6: Determine a Type A RU242 basic sequence set $S_{RU242}^{A}$ and a Type B RU242 basic sequence set $S_{242}^{B}$.

A6. One basic sequence is separately selected from the basic sequence set $S_{RU106A+RU26B}$ obtained in A5 of step 5 and the basic sequence set $S_{MRU106}^{A}$ obtained in A4 of step 4, and the selected basic sequences are spliced into a sequence of a Type A RU242 by considering possible values corresponding to four intermediate idle carriers. PAPR values that are on the Type A RU242 and that are of a plurality of rotated sequences corresponding to the spliced sequence of the Type A RU242 are calculated. If the PAPR value of each rotated sequence is less than a specified threshold (the specified threshold may be a PAPR average value, median value, or the like of a data part of the Type A RU242), the sequence of the Type A RU242 may be used as a basic sequence that meets a condition. The basic sequence may be added to the Type A RU242 basic sequence set.

The foregoing process is repeated, to traverse each possible sequence of the Type A RU242 and add a basic sequence with a relatively low PAPR value to the Type A RU242 basic sequence set. Optionally, a quantity of sequences in the Type A RU242 basic sequence set may be limited. A limiting manner is the same as the limiting manner of the Type A RU26 basic sequence set described above, and details are not described again.

A basic sequence in the Type A RU242 basic sequence set obtained in this manner and a corresponding rotated sequence have relatively low PAPR values on the Type A RU242, and have a low-PAPR characteristic of the basic sequence set $S_{RU106A+RU26B}$ described in A5 of step 5 and a low-PAPR characteristic of $S_{MRU106}^{A}$ described in A4 of step 4. Specifically, the basic sequence in the Type A RU242 basic sequence set and the rotated sequence have relatively low PAPR values on all sub-RU resource units (for example, Type A RU52s, Type A RU26s, and Type A RU106s) included in the Type A RU242, and also have relatively low PAPR values on all combined RUs included in the Type A RU242 (for example, a combination of a Type A RU106 and a Type B RU26, and a combination of a first Type A RU52 in a Type A RU106 and an adjacent Type A RU26).

B6. A sequence set formed after head-tail reversing (reversed sorting) is performed on all basic sequences in the Type A RU242 basic sequence set is the Type B RU242 basic sequence set $S_{RU242}{}^{B}$.

A basic sequence in the Type B RU242 basic sequence set obtained in this manner and a rotated sequence have relatively low PAPR values on the Type B RU242, and have a low-PAPR characteristic of the basic sequence set $S_{RU106B+RU26A}$ described in B5 of step 5 and a low-PAPR characteristic of $S_{MRU106}{}^{B}$ described in B4 of step 4. For specific content, refer to the foregoing description, and details are not described again.

Step 7: Determine an RU484 basic sequence set $S_{RU484.}$

One basic sequence is separately selected from the basic sequence set $S_{242}{}^{B}$ obtained in A6 of step 6 and the basic sequence set $S_{242}{}^{B}$ obtained in B6 of step 6, and the selected basic sequences are spliced into a sequence of an RU484. PAPR values that are on the RU484 and that are of a plurality of rotated sequences corresponding to the sequence of the RU484 are calculated. If the PAPR value of each rotated sequence is less than a specified threshold (the specified threshold may be a PAPR average value, median value, or the like of a data part of the Type A RU242), the sequence of the RU484 may be used as a basic sequence that meets a condition. The basic sequence may be added to the RU484 basic sequence set $S_{RU484}$.

The foregoing process is repeated, to traverse each possible sequence of the RU484 and add a basic sequence with a relatively low PAPR value to the RU484 basic sequence set $S_{RU484}$. Optionally, a quantity of sequences in the RU484 basic sequence set may be limited. A limiting manner is the same as the limiting manner of the Type A RU26 basic sequence set described above, and details are not described again.

A sequence in the RU484 basic sequence set obtained in this manner and a corresponding rotated sequence have relatively low PAPR values on the RU484, and have a low-PAPR characteristic of the basic sequence set $S_{242}{}^{A}$ described in A6 of step 6 and a low-PAPR characteristic of $S_{242}{}^{B}$ described in B6 of step 6. For specific content, refer to the foregoing description, and details are not described again.

Step 8: Determine an RU996 basic sequence set $S_{Ru996}$.

Two basic sequences are randomly selected from the basic sequence set $S_{RU484}$ obtained in step 7, and are spliced into a sequence of an RU996. PAPR values that are on the RU996 and that are of a plurality of rotated sequences corresponding to the sequence of the RU996 are calculated, and PAPRs that are on a combined RU and that are of the plurality of rotated sequences corresponding to the sequence of the RU996 are calculated. The combined RU includes a combination of a first RU484 in the RU996 and a first RU242 in a second RU484, a combination of the first RU484 in the RU996 and a second RU242 in the second RU484, a combination of the second RU484 in the RU996 and a first RU242 in the first RU484, and a combination of the second RU484 in the RU996 and a second RU242 in the first RU484.

If the PAPR values are all less than a specified threshold corresponding to each RU, the spliced sequence of the RU996 is used as a basic sequence that meets a condition. The basic sequence may be added to the RU996 basic sequence set. The specified threshold corresponding to each RU may be a PAPR average value, median value, or the like of a data part of each RU. For example, a threshold corresponding to a PAPR value of a rotated sequence on the RU996 is a PAPR average value, median value, or the like of a data part of the RU996. For another example, a threshold corresponding to a PAPR value of a rotated sequence on a combined RU of the first RU484 in the RU996 and the first RU242 in the second RU484 is a PAPR average value, median value, or the like of a data part of the combined RU of the first RU484 in the RU996 and the first RU242 in the second RU484.

It should be noted that the obtained sequence of the RU996 herein does not include a sequence value on a subcarrier between any two RU242s, and the sequence value on the subcarrier between any two RU242s only affects a PAPR of the sequence corresponding to the complete RU996, without affecting a PAPR of another smaller RU or a combined RU.

The foregoing process is repeated, to traverse each possible sequence of the RU996 and add a basic sequence with a relatively low PAPR value to the RU996 basic sequence set $S_{RU996}$. A sequence in the RU996 basic sequence set obtained in this manner and a corresponding rotated sequence have relatively low PAPR values on the RU996, have relatively low PAPR values on a combined RU of any RU242 and any RU484 in the RU996, and have a low-PAPR characteristic of the basic sequence set $S_{RU484}$ obtained in step 7.

Short basic sequences are gradually spliced, and a combination with a relatively low PAPR value is selected, to obtain a longer sequence with a low-PAPR characteristic. PAPRs of sequences within different RU sizes and sequences of multi-RU combinations are considered in the splicing from short to long. Therefore, when a formed sequence is used as an LTF, the sequence has a relatively low PAPR for a plurality of different resource unit sizes and a combination of a plurality of resource units. In a sequence selection process, symmetry of different RU types is used, thereby greatly reducing search computation of sequences.

After the foregoing process, LTF sequences with 80 MHz bandwidth may be obtained. The LTF sequences with 80 MHz bandwidth have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

In addition, further combination splicing may be performed to obtain an LTF sequence with bandwidth greater than 80 MHz (for example, 160 MHz bandwidth, 240 MHz bandwidth, or 320 MHz bandwidth). Certainly, further combination splicing may alternatively not be performed, but sequences with 80 MHz bandwidth are directly spliced. For example, an LTF sequence with 160 MHz bandwidth may be directly formed by splicing two sequences with 80 MHz bandwidth, an LTF sequence with 240 MHz bandwidth may be directly formed by splicing three sequences with 80 MHz bandwidth, and an LTF sequence with 320 MHz bandwidth may be directly formed by splicing four sequences with 80 MHz bandwidth. The LTF sequences with 160 MHz bandwidth, 240 MHz bandwidth, and 320 MHz bandwidth obtained in this manner also meet a characteristic that the sequences and corresponding rotated sequences have relatively low PAPR values on a single RU, relatively low PAPR values on a combined RU, and relatively low PAPR values on entire bandwidth.

Then, LTF sequences with 80 MHz bandwidth, 160 MHz bandwidth, 240 MHz bandwidth, and 320 MHz bandwidth in 2x and 4x modes are described.

(1) A possible 2x LTF sequence with 80 MHz bandwidth is denoted by 2xEHT_LTF_80M. Subcarrier numbers of the sequence 2xEHT_LTF_80M range from −500 to 500.

For example, 2xEHT_LTF_80M$_{-500:500}$={2xEHT_LTF_partA, $0_5$, 2xEHT_LTF_partB}, where −500 to 500 are subcarrier indexes (the indexes may also be referred to as numbers), $0_5$ represents five consecutive 0s, 2xEHT_LTF_partA includes 498 elements, and 2xEHT_LTF_partB includes 498 elements.

For example, the sequence 2xEHT_LTF_partB is obtained by reversing an order of the sequence 2xEHT_LTF_partA and then negating an even-numbered element in non-zero elements, that is, negating an element at a position that is an integer multiple of 4.

In an example, 2xEHT_LTF_partA=
{−1 0 −1 0 −1 0 1 0 1 0 −1 0 −1 0
1 0 1 0 1 0 1 0 1 0 −1 0 1 0
1 0 1 0 1 0 1 0 1 0 1 0 −1 0
1 0 −1 0 1 0 −1 0 −1 0 1 0 1 0
1 0 −1 0 1 0 −1 0 1 0 −1 0 −1 0
1 0 −1 0 −1 0 1 0 −1 0 −1 0 −1 0
1 0 1 0 1 0 −1 0 −1 0 −1 0 −1 0
1 0 −1 0 −1 0 1 0 1 0 −1 0 1 0
1 0 1 0 −1 0 −1 0 −1 0 −1 0 1 0
−1 0 1 0 1 0 −1 0 1 0 1 0 1 0
1 0 −1 0 −1 0 −1 0 1 0 −1 0 −1 0
1 0 1 0 −1 0 1 0 1 0 −1 0 1 0
−1 0 1 0 1 0 −1 0 1 0 −1 0 −1 0
1 0 1 0 1 0 1 0 1 0 1 0 1 0
−1 0 −1 0 1 0 1 0 1 0 1 0 −1 0
1 0 1 0 −1 0 1 0 −1 0 1 0 1 0
1 0 −1 0 1 0 −1 0 −1 0 −1 0 1 0
1 0 −1 0 1 0 −1 0 −1 0 −1 0 1 0
−1 0 −1 0 1 0 −1 0 −1 0 1 0 1 0
1 0 −1 0 −1 0 1 0 1 0 −1 0 1 0
−1 0 1 0 1 0 1 0 −1 0 −1 0 −1 0
−1 0 −1 0 −1 0 −1 0 1 0 1 0 −1 0
−1 0 −1 0 1 0 1 0 1 0 1 0 1 0
1 0 −1 0 1 0 −1 0 −1 0 1 0 −1 0
1 0 −1 0 1 0 −1 0 −1 0 1 0 1 0
−1 0 −1 0 −1 0 −1 0 1 0 1 0 −1 0
−1 0 −1 0 −1 0 −1 0 1 0 −1 0 1 0
−1 0 −1 0 1 0 −1 0 −1 0 −1 0 −1 0
−1 0 −1 0 1 0 −1 0 1 0 1 0 −1 0
−1 0 −1 0 1 0 1 0 −1 0 1 0 −1 0
−1 0 −1 0 1 0 −1 0 1 0 −1 0 −1 0
1 0 −1 0 −1 0 1 0 1 0 −1 0 1 0
1 0 1 0 −1 0 −1 0 1 0 −1 0 1 0
−1 0 −1 0 −1 0 1 0 1 0 1 0 −1 0
1 0 1 0 1 0 1 0 1 0 −1 0 1 0
1 0 1 0 −1 0 −1 0}

2xEHT_LTF_partB=
{0 −1 0 1 0 1 0 −1 0 1 0 1
0 1 0 −1 0 1 0 −1 0 1 0 1 0 1
0 −1 0 1 0 1 0 −1 0 1 0 1 0 1
0 1 0 1 0 −1 0 −1 0 1 0 −1 0 −1
0 −1 0 1 0 1 0 −1 0 −1 0 −1 0 1
0 11 0 1 0 1 0 1 0 −1 0 1 0 1
0 1 0 1 0 −1 0 −1 0 1 0 −1 0 −1
0 1 0 1 0 1 0 1 0 −1 0 1 0 −1
0 1 0 −1 0 −1 0 −1 0 1 0 1 0 1
0 1 0 1 0 −1 0 1 0 −1 0 1 0 1
0 −1 0 −1 0 1 0 −1 0 1 0 1 0 −1
0 −1 0 1 0 1 0 1 0 1 0 1 0 1
0 1 0 −1 0 −1 0 −1 0 −1 0 1 0 −1
0 1 0 −1 0 1 0 1 0 −1 0 1 0 1
0 −1 0 −1 0 1 0 −1 0 1 0 −1 0 1
0 −1 0 −1 0 1 0 −1 0 −1 0 −1 0 −1
0 −1 0 1 0 1 0 −1 0 −1 0 1 0 −1
0 −1 0 1 0 1 0 1 0 −1 0 −1 0 −1
0 1 0 −1 0 −1 0 −1 0 −1 0 1 0 1
0 −1 0 1 0 1 0 1 0 1 0 −1 0 1
0 1 0 1 0 1 0 1 0 −1 0 −1 0 −1
0 1 0 −1 0 1 0 1 0 −1 0 1 0 1
0 1 0 −1 0 1 0 −1 0 1 0 −1 0 1
0 1 0 1 0 1 0 −1 0 −1 0 −1 0 −1
0 −1 0 1 0 1 0 1 0 −1 0 −1 0 1
0 1 0 1 0 −1 0 1 0 1 0 −1 0 1
0 −1 0 −1 0 −1 0 1 0 1 0 1 0 1
0 −1 0 1 0 −1 0 −1 0 1 0 −1 0 −1
0 −1 0 1 0 1 0 −1 0 −1 0 −1 0 1
0 −1 0 1 0 1 0 −1 0 1 0 1 0 −1
0 1 0 1 0 1 0 −1 0 −1 0 −1 0 1
0 1 0 1 0 1 0 1 0 1 0 −1 0 1
0 1 0 1 0 1 0 1 0 1 0 1 0 1
0 1 0 −1 0 1 0 −1 0 1 0 −1 0 −1
0 −1 0 1 0 −1 0 1 0 −1 0 −1 0 1
0 1 0 −1 0 −1 0 1 0 −1}

It may be learned from 2xEHT_LTF_partA and 2xEHT_LTF_partB that:

1. 2xEHT_LTF_partA is (only the last 20 elements are listed):

. . . 1, 0, 1, 0, 1, 0, 1, 0, −1, 0, 1, 0, 1, 0, 1, 0, −1, 0, −1, 0.

2. A reverse order of 2xEHT_LTF_partA is:

0, −1, 0, −1, 0, 1, 0, 1, 0, 1, 0, −1, 0, 1, 0, 1, 0, 1, 0, 1 . . . .

3. 2xEHT_LTF_partB is obtained by negating an even-numbered element in non-zero elements in the reverse order of 2xEHT_LTF_partA, and 2xEHT_LTF_partB is 0, −1, 0, 1, 0, 1, 0, 0−1, 0, 1, 0, 1, 0, 1, 0, −1, 0, 1, 0 , −1, . . . .

That is, the sequence 2xEHT_LTF_partB is obtained by reversing an order of the sequence 2xEHT_LTF_partA and then negating an element at a position that is in the sequence and that is an integer multiple of 4.

(2) A possible 2x LTF sequence with 160 MHz bandwidth is denoted by 2xEHT_LTF_160M. 2xEHT_LTF_160M may be constructed based on 2xEHT_LTF_80M described in (1), and subcarrier numbers of the sequence 2xEHT_LTF_160M range from −1012 to 1012.

For example, 2xEHT_LTF_160M$_{-1012:1012}$=
{2xEHT_LTF_80M$_{-500:500}$, $0_{23}$, 2xEHT_LTF_80M$_{-500:500}$}.

Herein, 2xEHT_LTF_80M$_{-500:500}$ in 2xEHT_LTF_160M$_{-1012:1012}$ is 2xEHT_LTF_80M$_{-500:500}$ in (1); and $0_{23}$ represents 23 consecutive 0s.

(3) A possible 2x LTF sequence with 320 MHz bandwidth is denoted by 2xEHT_LTF_320M. 2xEHT_LTF_320M is constructed based on 2xEHT_LTF_160M described in (2), and subcarrier numbers of the sequence 2xEHT_LTF_320M range from −2036 to 2036.

For example, 2xEHT_LTF_320M$_{2036:2036}$=
{−2xEHT_LTF_$0_{23}$, 2xEHT_LTF_160M$_{-1012:1012}$}.

Herein, −2xEHT_LTF_160M$_{-1012:1012}$ represents negation (that is, multiplied by −1) of all elements in the sequence 2xEHT_LTF_160M$_{-1012:1012}$; 2xEHT_LTF_160M$_{-1012:1012}$ in 2xEHT_LTF_320M$_{-2036:2036}$ is 2xEHT_LTF_160M$_{-1012:1012}$ in (2); and $0_{23}$ represents 23 consecutive 0s.

(4) A possible 2x LTF sequence with 240 MHz bandwidth is denoted by 2xEHT_LTF_240M. 2xEHT_LTF_240M is constructed based on 2xEHT_LTF_160M described in (2) and 2xEHT_LTF_80M described in (1). For example, when an 80 MHz channel in a 320 MHz channel is missing, a 240 MHz channel is formed, and the formed 240 MHz channel may be continuous or discontinuous in frequency domain. A punctured 2x EHT LTF sequence corresponding to 320 MHz bandwidth may be used as a sequence with 240 MHz bandwidth. Subcarrier numbers of the sequence 2xEHT_LTF_240M range from −1524 to 1524.

For example, 2xEHT_LTF_240M$_{-1524:1524}$= {−2xEHT_LTF_160M$_{-1012:1012}$, $0_{23}$, 2xEHT_LTF_80M$_{-500:500}$}

For example, 2xEHT_LTF_240M$_{-1524:1524}$= {−2xEHT_LTF_80M$_{-500:500}$, $0_{23}$, 2xEHT_LTF_160M$_{-1012:1012}$}.

Herein, −2xEHT_LTF_80M$_{-500:500}$ represents negation (that is, multiplied by −1) of all elements in the sequence 2xEHT_LTF_80M$_{-500:500}$; −2xEHT_LTF_160M$_{-1012:1012}$ represents negation (that is, multiplied by −1) of all elements in the sequence 2xEHT_LTF_160M$_{-1012:1012}$; and $0_{23}$ represents 23 consecutive 0s.

In 2xEHT_LTF_240M$_{-1524:1524}$ in the two examples in (4), 2xEHT_LTF_80M$_{-500:500}$ is 2xEHT_LTF_80M$_{-500:500}$ in (1), and 2xEHT_LTF_160M$_{-1012:1012}$ is 2xEHT_LTF_160M$_{-1012:1012}$ in (2).

(5) Sequences obtained by performing one or more of the following operations on the 2x LTF sequences with various bandwidth described in (1) to (4), for example, 2xEHT_LTF_80M$_{-500:500}$, 2xEHT_LTF_60M$_{-1012:1012}$, 2xEHT_LTF_240M$_{-1524:1524}$, and 2xEHT_LTF_320M$_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence. It is assumed that a sequence is 123456, and a sequence obtained by reversing an order of elements in the sequence is 654321.

Operation (3): Multiply an even-numbered or odd-numbered element in non-zero elements by −1.

As shown in Table 8 below, Table 8 provides a comparison result between PAPR median values (a third column) of a BPSK (a modulation mode) data part and maximum PAPR values (a second column) in PAPRs that are of the sequence 2xEHT_LTF_320M described in (3) and a plurality of corresponding rotated sequences and that are on different single-RUs, various combined RUs, and entire bandwidth.

For example, an RU26 is used as an example. An 80 MHz sequence includes 36 RU26s, that is, 36 PAPRs. One sequence may be rotated to obtain four sequences. Therefore, 36*4=144 PAPRs may be obtained by considering rotated sequences. A maximum value of the 144 PAPRs is 5.26. 2xEHT_LTF_160M, 2xEHT_LTF_240M, and 2xEHT_LTF_320M are obtained based on the sequence 2xEHT_LTF_80M. PAPR values of 2xEHT_LTF_160M, 2xEHT_LTF_240M, and 2xEHT_LTF_320M on the RU26s are the same as the PAPR values of 2xEHT_LTF_80M on the RU26s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 8 that values in the second column are all less than values in the third column. That is, maximum PAPR values on different single-RUs, various combined RUs, and entire bandwidth under considered influence of phase rotation are all less than corresponding PAPR median values of a BPSK data part. Therefore, it is verified that the LTF sequences with 80 MHz bandwidth, 160 MHz bandwidth, 240 MHz bandwidth, and 320 MHz bandwidth in the 2x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 8

Comparison between PAPR maximum values of 2x EHT LTF sequences on a single RU, a combined RU, and entire bandwidth under considered influence of a plurality of P-matrices and PAPR median values of a BPSK data part

| RU Size | Max PAPR (dB) | Median PAPR of BPSK Data (dB) |
|---|---|---|
| RU26 | 5.26 | 5.89 |
| RU52 | 4.58 | 6.71 |
| RU52 + RU26 | 5.19 | 7.10 |
| RU106 | 5.19 | 7.29 |
| RU106 + RU26 | 5.98 | 7.44 |
| RU242 | 5.42 | 7.94 |
| RU484 | 5.51 | 8.44 |
| RU484 + RU242 | 6.98 | 8.83 |
| RU996 | 5.78 | 8.84 |
| RU996 + RU484 | 7.52 | 9.17 |
| RU2*996 | 8.54 or 8.56 | 9.27 or 9.28 |
| RU2*996 + RU484 | 8.64 or 9.15 | 9.50 |
| RU3*996 | 9.04 | 9.54 |
| RU3*996 + RU484 | 9.48 | 9.55 |
| RU4*996 | 9.07 | 9.60 |

The LTF sequences with 80 MHz bandwidth, 160 MHz bandwidth, 240 MHz bandwidth, and 320 MHz bandwidth in the 2x mode are described above. Then, LTF sequences with 80 MHz bandwidth, 160 MHz bandwidth, 240 MHz bandwidth, and 320 MHz bandwidth in the 4x mode are described.

(6) A possible 4x LTF sequence with 80 MHz bandwidth is denoted by 4xEHT_LTF_80M. Subcarrier numbers of the sequence 4xEHT_LTF_80M range from −500 to 500.

For example, 4xEHT_LTF_80M$_{-500:500}$={4xEHT_LTF_partA, $0_5$, 4xEHT_LTF_partB}.

Herein, −500 to 500 are subcarrier indexes (the indexes may also be referred to as numbers), $0_5$ represents five consecutive 0s, 4xEHT_LTF_partA includes 498 elements, and 4xEHT_LTF_partB includes 498 elements.

For example, the sequence 4xEHT_LTF_partB is obtained by reversing an order of the sequence 4xEHT_LTF_partA and then negating an element value at an even-numbered position, that is, negating an element at a position that is an integer multiple of 2.

In an example, 4xEHT_LTF_partA=
{−1 −1 −1 1 1 −1 1 1 −1 −1 1 −1 1 −1
−1 1 −1 1 −1 1 1 1 1 1 −1 −1 −1 −1
−1 1 1 −1 −1 1 −1 −1 1 −1 1 −1 −1 1
−1 1 −1 1 −1 1 1 1 −1 −1 −1 −1 −1 −1
1 1 −1 −1 −1 −1 1 1 −1 −1 −1 1 −1 1
1 1 −1 −1 1 −1 −1 −1 −1 1 −1 1 −1 −1
1 1 −1 1 −1 −1 1 1 1 −1 1 −1 −1 −1
1 1 1 1 1 1 1 −1 1 −1 1 1 1 −1
−1 −1 1 −1 −1 −1 −1 1 1 −1 −1 1 −1 −1
1 −1 −1 1 −1 1 −1 1 1 −1 1 −1 1 −1
1 −1 −1 −1 −1 1 1 −1 1 1 −1 1 1 −1
1 1 1 1 −1 −1 −1 1 −1 1 1 1 1 1
1 1 −1 1 −1 −1 −1 −1 1 −1 1 1 1 −1
−1 −1 1 1 −1 −1 1 1 1 1 −1 1 1 −1
−1 −1 1 1 1 −1 1 −1 1 1 −1 −1 −1 −1
−1 −1 1 1 1 1 1 1 1 1 1 1 1 1
1 1 1 1 1 1 1 1 1 1 1 1 1 1
−1 1 −1 1 1 1 −1 1 1 −1 −1 1 −1 1
1 −1 −1 1 −1 −1 −1 1 1 1 −1 1 −1 1
1 −1 1 −1 −1 −1 1 1 −1 1 −1 1 1 −1
−1 1 1 −1 1 1 1 −1 1 −1 1 1 1 1
1 1 1 1 1 1 1 1 1 1 1 1 1 1
1 1 1 1 −1 −1 −1 −1 1 1 1 1 1 1
−1 1 1 1 1 1 1 1 1 1 1 1 1 1
1 1 1 −1 −1 −1 1 1 −1 1 1 −1 −1 1
−1 1 −1 1 1 1 −1 1 1 1 −1 1 −1 −1
1 −1 1 1 1 1 1 1 1 1 1 1 1 1
−1 −1 −1 1 1 1 1 1 −1 −1 −1 1 1 1
1 −1 1 1 −1 −1 −1 1 −1 −1 1 1 −1 1
−1 1 1 1 1 1 −1 −1 1 1 1 1 1 −1
1 1 −1 −1 −1 1 −1 −1 −1 1 −1 1 −1 1
1 1 1 1 1 1 1 1 −1 −1 −1 1 1 −1
1 1 1 −1 −1 1 −1 1 1 −1 −1 1 −1 1
1 1 1 1 1 1 1 1 1 1 1 1 −1 −1
−1 1 1 −1 1 −1 1 1 1 −1 1 −1 −1 1
−1 −1 1 1 1 −1 1 1}

4xEHT_LTF_partB=
{1 −1 −1 −1 1 −1 −1 1 1 1 −1 −1
−1 −1 1 1 1 1 1 1 1 1 1 1 1 1
−1 −1 1 1 −1 1 −1 1 −1 1 1 1 1 1
−1 −1 1 1 1 1 −1 −1 1 −1 −1 −1 1 1
−1 1 1 −1 1 −1 1 −1 1 −1 1 1 1 1
1 1 −1 1 1 1 −1 1 1 −1 −1 −1 1 −1
1 −1 −1 1 1 −1 1 −1 1 1 1 1 1 −1
−1 1 1 1 −1 1 1 −1 −1 −1 1 −1 1 1
−1 1 1 −1 1 −1 1 1 −1 1 1 −1 −1 1
1 1 −1 1 −1 1 1 1 1 1 1 1 1 1
1 −1 1 1 1 −1 1 1 1 1 1 1 −1 −1
1 1 1 −1 −1 1 −1 −1 1 −1 −1 1 −1 1
−1 1 −1 1 −1 −1 −1 −1 1 1 −1 1 −1 1
−1 −1 −1 1 −1 1 1 −1 1 −1 −1 −1 1 1
−1 −1 1 1 −1 1 −1 1 −1 1 1 −1 1 −1
−1 −1 −1 −1 1 −1 −1 −1 1 1 −1 −1 1 1
1 1 1 −1 −1 1 −1 −1 −1 −1 1 1 1 1
1 −1 1 1 −1 1 1 1 −1 −1 1 1 1 1
−1 −1 1 1 1 −1 1 1 1 1 1 1 −1 1
−1 1 −1 −1 1 1 −1 1 1 −1 −1 −1 1 1
1 −1 −1 1 −1 1 −1 −1 −1 1 −1 1 −1 1
1 −1 −1 −1 −1 −1 1 −1 −1 1 −1 −1 1
1 −1 1 −1 −1 1 1 −1 −1 1 −1 −1 1 −1
−1 −1 −1 1 −1 1 1 1 1 −1 1 −1 1 −1
1 1 1 1 −1 1 1 −1 1 −1 −1 −1 1 1
1 −1 −1 −1 1 1 1 1 1 1 1 1 1 1
−1 −1 1 1 1 1 1 1 −1 −1 −1 1 1 1
−1 −1 1 1 −1 1 −1 −1 −1 1 −1 −1 1 −1
−1 −1 −1 −1 1 −1 1 −1 1 −1 −1 1 −1 −1
−1 −1 1 −1 −1 1 1 1 1 −1 −1 1 1 1
1 1 −1 1 −1 −1 −1 1 1 −1 1 1 1 1
−1 1 1 −1 −1 1 −1 1 1 −1 −1 1 −1 1
−1 1 1 −1 1 1 1 1 1 1 1 1 −1 −1
−1 −1 −1 1 1 1 −1 −1 1 1 −1 1 −1 1
1 −1 1 −1 1 1 1 1 1 1 −1 −1 −1 −1
−1 1 1 −1 −1 −1 1 1 −1 1}

(7) A possible 4x LTF sequence with 160 MHz bandwidth is denoted by 4xEHT_LTF_160M. 4xEHT_LTF_160M may be constructed based on 4xEHT_LTF_80M described in (6), and subcarrier numbers of the sequence 4xEHT_LTF_160M range from −1012 to 1012.

For example, $4xEHT\_LTF\_160M_{-1012:1012}=\{-4xEHT\_LTF\_80M_{-500:500},\ 0_{23},\ 4xEHT\_LTF\_80M_{-500:500}\}$.

Herein, $-4xEHT\_LTF\_80M_{-500:500}$ represents negation (multiplied by −1) of all elements in the sequence $4xEHT\_LTF\_80M_{-500:500}$; $0_{23}$ represents 23 consecutive 0s; and $4xEHT\_LTF\_80M_{-500:500}$ in $4xEHT\_LTF\_160M_{-1012:1012}$ is $4xEHT\_LTF\_80M_{-500:500}$ in (6).

(8) A possible 4x LTF sequence with 320 MHz bandwidth is denoted by 4xEHT_LTF_320M. 4xEHT_LTF_320M is constructed based on 4xEHT_LTF_160M described in (7), and subcarrier numbers of the sequence 4xEHT_LTF_320M range from −2036 to 2036.

For example, $4xEHT\_LTF\_320M_{-2036:2036}=\{4xEHT\_LTF\_160M_{-1012:1012},\ 0_{23},\ -4xEHT\_LTF\_160M_{-1012:1012}\}$.

Herein, $-4xEHT\_LTF\_160M_{-1012:1012}$ represents negation (that is, multiplied by −1) of all elements in the sequence $4xEHT\_LTF\_160M_{-1012:1012}$; $0_{23}$ represents 23 consecutive 0s; and $4xEHT\_LTF\_160M_{-1012:1012}$ in $4xEHT\_LTF\_320M_{-2036:2036}$ is $4xEHT\_LTF\_160M_{-1012:1012}$ in (7).

(9) A possible 4x LTF sequence with 240 MHz bandwidth is denoted by 4xEHT_LTF_240M. 4xEHT_LTF_240M is constructed based on 4xEHT_LTF_160M described in (7) and 4xEHT_LTF_80M described in (6). For example, when an 80 MHz channel in a 320 MHz channel is missing, a 240 MHz channel is formed, and the formed 240 MHz channel may be continuous or discontinuous in frequency domain. A punctured 4x EHT LTF sequence corresponding to 320 MHz bandwidth may be used as a sequence with 240 MHz bandwidth. Subcarrier numbers of the sequence 4xEHT_LTF_240M range from −1524 to 1524.

For example, $4xEHT\_LTF\_240M_{-1524:1524}=\{4xEHT\_LTF\_160M_{-1012:1012},\ 0_{23},\ 4xEHT\_LTF\_80M_{-500:500}\}$.

For example, $4xEHT\_LTF\_240M_{-1524:1524}=\{-4xEHT\_LTF\_80M_{-500:500},\ 0_{23},\ 4xEHT\_LTF\_160M_{-1012:1012}\}$.

Herein, $-4xEHT\_LTF\_80M_{-500:500}$ represents negation (that is, multiplied by −1) of all elements in the sequence $4xEHT\_LTF\_80M_{-500:500}$; and $0_{23}$ represents 23 consecutive 0s.

In $4xEHT\_LTF\_240M_{-1524:1524}$ in the two examples in (9), $4xEHT\_LTF\_80M_{-500:500}$ is $4xEHT\_LTF\_80M_{-500:500}$ in (6), and $4xEHT\_LTF\_160M_{-1012:1012}$ is $4xEHT\_LTF\_160M_{-1012:1012}$ in (7).

(10) Sequences obtained by performing one or more of the following operations on the 4x LTF sequences with various bandwidth described in (6) to (9), for example, $4xEHT\_LTF\_80M_{-500:500}$, $4x\ EHT\_LTF160M_{-1012:1012}$, $4xEHT\_LTF\_240M_{-1524:1524}$, and $4xEHT\_LTF\_320M_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence.

Operation (3): Multiply an element at an even-numbered or odd-numbered position in a sequence by −1.

As shown in Table 9 below, Table 9 provides a comparison result between PAPR median values (a third column) of a BPSK (a modulation mode) data part and maximum PAPR values (a second column) in PAPRs that are of the sequence 4xEHT_LTF_320M described in (8) and a plurality of corresponding rotated sequences and that are on different single-RUs, various combined RUs, and entire bandwidth.

For example, an RU52 is used as an example. An 80 MHz sequence includes 16 RU52s, that is, 16 PAPRs. One sequence may be rotated to obtain four sequences. Therefore, 16*4=64 PAPRs may be obtained by considering rotated sequences. A maximum value of the 64 PAPRs is 4.97. 4xEHT_LTF_160M, 4xEHT_LTF_240M, and 4xEHT_LTF_320M are obtained based on the sequence 4xEHT_LTF_80M. PAPR values of 4xEHT_LTF_160M, 4xEHT_LTF_240M, and 4xEHT_LTF_320M on the RU52s are the same as the PAPR values of 4xEHT_LTF_80M on the RU52s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 9 that values in the second column are all less than values in the third column. That is, maximum PAPR values on different single-RUs, various combined RUs, and entire bandwidth under considered influence of phase rotation are all less than corresponding PAPR median values of a BPSK data part. Therefore, it is verified that the LTF sequences with 80 MHz bandwidth, 160 MHz bandwidth, 240 MHz bandwidth, and 320 MHz bandwidth in the 4x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 9

Comparison between PAPR maximum values of 4x EHT LTF sequences on a single RU, a combined RU, and entire bandwidth under considered influence of a plurality of P-matrices and PAPR median values of a BPSK data part

| RU Size | Max PAPR | Median PAPR of BPSK Data |
|---|---|---|
| RU26 | 3.98 | 5.89 |
| RU52 | 4.97 | 6.71 |
| RU52 + RU26 | 5.41 | 7.10 |
| RU106 | 5.45 | 7.29 |
| RU106 + RU26 | 5.65 | 7.44 |
| RU242 | 5.66 | 7.94 |
| RU484 | 6.53 | 8.44 |
| RU484 + RU242 | 7.62 | 8.83 |
| RU996 | 6.36 | 8.84 |
| RU996 + RU484 | 8.39 | 9.17 |

TABLE 9-continued

Comparison between PAPR maximum values of 4x EHT LTF sequences on a single RU, a combined RU, and entire bandwidth under considered influence of a plurality of P-matrices and PAPR median values of a BPSK data part

| RU Size | Max PAPR | Median PAPR of BPSK Data |
|---|---|---|
| RU2*996 | 8.71 or 9.37 | 9.27 or 9.28 |
| RU2*996 + RU484 | 9.04 or 9.57 | 9.50 |
| RU3*996 | 9.37 | 9.54 |
| RU3*996 + RU484 | 9.79 | 9.55 |
| RU4*996 | 9.40 | 9.60 |

(11) A possible 4x LTF sequence with 80 MHz bandwidth is denoted by 4xEHT_LTF_80M. Subcarrier numbers of the sequence 4xEHT_LTF_80M range from −500 to 500.

For example, $4xEHT\_LTF\_80M_{-500:500}$={4xEHT_LTF_partA, $0_5$, 4xEHT_LTF_partB}.

Herein, −500 to 500 are subcarrier indexes (the indexes may also be referred to as numbers), $0_5$ represents five consecutive 0s, 4xEHT_LTF_partA includes 498 elements, and 4xEHT_LTF_partB includes 498 elements.

For example, the sequence 4xEHT_LTF_partB is obtained by reversing an order of the sequence 4xEHT_LTF_partA and then negating an element value at an even-numbered position, that is, negating an element at a position that is an integer multiple of 2.

In an example, 4xEHT_LTF_partA=
{1 1 1 1 1 1 1 1 1 1 1 −1 −1 1
1 −1 1 −1 −1 −1 1 −1 1 1 −1 1 −1 −1
1 −1 1 1 1 1 1 1 1 1 1 1 1 1
1 1 −1 −1 1 −1 1 1 1 1 −1 −1 −1 1
−1 −1 1 −1 −1 1 1 1 1 1 1 1 1 1
1 1 −1 1 −1 1 −1 −1 1 1 1 −1 1 −1
1 1 1 1 −1 1 −1 1 1 1 1 1 −1 1
−1 −1 1 1 1 −1 −1 1 1 1 −1 −1 −1 −1
1 1 1 1 1 −1 1 1 −1 1 1 1 −1 −1
1 1 −1 1 −1 1 −1 1 −1 −1 1 1 −1 −1
1 −1 1 1 1 1 1 1 1 1 1 1 1 1
−1 1 −1 1 1 −1 1 1 1 1 −1 1 1 1
1 −1 −1 −1 1 1 1 1 1 1 −1 1 −1 −1
1 1 −1 1 −1 −1 1 1 1 −1 1 −1 1 1
1 1 −1 1 −1 −1 1 1 −1 1 1 1 1 −1
−1 1 −1 −1 −1 1 −1 1 −1 −1 −1 1 1 1
−1 1 −1 −1 1 1 1 −1 1 1 −1 −1 −1 −1
−1 −1 −1 1 −1 −1 −1 1 −1 1 1 −1 −1 1
−1 1 1 1 1 1 1 −1 −1 1 1 1 1 −1
1 1 1 −1 1 −1 −1 −1 1 1 1 −1 −1 1
1 −1 1 −1 −1 1 1 −1 −1 −1 1 1 1 1
1 1 −1 1 −1 1 1 −1 1 −1 −1 1 −1 1
1 −1 −1 −1 1 1 1 1 1 1 −1 1 −1 1
−1 1 −1 1 1 1 −1 1 1 1 −1 −1 1 −1
−1 −1 1 1 1 1 1 1 1 1 1 1 −1 −1
1 −1 −1 −1 −1 1 1 −1 −1 −1 −1 1 −1 1
1 1 1 −1 1 1 1 1 1 1 1 1 1 1
1 −1 −1 1 −1 1 1 −1 1 1 1 1 1 −1
1 −1 −1 −1 −1 1 −1 1 −1 −1 −1 1 1 −1
−1 −1 1 −1 −1 1 −1 −1 1 −1 1 1 −1 −1
−1 1 −1 −1 −1 1 1 1 1 1 1 1 1 1
1 1 −1 −1 1 −1 −1 −1 −1 1 1 1 1 1
−1 −1 1 1 1 −1 1 −1 −1 1 1 −1 1 1
1 1 −1 −1 1 1 −1 −1 1 −1 1 −1 −1 1
−1 1 −1 −1 −1 1 −1 1 1 1 −1 1 1 1
−1 −1 −1 −1 1 1 1 −1}

4xEHT_LTF_partB=
{−1 −1 1 −1 −1 1 −1 1 1 −1 1 1 1 −1
1 1 1 1 −1 1 1 1 1 1 −1 −1 −1 −1

−1 1 1 −1 −1 1 1 −1 1 −1 −1 −1 1 1
−1 −1 −1 −1 1 −1 −1 1 1 −1 1 −1 1 1
−1 1 −1 −1 −1 1 1 −1 1 −1 1 1 −1 1
−1 1 1 1 −1 1 1 1 −1 1 1 −1 −1 −1
−1 1 1 1 −1 −1 −1 1 −1 −1 1 1 −1 1
1 1 1 1 −1 1 −1 −1 −1 −1 1 −1 1 −1
−1 −1 1 1 1 1 −1 −1 −1 1 −1 1 −1 −1
1 1 −1 −1 −1 −1 1 −1 1 1 1 1 −1 1
−1 −1 1 1 −1 1 −1 −1 −1 1 1 1 1 −1
−1 1 −1 1 −1 −1 −1 1 −1 −1 −1 1 1 −1
1 1 1 −1 1 1 1 1 1 1 1 1 1 −1
1 −1 1 −1 −1 1 −1 −1 1 1 1 1 −1 −1
−1 −1 1 1 1 1 1 −1 1 −1 1 −1 −1 1
−1 −1 1 1 −1 −1 −1 −1 1 1 −1 −1 1 −1
−1 1 −1 −1 −1 −1 1 −1 −1 −1 1 −1 1 1
−1 −1 1 −1 1 −1 1 1 1 1 −1 −1 1 1
1 1 −1 1 1 1 −1 1 −1 1 −1 1 1 −1
−1 −1 1 −1 −1 1 1 1 1 −1 1 1 −1 1
1 1 1 1 −1 1 1 1 −1 −1 1 −1 1 1
1 −1 −1 1 1 1 1 1 1 1 1 1 1 1
1 −1 −1 1 1 1 1 −1 −1 1 1 1 1 −1
1 −1 1 −1 −1 1 −1 −1 1 −1 1 1 1 −1
1 −1 −1 −1 1 1 1 1 1 1 −1 1 −1 1
−1 1 −1 −1 1 −1 −1 −1 −1 1 1 −1 −1 1
1 1 1 1 1 1 1 −1 −1 1 1 −1 1 1
1 −1 −1 −1 1 −1 1 −1 −1 1 −1 1 1 −1
1 1 −1 −1 1 −1 −1 1 1 1 1 −1 1 −1
1 1 1 1 1 −1 1 −1 −1 −1 −1 −1 1 −1
−1 1 1 1 1 1 1 −1 1 −1 1 1 −1 1
−1 1 1 1 −1 −1 −1 1 1 1 −1 1 1 −1
1 −1 −1 −1 −1 1 1 −1 −1 1 1 −1 −1 1
−1 −1 −1 −1 −1 −1 −1 −1 −1 1 1 1 1 −1
−1 −1 −1 1 −1 −1 −1 −1 1 1 −1 −1 1 −1
−1 1 −1 1 −1 1 −1 1}

(12) A possible 4x LTF sequence with 160 MHz bandwidth is denoted by 4xEHT_LTF_160M. 4xEHT_LTF_160M may be constructed based on 4xEHT_LTF_80M described in (11), and subcarrier numbers of the sequence 4xEHT_LTF_160M range from −1012 to 1012.

For example, $4xEHT\_LTF\_160M_{-1012:1012}$={4xEHT_LTF_partA, $0_5$, 4xEHT_LTF_partB, $0_{23}$, 4xEHT_LTF_partA, $0_5$, −4xEHT_LTF_partB}.

Herein, −4xEHT_LTF_partB represents negation (multiplied by −1) of all elements in the sequence 4xEHT_LTF_partB; $0_{23}$ represents 23 consecutive 0s; $0_5$ represents five consecutive 0s; and 4xEHT_LTF_partA and 4xEHT_LTF_partB in $4xEHT\_LTF\_160M_{-1012:1012}$ are 4xEHT_LTF_partA and 4xEHT_LTF_partB described in (11).

(13) A possible 4x LTF sequence with 320 MHz bandwidth is denoted by 4xEHT_LTF_320M. 4xEHT_LTF_320M is constructed based on 4xEHT_LTF_160M described in (12), and subcarrier numbers of the sequence 4xEHT_LTF_320M range from −2036 to 2036.

For example, $4xEHT\_LTF\_320M_{-2036:2036}$={$4xEHT\_LTF\_160M_{-1012:1012}$, $0_{23}$, $-4xEHT\_LTF\_160M_{-1012:1012}$}.

Herein, $-4xEHT\_LTF\_160M_{-1012}$ 1012 represents negation (that is, multiplied by −1) of all elements in the sequence $4xEHT\_LTF\_160M_{-1012:1012}$; $0_{23}$ represents 23 consecutive 0s; and $4xEHT\_LTF\_160M_{-1012:1012}$ in $4xEHT\_LTF\_320M_{-2036:2036}$ is $4xEHT\_LTF\_160M_{-1012:1012}$ in (12).

(14) A possible 4x LTF sequence with 240 MHz bandwidth is denoted by 4xEHT_LTF_240M.

4xEHT_LTF_240M is constructed based on 4xEHT_LTF_160M described in (12) and 4xEHT_LTF_80M described in (11). For example, when an 80 MHz channel in a 320 MHz channel is missing, a 240 MHz channel is formed, and the formed 240 MHz channel may be continuous or discontinuous in frequency domain. A punctured 4x EHT LTF sequence corresponding to 320 MHz bandwidth may be used as a sequence with 240 MHz bandwidth. Subcarrier numbers of the sequence 4xEHT_LTF_240M range from −1524 to 1524.

For example, $4xEHT\_LTF\_240M_{-1524:1524}$={$4xEHT\_LTF\_160M_{-1012:1012}$, $0_{23}$, $-4xEHT\_LTF\_80M_{-500:500}$}.

Herein, $-4xEHT\_LTF\_80M_{-500:500}$ represents negation (that is, multiplied by −1) of all elements in the sequence $4xEHT\_LTF\_80M_{-500:500}$; and $0_{23}$ represents 23 consecutive 0s.

In $4xEHT\_LTF\_240M_{-1524:1524}$ in the two examples in (14), $4xEHT\_LTF\_80M_{-500:500}$ is $4xEHT\_LTF\_80M_{-500:500}$ in (11), and $4xEHT\_LTF\_160M_{-1012:1012}$ is $4xEHT\_LTF\_160M_{-1012:1012}$ in (12).

(15) Sequences obtained by performing one or more of the following operations on the 4x LTF sequences with various bandwidth described in (11) to (14), for example, $4xEHT\_LTF\_80M_{-500:500}$, $4xEHT\_LTF\_160M_{-1012:1012}$, $4xEHT\_LTF\_240M_{-1524:1524}$, and $4xEHT\_LTF\_320M_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence.

Operation (3): Multiply an element at an even-numbered or odd-numbered position in a sequence by −1.

As shown in Table 10 below, Table 10 provides a comparison result between PAPR median values (a third column) of a BPSK (a modulation mode) data part and maximum PAPR values (a second column) in PAPRs that are of the sequence 4xEHT_LTF_320M described in (13) and a plurality of corresponding rotated sequences and that are on different single-RUs, various combined RUs, and entire bandwidth.

For example, an RU52 is used as an example. An 80 MHz sequence includes 16 RU52s, that is, 16 PAPRs. One sequence may be rotated to obtain four sequences. Therefore, 16*4=64 PAPRs may be obtained by considering rotated sequences. A maximum value of the 64 PAPRs is 4.95. 4xEHT_LTF_160M, 4xEHT_LTF_240M, and 4xEHT_LTF_320M are obtained based on the sequence 4xEHT_LTF_80M. PAPR values of 4xEHT_LTF_160M, 4xEHT_LTF_240M, and 4xEHT_LTF_320M on the RU52s are the same as the PAPR values of 4xEHT_LTF_80M on the RU52s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 10 that values in the second column are all less than values in the third column. That is, maximum PAPR values on different single-RUs, various combined RUs, and entire bandwidth under considered influence of phase rotation are all less than corresponding PAPR median values of a BPSK data part. Therefore, it is verified that the LTF sequences with 80 MHz bandwidth, 160 MHz bandwidth, 240 MHz bandwidth, and 320 MHz bandwidth in the 4x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 10

Comparison between PAPR maximum values of 4x EHT LTF sequences on a single RU, a combined RU, and entire bandwidth under considered influence of a plurality of P-matrices and PAPR median values of a BPSK data part

| RU Size | Max PAPR | Median PAPR of BPSK Data |
|---|---|---|
| RU26 | 4.49 | 5.89 |
| RU52 | 4.95 | 6.71 |
| RU52 + RU26 | 5.79 | 7.10 |
| RU106 | 5.13 | 7.29 |
| RU106 + RU26 | 5.33 | 7.44 |
| RU242 | 6.12 | 7.94 |
| RU484 | 6.41 | 8.44 |
| RU484 + RU242 | 7.95 | 8.83 |
| RU996 | 6.34 | 8.84 |
| RU996 + RU484 | 8.79 | 9.17 |
| RU2*996 | 6.32 | 9.27 or 9.28 |
| RU2*996 + RU484 | 8.91 | 9.50 |
| RU3*996 | 8.29 | 9.54 |
| RU3*996 + RU484 | 9.29 | 9.55 |
| RU4*996 | 8.97 | 9.60 |

(16) A possible 4x LTF sequence with 80 MHz bandwidth is denoted by 4xEHT_LTF_80M. Subcarrier numbers of the sequence 4xEHT_LTF_80M range from −500 to 500.

For example, $4xEHT\_LTF\_80M_{-500:500}$={4xEHT_LTF_partA, $0_5$, 4xEHT_LTF_partB}.

Herein, −500 to 500 are subcarrier indexes (the indexes may also be referred to as numbers), $0_5$ represents five consecutive 0s, 4xEHT_LTF_partA includes 498 elements, and 4xEHT_LTF_partB includes 498 elements.

In an example, 4xEHT_LTF_partA=
{−1 1 1 1 1 1 −1 −1 −1 1 −1 −1 1 −1
−1 1 1 −1 −1 −1 −1 1 −1 1 −1 1 −1 1
−1 1 −1 1 1 −1 1 1 1 −1 −1 −1 1 1
−1 −1 1 −1 1 1 1 1 1 1 1 −1 −1 −1
−1 −1 −1 −1 1 1 1 −1 1 1 −1 1 1 −1
−1 1 1 1 1 −1 1 −1 1 −1 1 1 −1 1
−1 1 1 −1 1 1 1 −1 −1 −1 1 1 −1 −1
1 −1 1 1 1 1 1 1 1 1 1 −1 1 1
−1 1 −1 1 1 1 1 −1 −1 1 1 −1 −1 1
−1 1 1 1 1 1 −1 −1 −1 1 1 1 1 1
−1 −1 −1 1 −1 −1 1 −1 −1 1 1 −1 −1 −1
−1 1 −1 1 −1 1 −1 −1 1 −1 1 1 −1
1 1 1 −1 −1 −1 1 1 −1 −1 1 −1 1 1
1 1 1 1 1 −1 −1 1 1 1 1 1 −1 −1
−1 1 −1 −1 1 −1 −1 1 1 −1 −1 −1 −1 1
−1 1 −1 1 −1 −1 1 −1 1 −1 −1 1 −1 −1
−1 1 1 1 −1 −1 1 1 −1 1 −1 −1 −1 −1
−1 −1 −1 1 1 −1 −1 1 1 1 1 −1 1 −1
1 −1 1 1 1 1 −1 −1 1 1 −1 1 1 −1
1 1 1 −1 −1 −1 −1 −1 1 1 1 1 1 1
1 −1 1 −1 −1 1 1 −1 −1 −1 1 1 1 −1
1 1 −1 1 −1 1 1 −1 −1 1 −1 1 −1 1
−1 −1 −1 −1 1 1 −1 −1 1 −1 −1 1 −1 −1
−1 1 1 1 1 1 1 1 1 1 1 1 1 −1
1 −1 −1 1 1 −1 −1 −1 1 1 1 −1 1 1
−1 1 −1 1 1 −1 1 1 −1 1 −1 1 1 1
1 −1 −1 1 1 −1 −1 1 −1 1 1 1 1 1
−1 −1 1 1 1 1 1 1 1 1 1 1 1 1
1 1 −1 −1 1 −1 −1 1 −1 −1 −1 1 1 1
1 1 −1 −1 −1 −1 −1 −1 −1 1 −1 1 1 −1
−1 1 1 1 −1 −1 −1 1 −1 −1 1 −1 1 −1
1 −1 −1 1 −1 1 −1 1 −1 −1 −1 −1 1 1
−1 −1 1 −1 −1 1 −1 −1 −1 1 1 1 1 1
1 1 1 1 1 1 1 −1 1 −1 −1 1 1 −1
−1 −1 1 1 1 −1 1 1 −1 1 −1 1 1 −1
1 1 −1 −1 1 1 1 1}

4xEHT_LTF_partB=
{−1 −1 −1 1 −1 1 −1 1 1 −1 1 1 1 1
1 −1 −1 −1 1 −1 −1 1 −1 −1 1 1 −1 −1
−1 −1 1 −1 1 −1 1 −1 1 −1 1 −1 1 1
−1 1 1 1 −1 −1 −1 1 1 −1 −1 1 −1 1
1 1 1 1 1 1 −1 1 −1 −1 −1 −1 −1 1
1 1 −1 1 1 −1 1 1 −1 −1 1 1 1 1
−1 1 −1 1 −1 1 1 −1 1 −1 1 1 −1 1
1 1 −1 −1 −1 1 1 −1 −1 1 −1 1 1 1
1 1 1 1 1 1 −1 1 1 −1 1 −1 1 1
1 1 −1 −1 1 1 −1 −1 1 −1 1 1 1 1
1 −1 −1 −1 1 1 1 1 1 −1 −1 −1 1 −1
−1 1 −1 −1 1 1 −1 −1 −1 −1 1 −1 1 −1
1 −1 1 −1 1 −1 1 1 −1 1 1 1 −1 −1
−1 1 1 −1 −1 1 −1 1 1 1 1 1 1 1
−1 −1 1 1 1 1 1 −1 −1 −1 1 −1 −1 1
−1 −1 1 1 −1 −1 −1 −1 1 −1 1 −1 1 −1
−1 1 −1 1 −1 −1 1 −1 −1 −1 1 1 1 −1
−1 1 1 −1 1 −1 −1 −1 −1 −1 −1 −1 1 −1
1 −1 −1 1 −1 −1 1 −1 1 −1 1 −1 −1 −1
−1 1 1 −1 −1 1 −1 −1 1 −1 −1 −1 1 1
1 1 1 −1 −1 −1 −1 −1 −1 −1 1 −1 1 1
−1 −1 1 1 1 −1 −1 −1 1 −1 −1 1 −1 1
−1 −1 1 1 −1 1 −1 1 −1 1 1 1 1 −1
−1 1 1 −1 1 1 −1 1 1 1 −1 −1 −1 −1
−1 −1 −1 −1 −1 −1 −1 −1 1 −1 1 1 −1 −1
1 1 1 −1 −1 −1 1 −1 −1 1 −1 1 −1 −1
1 −1 −1 1 −1 1 −1 −1 −1 −1 1 1 −1 −1
1 1 −1 1 −1 −1 −1 −1 −1 1 1 1 −1 1
−1 1 −1 1 −1 1 1 1 1 −1 −1 1 1 −1
1 1 −1 1 1 1 −1 −1 −1 −1 −1 1 1 1
1 1 1 1 −1 1 −1 −1 1 1 −1 −1 −1 1
1 1 −1 1 1 −1 1 −1 1 −1 1 1 −1 1
−1 1 −1 1 1 1 1 −1 −1 1 1 −1 1 1
−1 1 1 1 −1 −1 −1 −1 −1 −1 −1 −1 −1 −1
−1 −1 1 −1 1 1 −1 −1 1 1 1 −1 −1 −1
1 −1 −1 1 −1 1 −1 −1}

(17) A possible 4x LTF sequence with 160 MHz bandwidth is denoted by 4xEHT_LTF_160M. 4xEHT_LTF_160M may be constructed based on 4xEHT_LTF_80M described in (16), and subcarrier numbers of the sequence 4xEHT_LTF_160M range from −1012 to 1012.

For example, $4xEHT\_LTF\_160M_{-1012:1012}$=
{4xEHT_LTF_partA, $0_5$, 4xEHT_LTF_partB, $0_{23}$, −4xEHT_LTF_partA, $0_5$, 4xEHT_LTF_partB}.

Herein, −4xEHT_LTF_partA represents negation (multiplied by −1) of all elements in the sequence 4xEHT_LTF_partA; $0_{23}$ represents 23 consecutive 0s; $0_5$ represents five consecutive 0s; and 4xEHT_LTF_partA and 4xEHT_LTF_partB in $4xEHT\_LTF\_160M_{-1012:1012}$ are 4xEHT_LTF_partA and 4xEHT_LTF_partB described in (16).

(18) A possible 4x LTF sequence with 320 MHz bandwidth is denoted by 4xEHT_LTF_320M.

4xEHT_LTF_320M is constructed based on 4xEHT_LTF_160M described in (17), and subcarrier numbers of the sequence 4xEHT_LTF_320M range from −2036 to 2036.

For example, 4xEHT_LTF_320M$_{-2036:2036}$={4xEHT_LTF_160M$_{-1012:1012}$, $0_{23}$, −4xEHT_LTF_80M$_{-500:500}$, $0_{23}$, −4xEHT_LTF_partA, $0_5$, 4xEHT_LTF_partB}.

Herein, −4xEHT_LTF_80M$_{-500:500}$ represents negation (that is, multiplied by −1) of all elements in the sequence 4xEHT_LTF_80M$_{-500:500}$; −4xEHT_LTF_partA represents negation (that is, multiplied by −1) of all elements in the sequence 4xEHT_LTF_partA; $0_{23}$ represents 23 consecutive 0s; and $0_5$ represents five consecutive 0s. In 4xEHT_LTF_320M$_{-2036:2036}$, 4xEHT_LTF_160M$_{-1012:1012}$ is 4xEHT_LTF_160M$_{-1012:1012}$ in (17), 4xEHT_LTF_partA and 4xEHT_LTF_partB are 4xEHT_LTF_partA and 4xEHT_LTF_partB described in (16), and 4xEHT_LTF_80M$_{-500:500}$ is 4xEHT_LTF_80M$_{-500:500}$ described in (16).

(19) A possible 4x LTF sequence with 240 MHz bandwidth is denoted by 4xEHT_LTF_240M. 4xEHT_LTF_240M is constructed based on 4xEHT_LTF_160M described in (17) and 4xEHT_LTF_80M described in (16). For example, when an 80 MHz channel in a 320 MHz channel is missing, a 240 MHz channel is formed, and the formed 240 MHz channel may be continuous or discontinuous in frequency domain. A punctured 4x EHT LTF sequence corresponding to 320 MHz bandwidth may be used as a sequence with 240 MHz bandwidth. Subcarrier numbers of the sequence 4xEHT_LTF_240M range from −1524 to 1524.

For example, 4xEHT_LTF_240M$_{-1524:1524}$={4xEHT_LTF_160M$_{-1012:1012}$, $0_{23}$, −4xEHT_LTF_80M$_{-500:500}$}.

Herein, −4xEHT_LTF_80M$_{-500:500}$ represents negation (that is, multiplied by −1) of all elements in the sequence 4xEHT_LTF_80M$_{-500:500}$; and $0_{23}$ represents 23 consecutive 0s.

In 4xEHT_LTF_240M$_{-1524:1524}$ in the two examples in (19), 4xEHT_LTF_80M$_{-500:500}$ is 4xEHT_LTF_80M$_{-500:500}$ in (16), and 4xEHT_LTF_160M$_{-1012:1012}$ is 4xEHT_LTF_160M$_{-1012:1012}$ in (17).

(20) Sequences obtained by performing one or more of the following operations on the 4x LTF sequences with various bandwidth described in (16) to (19), for example, 4xEHT_LTF_80M$_{-500:500}$, 4xEHT_LTF_160M$_{-1012:1012}$, 4xEHT_LTF_240M$_{-1524:1524}$, and 4xEHT_LTF_320M$_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence.

Operation (3): Multiply an element at an even-numbered or odd-numbered position in a sequence by −1.

As shown in Table 11 below, Table 11 provides a comparison result between PAPR median values (a third column) of a BPSK (a modulation mode) data part and maximum PAPR values (a second column) in PAPRs that are of the sequence 4xEHT_LTF_320M described in (18) and a plurality of corresponding rotated sequences and that are on different single-RUs, various combined RUs, and entire bandwidth.

For example, an RU52 is used as an example. An 80 MHz sequence includes 16 RU52s, that is, 16 PAPRs. One sequence may be rotated to obtain four sequences. Therefore, 16*4=64 PAPRs may be obtained by considering rotated sequences. A maximum value of the 64 PAPRs is 5.73. 4xEHT_LTF_160M, 4xEHT_LTF_240M, and 4xEHT_LTF_320M are obtained based on the sequence 4xEHT_LTF_80M. PAPR values of 4xEHT_LTF_160M, 4xEHT_LTF_240M, and 4xEHT_LTF_320M on the RU52s are the same as the PAPR values of 4xEHT_LTF_80M on the RU52s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 11 that most of values in the second column are less than values in the third column. That is, most of maximum PAPR values on different single-RUs, various combined RUs, and entire bandwidth under considered influence of phase rotation are less than corresponding PAPR median values of a BPSK data part. In addition, PAPRs are particularly low for important RUs such as RU4*996, RU2*996, and RU996. Therefore, it is verified that the LTF sequences with 80 MHz bandwidth, 160 MHz bandwidth, 240 MHz bandwidth, and 320 MHz bandwidth in the 4x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 11

Comparison between PAPR maximum values of 4x EHT LTF sequences on a single RU, a combined RU, and entire bandwidth under considered influence of a plurality of P-matrices and PAPR median values of a BPSK data part

| RU Size | Max PAPR | Median PAPR of BPSK Data |
|---|---|---|
| RU26 | 4.04 | 5.89 |
| RU52 | 5.73 | 6.71 |
| RU52 + RU26 | 6.65 | 7.10 |
| RU106 | 6.05 | 7.29 |
| RU106 + RU26 | 6.33 | 7.44 |
| RU242 | 5.70 | 7.94 |
| RU484 | 6.09 | 8.44 |
| RU484 + RU242 | 8.25 | 8.83 |
| RU996 | 6.51 | 8.84 |
| RU996 + RU484 | 8.30 | 9.17 |
| RU2*996 | 6.38 | 9.27 or 9.28 |
| RU2*996 + RU484 | 9.57 | 9.50 |
| RU3*996 | 8.69 | 9.54 |
| RU3*996 + RU484 | 8.85 | 9.55 |
| RU4*996 | 6.41 | 9.60 |

This embodiment of this application further provides the following LTF sequences with 80 MHz bandwidth, 160 MHz bandwidth, 240 MHz bandwidth, and 320 MHz bandwidth in the 2x mode.

(21) A possible 2x LTF sequence with 80 MHz bandwidth is denoted by 2xEHT_LTF_80M. Subcarrier numbers of the sequence 2xEHT_LTF_80M range from −500 to 500.

For example, 2xEHT_LTF_80M-$_{500:500}$=12xEHT_LTF_partA, $0_5$, 2xEHT_LTF_partB}, where −500 to 500 are subcarrier indexes (the indexes may also be referred to as numbers), $0_5$ represents five consecutive 0s, 2xEHT_LTF_partA includes 498 elements, and 2xEHT_LTF_partB includes 498 elements.

In an example, 2xEHT_LTF_partA=

{−1 0 −1 0 −1 0 −1 0 −1 0 1 0 1 0
1 0 −1 0 1 0 −1 0 1 0 −1 0 −1 0
1 0 1 0 1 0 1 0 1 0 1 0 −1 0
−1 0 1 0 1 0 1 0 −1 0 −1 0 −1 0
1 0 1 0 1 0 1 0 1 0 1 0 −1 0
1 0 1 0 −1 0 −1 0 1 0 −1 0 −1 0
1 0 −1 0 1 0 −1 0 1 0 −1 0 −1 0
1 0 1 0 1 0 1 0 −1 0 1 0 −1 0
1 0 −1 0 −1 0 1 0 1 0 −1 0 −1 0
−1 0 1 0 1 0 1 0 1 0 −1 0 1 0
−1 0 1 0 1 0 −1 0 1 0 1 0 1 0
1 0 1 0 1 0 −1 0 −1 0 1 0 −1 0
−1 0 1 0 1 0 −1 0 −1 0 1 0
−1 0 −1 0 1 0 −10 −1 0 1 0 −1 0
1 0 −1 0 1 0 1 0 1 0 −1 0 −1 0
1 0 1 0 1 0 −1 0 −1 0 −1 0 −1 0
−1 0 −1 0 −1 0 1 0 1 0 −1 0 1 0
−1 0 −1 0 1 0 1 0 −1 0 −1 0 −1 0
1 0 −1 0 1 0 1 0 −1 0 −1 0 −1 0
−1 0 −1 0 −1 0 −1 0 1 0 1 0 1 0
−1 0 −1 0 1 0 1 0 1 0 −1 0 1 0
−1 0 1 0 −1 0 −1 0 1 0 −1 0 −1 0
1 0 −1 0 −1 0 1 0 1 0 −1 0 1 0
−1 0 1 0 −1 0 −1 0 1 0 1 0 1 0
1 0 1 0 1 0 −1 0 1 0 1 0 −1 0
1 0 −1 0 1 0 1 0 −1 0 1 0 1 0
−1 0 −1 0 1 0 1 0 1 0 1 0 −1 0
1 0 −1 0 1 0 −1 0 −1 0 −1 0 −1 0
1 0 1 0 −1 0 1 0 −1 0 1 0 −1 0
1 0 1 0 −1 0 1 0 1 0 −1 0 −1 0
1 0 1 0 −1 0 1 0 1 0 −1 0 −1 0
1 0 1 0 1 0 −1 0 −1 0 −1 0 1 0
1 0 1 0 1 0 −1 0 −1 0 −1 0 1 0
1 0 1 0 −1 0 1 0 −1 0 1 0 −1 0
−1 0 −1 0 1 0 1 0 1 0 1 0 1 0
1 0 −1 0 −1 0 1 0}

2xEHT_LTF_partB=

{0 −1 0 1 0 1 0 1 0 1 0 1 0 1
0 −1 0 −1 0 1 0 1 0 1 0 −1 0 1
0 −1 0 1 0 −1 0 −1 0 1 0 1 0 1
0 1 0 1 0 1 0 −1 0 −1 0 1 0 1
0 1 0 −1 0 −1 0 −1 0 1 0 1 0 1
0 1 0 1 0 1 0 −1 0 1 0 1 0 −1
0 −1 0 1 0 −1 0 −1 0 1 0 −1 0 1
0 −1 0 1 0 −1 0 −1 0 1 0 1 0 1
0 1 0 −1 0 1 0 1 0 1 0 −1 0 −1
0 1 0 1 0 −1 0 1 0 −1 0 −1 0 1
0 1 0 1 0 −1 0 1 0 −1 0 1 0 1
0 −1 0 1 0 1 0 1 0 1 0 1 0 1
0 −1 0 −1 0 1 0 −1 0 1 0 −1 0 1
0 1 0 −1 0 −1 0 1 0 −1 0 −1 0 1
0 −1 0 −1 0 1 0 −1 0 1 0 −1 0 1
0 1 0 1 0 −1 0 −1 0 1 0 1 0 1
0 1 0 1 0 1 0 1 0 1 0 1 0 1
0 1 0 1 0 −1 0 1 0 −1 0 −1 0 1
0 1 0 1 0 1 0 1 0 −1 0 1 0 −1
0 −1 0 1 0 1 0 1 0 1 0 1 0 1
0 1 0 −1 0 −1 0 −1 0 1 0 1 0 −1
0 −1 0 −1 0 1 0 −1 0 1 0 −1 0 1
0 1 0 −1 0 1 0 1 0 −1 0 1 0 1
0 −1 0 −1 0 1 0 −1 0 1 0 −1 0 1
0 1 0 1 0 1 0 1 0 1 0 1 0 1
0 1 0 −1 0 −1 0 1 0 −1 0 1 0 −1
0 −1 0 1 0 1 0 −1 0 1 0 1 0 1
0 1 0 −1 0 −1 0 1 0 1 0 1 0 −1
0 1 0 1 0 1 0 1 0 −1 0 −1 0 1
0 −1 0 1 0 −1 0 1 0 −1 0 −1 0 1
0 −1 0 −1 0 1 0 1 0 −1 0 1 0 1
0 1 0 1 0 1 0 1 0 −1 0 −1 0 −1
0 1 0 1 0 1 0 −1 0 −1 0 1 0 1
0 1 0 1 0 1 0 1 0 −1 0 −1 0 1
0 −1 0 1 0 −1 0 1 0 1 0 1 0 −1
0 −1 0 −1 0 −1 0 −1}

(22) A possible 2x LTF sequence with 160 MHz bandwidth is denoted by 2xEHT_LTF_160M. 2xEHT_LTF_160M may be constructed based on 2xEHT_LTF_partA and 2xEHT_LTF_partB described in (21), and subcarrier numbers of the sequence 2xEHT_LTF_160M range from −1012 to 1012.

For example, $2xEHT\_LTF\_160M_{-1012:1012}$=

{2xEHT_LTF_partA, $0_5$, 2xEHT_LTF_partB, $0_{23}$, −2xEHT_LTF_partA, $0_5$, 2xEHT_LTF_partB}.

Herein, 2xEHT_LTF_partA and 2xEHT_LTF_partB are 2xEHT_LTF_partA and 2xEHT_LTF_partB in (21); −2xEHT_LTF_partA represents negation (that is, multiplied by −1) of all elements in the sequence 2xEHT_LTF_partA; $0_5$ represents five consecutive 0s; and $0_{23}$ represents 23 consecutive 0s.

(23) A possible 2x LTF sequence with 320 MHz bandwidth is denoted by 2xEHT_LTF_320M. 2xEHT_LTF_320M is constructed based on 2xEHT_LTF_partA and 2xEHT_LTF_partB described in (21), and subcarrier numbers of the sequence 2xEHT_LTF_320M range from −2036 to 2036.

For example, $2xEHT\_LTF\_320M_{-2036:2036}$=

{2xEHT_LTF_partA, $0_5$, 2xEHT_LTF_partB, $0_{23}$, 2xEHT_LTF_partA, $0_5$, −2xEHT_LTF_partB, $0_{23}$, 2xEHT_LTF_partA, $0_5$, 2xEHT_LTF_partB, $0_{23}$, −2xEHT_LTF_partA, $0_5$, 2xEHT_LTF_partB}.

Herein, 2xEHT_LTF_partA and 2xEHT_LTF_partB are 2xEHT_LTF_partA and 2xEHT_LTF_partB in (21); −2xEHT_LTF_partB represents negation (that is, multiplied by −1) of all elements in the sequence 2xEHT_LTF_partB; −2xEHT_LTF_partA represents negation (that is, multiplied by −1) of all elements in the sequence 2xEHT_LTF_partA; $0_5$ represents five consecutive 0s; and $0_{23}$ represents 23 consecutive 0s.

(24) A possible 2x LTF sequence with 240 MHz bandwidth is denoted by 2xEHT_LTF_240M. 2xEHT_LTF_240M is constructed based on 2xEHT_LTF_160M described in (22) or based on 2xEHT_LTF_80M described in (21). For example, when an 80 MHz channel in a 320 MHz channel is missing, a 240 MHz channel is formed, and the formed 240 MHz channel may be continuous or discontinuous in frequency domain. A punctured 2x EHT LTF sequence corresponding to 320 MHz bandwidth may be used as a sequence with 240 MHz bandwidth. Subcarrier numbers of the sequence 2xEHT_LTF_240M range from −1524 to 1524.

For example, $2xEHT\_LTF\_240M_{-1524:1524}$=

{2xEHT_LTF_80M, $0_{23}$, 2xEHT_LTF_partA, $0_5$, −2xEHT_LTF_partB, $0_{23}$, 2xEHT_LTF_80M}.

Herein, 2xEHT_LTF_80M is $2xEHT\_LTF\_80M_{-500:500}$ in (21); 2xEHT_LTF_partA and 2xEHT_LTF_partB are 2xEHT_LTF_partA and 2xEHT_LTF_partB in (21); −2xEHT_LTF_partB represents negation (that is, multiplied by −1) of all elements in the sequence 2xEHT_LTF_partB; $0_5$ represents five consecutive 0s; and $0_{23}$ represents 23 consecutive 0s.

For example, 2xEHT_LTF_240M$_{-1524:1524}$= {2xEHT_LTF_partA, $0_5$, −2xEHT_LTF_partB, $0_{23}$, 2xEHT_LTF_160M$_{-1012:1012}$}.

Herein, 2xEHT_LTF_160M$_{-1012:1012}$ is 2xEHT_LTF_160M$_{-1012:1012}$ in (22); 2xEHT_LTF_partA and 2xEHT_LTF_partB are 2xEHT_LTF_partA and 2xEHT_LTF_partB in (21); −2xEHT_LTF_partB represents negation (that is, multiplied by −1) of all elements in the sequence 2xEHT_LTF_partB; $0_5$ represents five consecutive 0s; and $0_{23}$ represents 23 consecutive 0s.

(25) Sequences obtained by performing one or more of the following operations on the 2x LTF sequences with various bandwidth described in (21) to (24), for example, 2xEHT_LTF_80M$_{-500:500}$, 2xEHT_LTF_160M$_{-1012:1012}$, 2xEHT_LTF_240M$_{-1524:1524}$, and 2xEHT_LTF_320M$_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence. It is assumed that a sequence is 123456, and a sequence obtained by reversing an order of elements in the sequence is 654321.

Operation (3): Multiply an even-numbered or odd-numbered element in non-zero elements by −1.

As shown in Table 12 below, Table 12 provides a comparison result between PAPR median values (a third column) of a BPSK (a modulation mode) data part and maximum PAPR values (a second column) in PAPRs that are of the sequence 2xEHT_LTF_320M described in (23) and a plurality of corresponding rotated sequences and that are on different single-RUs, various combined RUs, and entire bandwidth.

For example, an RU26 is used as an example. An 80 MHz sequence includes 36 RU26s, that is, 36 PAPRs. One sequence may be rotated to obtain four sequences. Therefore, 36*4=144 PAPRs may be obtained by considering rotated sequences. A maximum value of the 144 PAPRs is 5.76. 2xEHT_LTF_160M, 2xEHT_LTF_240M, and 2xEHT_LTF_320M are obtained based on the sequence 2xEHT_LTF_80M. PAPR values of 2xEHT_LTF_160M, 2xEHT_LTF_240M, and 2xEHT_LTF_320M on the RU26s are the same as the PAPR values of 2xEHT_LTF_80M on the RU26s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 12 that values in the second column are all less than values in the third column. That is, maximum PAPR values on different single-RUs, various combined RUs, and entire bandwidth under considered influence of phase rotation are all less than corresponding PAPR median values of a BPSK data part. Therefore, it is verified that the LTF sequences with 80 MHz bandwidth, 160 MHz bandwidth, 240 MHz bandwidth, and 320 MHz bandwidth in the 2x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 12

Comparison between PAPR maximum values of 2x EHT LTF sequences on a single RU, a combined RU, and entire bandwidth under considered influence of a plurality of P-matrices and PAPR median values of a BPSK data part

| RU Size | Max PAPR (dB) | Median PAPR of BPSK Data (dB) |
|---|---|---|
| RU26 | 5.76 | 5.89 |
| RU52 | 4.98 | 6.71 |
| RU52 + RU26 | 6.23 | 7.10 |
| RU106 | 4.55 | 7.29 |
| RU106 + RU26 | 5.45 | 7.44 |
| RU242 | 5.09 | 7.94 |
| RU484 | 5.53 | 8.44 |
| RU484 + RU242 | 7.61 | 8.83 |
| RU996 | 5.63 | 8.84 |
| RU996 + RU484 | 7.74 | 9.17 |
| RU2*996 | 5.62 or 8.53 | 9.27 or 9.28 |
| RU2*996 + RU484 | 8.99 | 9.50 |
| RU3*996 | 7.93 | 9.54 |
| RU3*996 + RU484 | 7.91 | 9.55 |
| RU4*996 | 5.75 | 9.60 |

(26) A possible 2x LTF sequence with 80 MHz bandwidth is denoted by 2xEHT_LTF_80M. Subcarrier numbers of the sequence 2xEHT_LTF_80M range from −500 to 500.

For example, 2xEHT_LTF_80M$_{-500:500}$={2xEHT_LTF_partA, $0_5$, 2xEHT_LTF_partB}, where −500 to 500 are subcarrier indexes (the indexes may also be referred to as numbers), $0_5$ represents five consecutive 0s, 2xEHT_LTF_partA includes 498 elements, and 2xEHT_LTF_partB includes 498 elements.

In an example, 2xEHT_LTF_partA=
{1 0 1 0 1 0 1 0 1 0 1 0 1 0
−1 0 1 0 −1 0 1 0 −1 0 −1 0
1 0 1 0 1 0 1 0 1 0 1 0 −1 0
−1 0 1 0 1 0 1 0 −1 0 −1 0 −1 0
1 0 1 0 1 0 1 0 1 0 1 0 −1 0
1 0 1 0 −1 0 −1 0 1 0 −1 0 −1 0
1 0 −1 0 1 0 −1 0 1 0 −1 0 −1 0
1 0 1 0 1 0 1 0 −1 0 1 0 1 0
1 0 −1 0 −1 0 1 0 1 0 1 0 1 0
−1 0 1 0 1 0 −1 0 −1 0 1 0 −1 0
1 0 −1 0 −1 0 1 0 −1 0 −1 0 −1 0
−1 0 −1 0 −1 0 1 0 1 0 −1 0 1 0
−1 0 1 0 −1 0 −1 0 1 0 1 0 −1 0
1 0 1 0 −1 0 1 0 1 0 −1 0 1 0
−1 0 1 0 −1 0 −1 0 −1 0 1 0 1 0
−1 0 −1 0 −1 0 1 0 1 0 1 0 1 0
1 0 1 0 1 0 −1 0 −1 0 1 0 −1 0
1 0 1 0 −1 0 1 0 1 0 −1 0 −1 0
1 0 −1 0 1 0 1 0 −1 0 −1 0 −1 0
−1 0 −1 0 −1 0 −1 0 1 0 1 0 1 0
−1 0 −1 0 1 0 1 0 1 0 −1 0 1 0
−1 0 1 0 −1 0 −1 0 1 0 −1 0 −1 0
1 0 −1 0 −1 0 1 0 1 0 −1 0 1 0
−1 0 1 0 −1 0 −1 0 1 0 1 0 1 0
1 0 1 0 1 0 −1 0 1 0 1 0 −1 0
1 0 −1 0 1 0 1 0 1 0 −1 0 −1 0
1 0 −1 0 1 0 1 0 −1 0 −1 0 1 0
1 0 1 0 −1 0 1 0 1 0 1 0 1 0
−1 0 −1 0 1 0 −1 0 1 0 −1 0 1 0
−1 0 −1 0 1 0 −1 0 −1 0 1 0 1 0
−1 0 1 0 1 0 1 0 1 0 1 0 1 0
−1 0 −1 0 −1 0 1 0 1 0 1 0 −1 0

−1 0 1 0 1 0 1 0 1 0 1 0 1 0
−1 0 −1 0 1 0 −1 0 1 0 −1 0 1 0
1 0 1 0 1 0 1 0 1 0 1 0 1 0
−1 0 1 0 1 0 −1 0}
2xEHT_LTF_partB=
{0 −1 0 1 0 1 0 −1 0 −1 0 −1 0 −1
0 −1 0 −1 0 1 0 1 0 1 0 −1 0 1
0 −1 0 1 0 −1 0 −1 0 1 0 1 0 1
0 1 0 1 0 1 0 −1 0 −1 0 1 0 1
0 1 0 −1 0 −1 0 −1 0 1 0 1 0 1
0 1 0 1 0 1 0 −1 0 1 0 1 0 −1
0 −1 0 1 0 −1 0 −1 0 1 0 −1 0 1
0 −1 0 1 0 −1 0 −1 0 1 0 1 0 1
0 1 0 −1 0 1 0 −1 0 1 0 −1 0 −1
0 −1 0 −1 0 1 0 1 0 −1 0 −1 0 1
0 −1 0 −1 0 1 0 −1 0 1 0 −1 0 −1
0 1 0 1 0 1 0 1 0 1 0 1 0 1
0 1 0 1 0 −1 0 1 0 −1 0 1 0 −1
0 −1 0 1 0 1 0 −1 0 1 0 1 0 −1
0 1 0 1 0 −1 0 1 0 −1 0 1 0 −1
0 −1 0 −1 0 1 0 1 0 −1 0 −1 0 −1
0 1 0 1 0 1 0 1 0 1 0 1 0 1
0 −1 0 −1 0 1 0 −1 0 1 0 1 0 1
0 −1 0 1 0 1 0 1 0 −1 0 1 0 −1
0 −1 0 1 0 1 0 1 0 1 0 1 0 1
0 1 0 −1 0 −1 0 −1 0 1 0 1 0 −1
0 −1 0 −1 0 1 0 −1 0 1 0 −1 0 1
0 1 0 −1 0 1 0 1 0 −1 0 1 0 1
0 −1 0 −1 0 1 0 −1 0 1 0 −1 0 1
0 1 0 1 0 1 0 1 0 1 0 1 0 1
0 1 0 −1 0 −1 0 1 0 −1 0 1 0 −1
0 −1 0 −1 0 −1 0 1 0 1 0 1 0 −1
0 −1 0 1 0 1 0 −1 0 1 0 −1 0 1
0 −1 0 −1 0 −1 0 −1 0 1 0 1 0 −1
0 1 0 −1 0 1 0 −1 0 1 0 1 0 −1
0 1 0 1 0 −1 0 −1 0 −1 0 1 0 −1 0 −1
0 −1 0 −1 0 −1 0 −1 0 1 0 1 0 1
0 −1 0 −1 0 −1 0 1 0 1 0 −1 0 −1
0 −1 0 −1 0 −1 0 −1 0 1 0 1 0 −1
0 1 0 −1 0 1 0 −1 0 −1 0 −1 0 1
0 1 0 1 0 1 0 1}

(27) A possible 2x LTF sequence with 160 MHz bandwidth is denoted by 2xEHT_LTF_160M. 2xEHT_LTF_160M may be constructed based on 2xEHT_LTF_partA and 2xEHT_LTF_partB described in (26), and subcarrier numbers of the sequence 2xEHT_LTF_160M range from −1012 to 1012.

For example, $2xEHT\_LTF\_160M_{-1012:1012}$=

{−2xEHT_LTF_partA, $0_5$, 2xEHT_LTF_partB, $0_{23}$, 2xEHT_LTF_partA, $0_5$, 2xEHT_LTF_partB}.

Herein, 2xEHT_LTF_partA and 2xEHT_LTF_partB are 2xEHT_LTF_partA and 2xEHT_LTF_partB in (26); −2xEHT_LTF_partA represents negation (that is, multiplied by −1) of all elements in the sequence 2xEHT_LTF_partA; $0_5$ represents five consecutive 0s; and $0_{23}$ represents 23 consecutive 0s.

(28) A possible 2x LTF sequence with 320 MHz bandwidth is denoted by 2xEHT_LTF_320M. 2xEHT_LTF_320M is constructed based on 2xEHT_LTF_160M described in (27), and subcarrier numbers of the sequence 2xEHT_LTF_320M range from −2036 to 2036.

For example, $2xEHT\_LTF\_320M_{-2036:2036}$=

{−2xEHT_LTF_$0_{23}$, $2xEHT\_LTF\_160M_{-1012:1012}$}.

Herein, $2xEHT\_LTF\_160M_{-1012:1012}$ is $2xEHT\_LTF\_160M_{-1012:1012}$ in (27); $-2xEHT\_LTF\_160M_{-1012:1012}$ represents negation (that is, multiplied by −1) of all elements in the sequence $2xEHT\_LTF\_160M_{-1012:1012}$; and $0_{23}$ represents 23 consecutive 0s.

(29) A possible 2x LTF sequence with 240 MHz bandwidth is denoted by 2xEHT_LTF_240M. 2xEHT_LTF_240M may be constructed based on 2xEHT_LTF_160M described in (27) or based on 2xEHT_LTF_80M described in (26). For example, when an 80 MHz channel in a 320 MHz channel is missing, a 240 MHz channel is formed, and the formed 240 MHz channel may be continuous or discontinuous in frequency domain. A punctured 2x EHT LTF sequence corresponding to 320 MHz bandwidth may be used as a sequence with 240 MHz bandwidth. Subcarrier numbers of the sequence 2xEHT_LTF_240M range from −1524 to 1524.

For example, $2xEHT\_LTF\_240M_{-1524:1524}$=

{$-2xEHT\_LTF\_160M_{-1012:1012}$, $0_{23}$, −2xEHT_LTF_partA, $0_5$, 2xEHT_LTF_partB}.

Herein, $2xEHT\_LTF\_160M_{-1012:1012}$ is $2xEHT\_LTF\_160M_{-1012:1012}$ described in (27); 2xEHT_LTF_partA and 2xEHT_LTF_partB are 2xEHT_LTF_partA and 2xEHT_LTF_partB in (26); −2xEHT_LTF_partA represents negation (that is, multiplied by −1) of all elements in the sequence 2xEHT_LTF_partA; $-2xEHT\_LTF\_160M_{-1012:1012}$ represents negation (that is, multiplied by −1) of all elements in the sequence $2xEHT\_LTF\_160M_{-1012:1012}$; $0_5$ represents five consecutive 0s; and $0_{23}$ represents 23 consecutive 0s.

For example, $2xEHT\_LTF\_240M_{-1524:1524}$=

{$-2xEHT\_LTF\_80M_{-500:500}$, $0_{23}$, $2xEHT\_LTF\_160M_{-1012:1012}$}.

Herein, $2xEHT\_LTF\_80M_{-500:500}$ is $2xEHT\_LTF\_80M_{-500:500}$ in (26); $2xEHT\_LTF\_160M_{-1012:1012}$ is $2xEHT\_LTF\_160M_{-1012:1012}$ in (27); $-2xEHT\_LTF\_80M_{-500:500}$ represents negation (that is, multiplied by −1) of all elements in the sequence $2xEHT\_LTF\_80M_{-500:500}$; and $0_{23}$ represents 23 consecutive 0s.

(30) Sequences obtained by performing one or more of the following operations on the 2x LTF sequences with various bandwidth described in (26) to (29), for example, $2xEHT\_LTF\_80M_{-500:500}$, $2xEHT\_LTF\_160M_{-1012:1012}$, $2xEHT\_LTF\_240M_{-1524:1524}$, and $2xEHT\_LTF\_320M_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence. It is assumed that a sequence is 123456, and a sequence obtained by reversing an order of elements in the sequence is 654321.

Operation (3): Multiply an even-numbered or odd-numbered element in non-zero elements by −1.

As shown in Table 13 below, Table 13 provides a comparison result between PAPR median values (a third column) of a BPSK (a modulation mode) data part and maximum PAPR values (a second column) in PAPRs that are of the sequence 2xEHT_LTF_320M described in (28) and a plurality of corresponding rotated sequences and that are on different single-RUs, various combined RUs, and entire bandwidth.

For example, an RU26 is used as an example. An 80 MHz sequence includes 36 RU26s, that is, 36 PAPRs. One sequence may be rotated to obtain four sequences. Therefore, 36*4=144 PAPRs may be obtained by considering rotated sequences. A maximum value of the 144 PAPRs is 5.76. 2xEHT_LTF_160M, 2xEHT_LTF_240M, and 2xEHT_LTF_320M are obtained based on the sequence 2xEHT_LTF_80M. PAPR values of 2xEHT_LTF_160M, 2xEHT_LTF_240M, and 2xEHT_LTF_320M on the RU26s are the same as the PAPR values of 2xEHT_LTF_80M on the RU26s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 13 that values in the second column are all less than values in the third column. That is, maximum PAPR values on different single-RUs, various combined RUs, and entire bandwidth under considered influence of phase rotation are all less than corresponding PAPR median values of a BPSK data part. Therefore, it is verified that the LTF sequences with 80 MHz bandwidth, 160 MHz bandwidth, 240 MHz bandwidth, and 320 MHz bandwidth in the 2x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 13

Comparison between PAPR maximum values of 2x EHT LTF sequences on a single RU, a combined RU, and entire bandwidth under considered influence of a plurality of P-matrices and PAPR median values of a BPSK data part

| RU Size | Max PAPR (dB) | Median PAPR of BPSK Data (dB) |
|---|---|---|
| RU26 | 5.76 | 5.89 |
| RU52 | 4.98 | 6.71 |
| RU52 + RU26 | 6.23 | 7.10 |
| RU106 | 4.55 | 7.29 |
| RU106 + RU26 | 5.45 | 7.44 |
| RU242 | 5.09 | 7.94 |
| RU484 | 5.53 | 8.44 |
| RU484 + RU242 | 7.61 | 8.83 |
| RU996 | 5.69 | 8.84 |
| RU996 + RU484 | 7.54 | 9.17 |
| RU2*996 | 6.01 or 8.58 | 9.27 or 9.28 |
| RU2*996 + RU484 | 8.31 | 9.50 |
| RU3*996 | 7.69 | 9.54 |
| RU3*996 + RU484 | 8.28 | 9.55 |
| RU4*996 | 8.33 | 9.60 |

(31) A possible 2x LTF sequence with 80 MHz bandwidth is denoted by 2xEHT_LTF_80M. Subcarrier numbers of the sequence 2xEHT_LTF_80M range from −500 to 500.

For example, $2xEHT\_LTF\_80M_{-500:500}$={2xEHT_LTF_partA, $0_5$, 2xEHT_LTF_partB}, where −500 to 500 are subcarrier indexes (the indexes may also be referred to as numbers), $0_5$ represents five consecutive 0s, 2xEHT_LTF_partA includes 498 elements, and 2xEHT_LTF_partB includes 498 elements.

For example, the sequence 2xEHT_LTF_partB is obtained by reversing an order of the sequence 2xEHT_LTF_partA and then negating an even-numbered element in non-zero elements, that is, negating an element at a position that is an integer multiple of 4.

In an example, 2xEHT_LTF_partA=
{1 0 −1 0 −1 0 1 0 1 0 −1 0 1 0
1 0 1 0 1 0 1 0 1 0 1 0 1 0
1 0 1 0 1 0 −1 0 1 0 −1 0 1 0
1 0 1 0 −1 0 1 0 1 0 1 0 1 0
1 0 1 0 1 0 −1 0 −1 0 −1 0 1 0
1 0 −1 0 1 0 −1 0 1 0 −1 0 1 0
1 0 −1 0 1 0 1 0 1 0 1 0 −1 0
−1 0 1 0 1 0 −1 0 1 0 −1 0 −1 0
−1 0 −1 0 −1 0 −1 0 1 0 −1 0 1 0
1 0 −1 0 −1 0 1 0 −1 0 −1 0 1 0
1 0 −1 0 −1 0 −1 0 1 0 1 0 −1 0
1 0 −1 0 1 0 −1 0 −1 0 1 0 −1 0
−1 0 −1 0 −1 0 −1 0 1 0 −1 0 −1 0
−1 0 1 0 −1 0 1 0 −1 0 1 0 −1 0
−1 0 1 0 −1 0 −1 0 1 0 1 0 1 0
1 0 1 0 1 0 1 0 −1 0 −1 0 −1 0
1 0 −1 0 1 0 1 0 −1 0 −1 0 1 0
1 0 1 0 1 0 −1 0 1 0 1 0 1 0
1 0 −1 0 −1 0 1 0 1 0 −1 0 1 0
−1 0 −1 0 −1 0 1 0 1 0 1 0 1 0
1 0 1 0 1 0 −1 0 −1 0 1 0 −1 0
−1 0 1 0 −1 0 1 0 −1 0 1 0 −1 0
−1 0 −1 0 1 0 −1 0 −1 0 −1 0 −1 0
−1 0 1 0 −1 0 −1 0 1 0 −1 0 1 0
−1 0 1 0 1 0 −1 0 −1 0 −1 0 1 0
1 0 −1 0 1 0 1 0 1 0 1 0 −1 0
−1 0 −1 0 1 0 1 0 −1 0 −1 0 1 0
−1 0 1 0 −1 0 1 0 −1 0 −1 0 1 0
1 0 −1 0 −1 0 −1 0 −1 0 1 0 −1 0
−1 0 1 0 −1 0 1 0 −1 0 1 0 −1 0
−1 0 1 0 1 0 1 0 −1 0 −1 0 −1 0
−1 0 −1 0 −1 0 −1 0 1 0 −1 0 −1 0
−1 0 1 0 −1 0 1 0 −1 0 −1 0 −1 0
1 0 1 0 1 0 1 0 1 0 1 0 −1 0
−1 0 1 0 −1 0 −1 0 1 0 1 0 −1 0
−1 0 1 0 −1 0 −1 0}
2xEHT_LTF_partB=
{0 −1 0 −1 0 1 0 1 0 −1 0 1 0 1
0 −1 0 −1 0 1 0 −1 0 −1 0 1 0 1
0 1 0 1 0 1 0 1 0 −1 0 −1 0 −1
0 1 0 −1 0 1 0 −1 0 −1 0 −1 0 1
0 1 0 1 0 1 0 1 0 1 0 1 0 1
0 1 0 1 0 1 0 −1 0 −1 0 1 0 −1
0 1 0 −1 0 1 0 −1 0 −1 0 1 0 −1
0 −1 0 −1 0 −1 0 1 0 1 0 −1 0 −1
0 1 0 −1 0 1 0 −1 0 1 0 −1 0 −1
0 1 0 1 0 −1 0 −1 0 −1 0 1 0 1
0 1 0 1 0 −1 0 1 0 1 0 −1 0 −1
0 −1 0 1 0 1 0 −1 0 1 0 −1 0 1
0 −1 0 −1 0 1 0 −1 0 −1 0 −1 0 −1
0 1 0 −1 0 1 0 −1 0 −1 0 1 0 −1
0 −1 0 1 0 1 0 1 0 1 0 1 0 1
0 1 0 −1 0 −1 0 −1 0 1 0 −1 0 1
0 1 0 −1 0 −1 0 1 0 1 0 1 0 1
0 −1 0 1 0 −1 0 −1 0 −1 0 1 0 1
0 −1 0 −1 0 1 0 −1 0 1 0 1 0 1
0 1 0 1 0 1 0 1 0 1 0 1 0 1
0 1 0 1 0 −1 0 1 0 1 0 −1 0 1
0 −1 0 1 0 −1 0 1 0 1 0 1 0 −1
0 1 0 1 0 1 0 1 0 1 0 −1 0 1
0 1 0 −1 0 1 0 −1 0 1 0 −1 0 −1
0 1 0 1 0 1 0 −1 0 −1 0 1 0 1
0 −1 0 1 0 1 0 −1 0 −1 0 1 0 −1
0 1 0 1 0 1 0 1 0 1 0 1 0 −1
0 1 0 −1 0 −1 0 1 0 1 0 −1 0 −1
0 −1 0 −1 0 1 0 −1 0 −1 0 1 0 −1

0 1 0 −1 0 1 0 −1 0 −1 0 1 0 1
0 1 0 1 0 1 0 1 0 1 0 1 0 1
0 −1 0 1 0 −1 0 −1 0 −1 0 1 0 −1
0 1 0 −1 0 −1 0 −1 0 1 0 1 0 1
0 1 0 1 0 1 0 −1 0 −1 0 1 0 −1
0 −1 0 1 0 1 0 −1}

(32) A possible 2x LTF sequence with 160 MHz bandwidth is denoted by 2xEHT_LTF_160M. 2xEHT_LTF_160M may be constructed based on 2xEHT_LTF_partA, 2xEHT_LTF_partB, and 2xEHT_LTF_80M$_{-500:500}$ described in (31), and subcarrier numbers of the sequence 2xEHT_LTF_160M range from −1012 to 1012.

For example, 2xEHT_LTF_160M$_{-1012:1012}$= {2xEHT_LTF_partA, $0_5$, −2xEHT_LTF_partB, $0_{23}$, 2xEHT_LTF_801\4$_{-500:500}$}.

Herein, 2xEHT_LTF_80M$_{-500:500}$, 2xEHT_LTF_partA, and 2xEHT_LTF_partB are respectively 2xEHT_LTF_80M$_{-500:500}$, 2xEHT_LTF_partA, and 2xEHT_LTF_partB in (31); −2xEHT_LTF_partB represents negation (that is, multiplied by −1) of all elements in the sequence 2xEHT_LTF_partB; $0_5$ represents five consecutive 0s; and $0_{23}$ represents 23 consecutive 0s.

(33) A possible 2x LTF sequence with 320 MHz bandwidth is denoted by 2xEHT_LTF_320M. 2xEHT_LTF_320M is constructed based on 2xEHT_LTF_partA and 2xEHT_LTF_partB described in (31), and subcarrier numbers of the sequence 2xEHT_LTF_320M range from −2036 to 2036.

For example, 2xEHT_LTF_320M$_{-2036:2036}$= {2xEHT_LTF_partA, $0_5$, −2xEHT_LTF_partB, $0_{23}$, 2xEHT_LTF_partA, $0_5$, 2xEHT_LTF_partB, $0_{23}$, 2xEHT_LTF_partA, $0_5$, −2xEHT_LTF_partB, $0_{23}$, −2xEHT_LTF_partA, $0_5$, −2xEHT_LTF_partB}.

Herein, 2xEHT_LTF_partA and 2xEHT_LTF_partB are 2xEHT_LTF_partA and 2xEHT_LTF_partB in (31); −2xEHT_LTF_partA represents negation (that is, multiplied by −1) of all elements in the sequence 2xEHT_LTF_partA; −2xEHT_LTF_partB represents negation (that is, multiplied by −1) of all elements in the sequence 2xEHT_LTF_partB; $0_5$ represents five consecutive 0s; and $0_{23}$ represents 23 consecutive 0s.

(34) A possible 2x LTF sequence with 240 MHz bandwidth is denoted by 2xEHT_LTF_240M. 2xEHT_LTF_240M is constructed based on 2xEHT_LTF_160M described in (32) or based on 2xEHT_LTF_partA and 2xEHT_LTF_partB in (31). For example, when an 80 MHz channel in a 320 MHz channel is missing, a 240 MHz channel is formed, and the formed 240 MHz channel may be continuous or discontinuous in frequency domain. A punctured 2x EHT LTF sequence corresponding to 320 MHz bandwidth may be used as a sequence with 240 MHz bandwidth. Subcarrier numbers of the sequence 2xEHT_LTF_240M range from −1524 to 1524.

For example, 2xEHT_LTF_240M$_{-1524:1524}$= {2xEHT_LTF_160M$_{-1012:1012}$, $0_{23}$, 2xEHT_LTF_partA, $0_5$, −2xEHT_LTF_partB}.

Herein, 2xEHT_LTF_160M$_{-1012:1012}$ is 2xEHT_LTF_160M$_{-1012:1012}$ in (32); 2xEHT_LTF_partA and 2xEHT_LTF_partB are 2xEHT_LTF_partA and 2xEHT_LTF_partB in (31); −2xEHT_LTF_partB represents negation (that is, multiplied by −1) of all elements in the sequence 2xEHT_LTF_partB; $0_5$ represents five consecutive 0s; and $0_{23}$ represents 23 consecutive 0s.

For example, 2xEHT_LTF_240M$_{-1524:1524}$= {2xEHT_LTF_80M$_{-500:500}$, $0_{23}$, 2xEHT_LTF_partA, $0_5$, −2xEHT_LTF_partB, $0_{23}$, −2xEHT_LTF_80M$_{-500:500}$}.

Herein, 2xEHT_LTF_80M$_{-500:500}$, 2xEHT_LTF_partA, and 2xEHT_LTF_partB are respectively 2xEHT_LTF_80M$_{-500:500}$, 2xEHT_LTF_partA, and 2xEHT_LTF_partB described in (31); −2xEHT_LTF_80M$_{-500:500}$ represents negation (that is, multiplied by −1) of all elements in the sequence 2xEHT_LTF_80M$_{-500:500}$; −2xEHT_LTF_partB represents negation (that is, multiplied by −1) of all elements in the sequence 2xEHT_LTF_partB; $0_5$ represents five consecutive 0s; and $0_{23}$ represents 23 consecutive 0s.

(35) Sequences obtained by performing one or more of the following operations on the 2x LTF sequences with various bandwidth described in (31) to (34), for example, 2xEHT_LTF_80M$_{-500:500}$, 2xEHT_LTF_160M$_{-1012:1012}$, 2xEHT_LTF_240M$_{-1524:1524}$, and 2xEHT_LTF_320M$_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence. It is assumed that a sequence is 123456, and a sequence obtained by reversing an order of elements in the sequence is 654321.

Operation (3): Multiply an even-numbered or odd-numbered element in non-zero elements by −1.

As shown in Table 14 below, Table 14 provides a comparison result between PAPR median values (a third column) of a BPSK (a modulation mode) data part and maximum PAPR values (a second column) in PAPRs that are of the sequence 2xEHT_LTF_320M described in (33) and a plurality of corresponding rotated sequences and that are on different single-RUs, various combined RUs, and entire bandwidth.

For example, an RU26 is used as an example. An 80 MHz sequence includes 36 RU26s, that is, 36 PAPRs. One sequence may be rotated to obtain four sequences. Therefore, 36*4=144 PAPRs may be obtained by considering rotated sequences. A maximum value of the 144 PAPRs is 5.96. 2xEHT_LTF_160M, 2xEHT_LTF_240M, and 2xEHT_LTF_320M are obtained based on the sequence 2xEHT_LTF_80M. PAPR values of 2xEHT_LTF_160M, 2xEHT_LTF_240M, and 2xEHT_LTF_320M on the RU26s are the same as the PAPR values of 2xEHT_LTF_80M on the RU26s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 14 that values in the second column are all less than values in the third column. That is, maximum PAPR values on different single-RUs, various combined RUs, and entire bandwidth under considered influence of phase rotation are all less than corresponding PAPR median values of a BPSK data part. Therefore, it is verified that the LTF sequences with 80 MHz bandwidth, 160 MHz bandwidth, 240 MHz bandwidth, and 320 MHz bandwidth in the 2x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 14

Comparison between PAPR maximum values of 2x EHT LTF sequences on a single RU, a combined RU, and entire bandwidth under considered influence of a plurality of P-matrices and PAPR median values of a BPSK data part

| RU Size | Max PAPR (dB) | Median PAPR of BPSK Data (dB) |
| --- | --- | --- |
| RU26 | 5.96 | 5.89 |
| RU52 | 4.99 | 6.71 |
| RU52 + RU26 | 6.23 | 7.10 |
| RU106 | 4.55 | 7.29 |
| RU106 + RU26 | 5.45 | 7.44 |
| RU242 | 5.09 | 7.94 |
| RU484 | 5.53 | 8.44 |
| RU484 + RU242 | 7.61 | 8.83 |
| RU996 | 5.45 | 8.84 |
| RU996 + RU484 | 7.71 | 9.17 |
| RU2*996 | 5.63 or 8.37 | 9.27 or 9.28 |
| RU2*996 + RU484 | 8.37 | 9.50 |
| RU3*996 | 7.85 | 9.54 |
| RU3*996 + RU484 | 7.90 | 9.55 |
| RU4*996 | 5.72 | 9.60 |

(36) A possible 2x LTF sequence with 80 MHz bandwidth is denoted by 2xEHT_LTF_80M. Subcarrier numbers of the sequence 2xEHT_LTF_80M range from −500 to 500.

For example, 2xEHT_LTF_80M$_{-500:500}$={2xEHT_LTF_partA, $0_5$, 2xEHT_LTF_partB}, where −500 to 500 are subcarrier indexes (the indexes may also be referred to as numbers), $0_5$ represents five consecutive 0s, 2xEHT_LTF_partA includes 498 elements, and 2xEHT_LTF_partB includes 498 elements.

For example, the sequence 2xEHT_LTF_partB is obtained by reversing an order of the sequence 2xEHT_LTF_partA and then negating an even-numbered element in non-zero elements, that is, negating an element at a position that is an integer multiple of 4.

In an example, 2xEHT_LTF_partA=
{−1 0 −1 0 −1 0 −1 0 −1 0 1 0 1 0
1 0 −1 0 1 0 −1 0 1 0 −1 0 −1 0
1 0 1 0 1 0 1 0 1 0 1 0 −1 0
−1 0 1 0 1 0 1 0 −1 0 −1 0 −1 0
1 0 1 0 1 0 1 0 1 0 1 0 −1 0
1 0 1 0 −1 0 −1 0 1 0 −1 0 −1 0
1 0 −1 0 1 0 −1 0 1 0 −1 0 −1 0
1 0 1 0 1 0 1 0 −1 0 1 0 −1 0
−1 0 −1 0 1 0 1 0 −1 0 −1 0
−1 0 1 0 1 0 1 0 1 0 −1 0 1 0
−1 0 1 0 1 0 −1 0 1 0 1 0 1 0
1 0 1 0 1 0 −1 0 −1 0 1 0 −1 0
1 0 −1 0 1 0 1 0 −1 0 −1 0 1 0
−1 0 −1 0 1 0 −1 0 −1 0 1 0 −1 0
1 0 −1 0 1 0 1 0 1 0 −1 0 −1 0
1 0 1 0 1 0 −1 0 −1 0 −1 0 −1 0
−1 0 −1 0 −1 0 1 0 1 0 −1 0 1 0
−1 0 −1 0 −1 0 1 0 1 0 −1 0 −1 0
1 0 −1 0 1 0 1 0 −1 0 −1 0 −1 0
−1 0 −1 0 −1 0 −1 0 1 0 1 0 1 0
−1 0 −1 0 1 0 1 0 1 0 −1 0 1 0
−1 0 1 0 −1 0 −1 0 1 0 −1 0 −1 0
1 0 −1 0 −1 0 1 0 1 0 −1 0 1 0
−1 0 1 0 −1 0 −1 0 1 0 1 0 1 0
1 0 1 0 1 0 −1 0 1 0 1 0 −1 0
1 0 −1 0 1 0 1 0 −1 0 1 0 1 0
−1 0 −1 0 1 0 1 0 1 0 1 0 −1 0
1 0 −1 0 1 0 −1 0 −1 0 −1 0 −1 0
1 0 1 0 −1 0 1 0 −1 0 1 0 −1 0
1 0 1 0 −1 0 1 0 1 0 −1 0 −1 0
1 0 1 0 1 0 1 0 1 0 1 0 1 0
1 0 1 0 1 0 −1 0 −1 0 −1 0 1 0
1 0 −1 0 −1 0 −1 0 −1 0 −1 0 −1 0
1 0 1 0 −1 0 1 0 −1 0 1 0 −1 0
−1 0 −1 0 1 0 1 0 1 0 1 0 1 0
1 0 −1 0 −1 0 1 0}

2xEHT_LTF_partB=
{0 1 0 −1 0 1 0 1 0 1 0 1 0 1
0 1 0 1 0 −1 0 −1 0 −1 0 1 0 −1
0 1 0 −1 0 1 0 1 0 −1 0 −1 0 −1
0 −1 0 −1 0 −1 0 1 0 1 0 −1 0 −1
0 −1 0 1 0 1 0 1 0 −1 0 −1 0 −1
0 −1 0 −1 0 −1 0 1 0 −1 0 −1 0 1
0 1 0 −1 0 1 0 1 0 −1 0 1 0 −1
0 1 0 −1 0 1 0 1 0 −1 0 −1 0 −1
0 −1 0 1 0 −1 0 −1 0 −1 0 1 0 1
0 −1 0 −1 0 1 0 −1 0 1 0 1 0 −1
0 −1 0 −1 0 1 0 −1 0 1 0 −1 0 −1
0 1 0 1 0 1 0 1 0 1 0 1 0 1
0 1 0 1 0 −1 0 1 0 −1 0 1 0 −1
0 −1 0 1 0 1 0 −1 0 1 0 1 0 −1
0 1 0 1 0 −1 0 1 0 −1 0 1 0 −1
0 −1 0 −1 0 1 0 1 0 −1 0 −1 0 −1
0 1 0 1 0 1 0 1 0 1 0 1 0 1
0 −1 0 −1 0 1 0 −1 0 1 0 1 0 −1
0 −1 0 −1 0 −1 0 −1 0 1 0 −1 0 1
0 1 0 1 0 1 0 1 0 1 0 1 0 1
0 −1 0 1 0 1 0 1 0 −1 0 −1 0 1
0 1 0 1 0 −1 0 1 0 −1 0 1 0 −1
0 −1 0 1 0 −1 0 −1 0 1 0 −1 0 −1
0 1 0 1 0 −1 0 1 0 −1 0 1 0 −1
0 −1 0 1 0 1 0 1 0 1 0 1 0 1
0 −1 0 1 0 1 0 −1 0 1 0 −1 0 1
0 1 0 −1 0 −1 0 1 0 −1 0 −1 0 −1
0 −1 0 1 0 1 0 −1 0 −1 0 −1 0 1
0 −1 0 −1 0 −1 0 −1 0 1 0 1 0 −1
0 1 0 −1 0 1 0 −1 0 1 0 1 0 −1
0 1 0 1 0 −1 0 −1 0 1 0 −1 0 −1
0 −1 0 −1 0 −1 0 −1 0 1 0 1 0 1
0 −1 0 −1 0 −1 0 1 0 1 0 −1 0 −1
0 −1 0 −1 0 −1 0 −1 0 1 0 1 0 −1
0 1 0 −1 0 1 0 −1 0 −1 0 −1 0 1
0 1 0 1 0 1 0 1}

(37) A possible 2x LTF sequence with 160 MHz bandwidth is denoted by 2xEHT_LTF_160M. 2xEHT_LTF_160M may be constructed based on 2xEHT_LTF_partA, 2xEHT_LTF_partB, and 2xEHT_LTF_80M$_{-500:500}$ described in (36), and subcarrier numbers of the sequence 2xEHT_LTF_160M range from −1012 to 1012.

For example, 2xEHT_LTF_160M$_{-1012:1012}$=
{−2xEHT_LTF_partA, $0_5$, 2xEHT_LTF_partB, $0_{23}$, 2xEHT_LTF_804_500:500}.

Herein, 2xEHT_LTF_partA, 2xEHT_LTF_partB, and 2xEHT_LTF_80M$_{-500:500}$ are respectively 2xEHT_LTF_partA, 2xEHT_LTF_partB, and 2xEHT_LTF_80M$_{-500:500}$ in (36); −2xEHT_LTF_partA represents negation (that is, multiplied by −1) of all elements in the sequence 2xEHT_LTF_partA; $0_5$ represents five consecutive 0s; and $0_{23}$ represents 23 consecutive 0s.

(38) A possible 2x LTF sequence with 320 MHz bandwidth is denoted by 2xEHT_LTF_320M. 2xEHT_LTF_320M is constructed based on 2xEHT_LTF_160M described in (37), and subcarrier numbers of the sequence 2xEHT_LTF_320M range from −2036 to 2036.

For example, $2xEHT\_LTF\_320M_{-2036:2036}$= {−2xEHT_LTF_$0_{23}$, $2xEHT\_LTF\_160M_{-1012:1012}$}.

Herein, $2xEHT\_LTF\_160M_{-1012:1012}$ in $2xEHT\_LTF\_320M_{-2036:2036}$ is $2xEHT\_LTF\_160M_{-1012:1012}$ in (37); $-2xEHT\_LTF\_160M_{-1012:1012}$ represents negation (that is, multiplied by −1) of all elements in the sequence $2xEHT\_LTF\_160M_{-1012:1012}$; and $0_{23}$ represents 23 consecutive 0s.

(39) A possible 2x LTF sequence with 240 MHz bandwidth is denoted by 2xEHT_LTF_240M. 2xEHT_LTF_240M is constructed based on 2xEHT_LTF_160M in (37) or based on 2xEHT_LTF_80M in (36). For example, when an 80 MHz channel in a 320 MHz channel is missing, a 240 MHz channel is formed, and the formed 240 MHz channel may be continuous or discontinuous in frequency domain. A punctured 2x EHT LTF sequence corresponding to 320 MHz bandwidth may be used as a sequence with 240 MHz bandwidth. Subcarrier numbers of the sequence 2xEHT_LTF_240M range from −1524 to 1524.

For example, $2xEHT\_LTF\_240M_{-1524:1524}$= {$-2xEHT\_LTF\_160M_{-1012:1012}$, $0_{23}$, −2xEHT_LTF_partA, $0_5$, 2xEHT_LTF_partB}.

Herein, $2xEHT\_LTF\_160M_{-1012:1012}$ is $2xEHT\_LTF\_160M_{-1012:1012}$ described in (37); 2xEHT_LTF_partA and 2xEHT_LTF_partB are 2xEHT_LTF_partA and 2xEHT_LTF_partB in (36); $-2xEHT\_LTF\_160M_{-1012:1012}$ represents negation (that is, multiplied by −1) of all elements in the sequence $2xEHT\_LTF\_160M_{-1012:1012}$; −2xEHT_LTF_partA represents negation (that is, multiplied by −1) of all elements in the sequence 2xEHT_LTF_partA; $0_5$ represents five consecutive 0s; and $0_{23}$ represents 23 consecutive 0s.

For example, $2xEHT\_LTF\_240M_{-1524:1524}$= {$-2xEHT\_LTF\_80M_{-500:500}$, $0_{23}$, $2xEHT\_LTF\_160M_{-1012:1012}$}.

Herein, $2xEHT\_LTF\_80M_{-500:500}$ is $2xEHT\_LTF\_80M_{-500:500}$ in (36); $2xEHT\_LTF\_160M_{-1012:1012}$ is $2xEHT\_LTF\_160M_{-1012:1012}$ in (37); $-2xEHT\_LTF\_80M_{-500:500}$ represents negation (that is, multiplied by −1) of all elements in the sequence $2xEHT\_LTF\_80M_{-500:500}$; and $0_{23}$ represents 23 consecutive 0s.

(40) Sequences obtained by performing one or more of the following operations on the 2x LTF sequences with various bandwidth described in (36) to (39), for example, $2xEHT\_LTF\_80M_{-500:500}$, $2xEHT\_LTF\_160M_{-1012:1012}$, $2xEHT\_LTF\_240M_{-1524:1524}$, and $2xEHT\_LTF\_320M_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence. It is assumed that a sequence is 123456, and a sequence obtained by reversing an order of elements in the sequence is 654321.

Operation (3): Multiply an even-numbered or odd-numbered element in non-zero elements by −1.

As shown in Table 15 below, Table 15 provides a comparison result between PAPR median values (a third column) of a BPSK (a modulation mode) data part and maximum PAPR values (a second column) in PAPRs that are of the sequence 2xEHT_LTF_320M described in (38) and a plurality of corresponding rotated sequences and that are on different single-RUs, various combined RUs, and entire bandwidth.

For example, an RU26 is used as an example. An 80 MHz sequence includes 36 RU26s, that is, 36 PAPRs. One sequence may be rotated to obtain four sequences. Therefore, 36*4=144 PAPRs may be obtained by considering rotated sequences. A maximum value of the 144 PAPRs is 5.76. 2xEHT_LTF_160M, 2xEHT_LTF_240M, and 2xEHT_LTF_320M are obtained based on the sequence 2xEHT_LTF_80M. PAPR values of 2xEHT_LTF_160M, 2xEHT_LTF_240M, and 2xEHT_LTF_320M on the RU26s are the same as the PAPR values of 2xEHT_LTF_80M on the RU26s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 15 that values in the second column are all less than values in the third column. That is, maximum PAPR values on different single-RUs, various combined RUs, and entire bandwidth under considered influence of phase rotation are all less than corresponding PAPR median values of a BPSK data part. Therefore, it is verified that the LTF sequences with 80 MHz bandwidth, 160 MHz bandwidth, 240 MHz bandwidth, and 320 MHz bandwidth in the 2x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 15

Comparison between PAPR maximum values of 2x EHT LTF sequences on a single RU, a combined RU, and entire bandwidth under considered influence of a plurality of P-matrices and PAPR median values of a BPSK data part

| RU Size | Max PAPR (dB) | Median PAPR of BPSK Data (dB) |
|---|---|---|
| RU26 | 5.76 | 5.89 |
| RU52 | 4.98 | 6.71 |
| RU52 + RU26 | 6.23 | 7.10 |
| RU106 | 4.55 | 7.29 |
| RU106 + RU26 | 5.45 | 7.44 |
| RU242 | 5.09 | 7.94 |
| RU484 | 5.53 | 8.44 |
| RU484 + RU242 | 7.61 | 8.83 |
| RU996 | 5.45 | 8.84 |
| RU996 + RU484 | 7.71 | 9.17 |
| RU2*996 | 5.63 or 8.33 | 9.27 or 9.28 |
| RU2*996 + RU484 | 8.37 | 9.50 |
| RU3*996 | 7.74 | 9.54 |
| RU3*996 + RU484 | 8.19 | 9.55 |
| RU4*996 | 8.29 | 9.60 |

This embodiment of this application further provides the following LTF sequences with 80 MHz bandwidth, 160 MHz bandwidth, 240 MHz bandwidth, and 320 MHz bandwidth in the 4x mode.

(41) A possible 4x LTF sequence with 80 MHz bandwidth is denoted by 4xEHT_LTF_80M. Subcarrier numbers of the sequence 4xEHT_LTF_80M range from −500 to 500.

For example, $4xEHT\_LTF\_80M_{-500:500}$=14xEHT_LTF_partA, $0_5$, 4xEHT_LTF_partB}.

Herein, −500 to 500 are subcarrier indexes (the indexes may also be referred to as numbers), $0_5$ represents five consecutive 0s, 4xEHT_LTF_partA includes 498 elements, and 4xEHT_LTF_partB includes 498 elements.

In an example, 4xEHT_LTF_partA=
1 −1 −1 −1 1 1 −1 1 1 1 −1 −1 1 1 1
1 1 −1 1 1 1 1 1 1 1 1 1 1 −1
1 1 1 −1 −1 −1 1 −1 1 1 −1 1 −1 −1
1 1 1 −1 1 1 1 1 1 1 1 1 1 1
1 1 1 1 1 1 1 1 1 1 1 1 1 −1
1 −1 1 −1 1 1 −1 1 1 −1 1 −1 −1 −1
−1 −1 1 1 −1 1 −1 1 −1 −1 1 1 −1 −1
−1 −1 −1 1 −1 −1 1 1 −1 1 1 −1 1 −1
−1 1 1 −1 −1 1 −1 −1 −1 1 −1 1 −1 −1
−1 −1 1 1 1 1 1 1 −1 1 1 −1 −1
−1 1 −1 −1 1 1 −1 1 −1 1 1 1 −1 −1
1 −1 1 1 1 1 1 1 1 1 1 1 1 −1
−1 −1 −1 1 1 1 1 −1 −1 1 −1 −1 −1 −1
1 −1 1 −1 1 −1 −1 1 1 −1 1 1 −1 −1
1 −1 1 1 1 1 1 1 1 1 1 1 1 1
1 1 −1 −1 −1 −1 1 −1 1 −1 −1 1 1 1
1 1 1 −1 −1 1 1 −1 1 −1 1 1 1 −1
−1 1 1 1 1 1 −1 1 −1 −1 1 1 −1 −1
1 1 1 −1 1 −1 1 1 −1 −1 1 1 1 1
1 1 −1 −1 1 −1 1 −1 −1 −1 −1 1 1 1
1 1 1 1 1 1 1 1 1 1 1 −1 1 −1
−1 1 1 −1 1 1 −1 −1 1 −1 1 −1 1 −1
−1 −1 −1 1 −1 −1 1 1 1 1 −1 −1 −1 −1
1 −1 −1 1 1 1 1 1 1 1 1 1 1 −1
−1 1 1 1 −1 1 −1 1 1 −1 −1 1 −1 −1
−1 1 1 −1 −1 −1 1 1 −1 1 1 −1 1 −1
−1 1 1 1 −1 1 −1 1 −1 1 −1 −1 −1 −1
−1 −1 −1 1 1 −1 −1 1 1 −1 1 1 1 1
1 −1 −1 1 1 −1 1 −1 1 −1 −1 1 1 1
1 1 −1 1 −1 −1 1 −1 −1 1 −1 1 −1 1
−1 −1 −1 1 1 1 1 1 −1 −1 1 1 1 −1
−1 11 11 11 1 −1 1 −1 −1 −1 1
1 −1 1 −1 −1 1 −1 1 1 1 −1 −1 −1 1
−1 1 −1 1 1 1 1 1 −1 −1 1 −1 −1 −1
−1 −1 1 1 −1 −1 −1 1 −1 −1 1 1 1 −1
1 −1 1 −1 1 1 1 1}

4xEHT_LTF_partB=
{1 1 1 −1 −1 1 −1 −1 −1 1 1 1 −1 −1
1 1 1 1 1 1 1 1 1 1 1 1 −1 −1
1 1 1 1 1 −1 1 −1 1 −1 −1 −1 1 1
1 −1 1 −1 −1 1 −1 1 1 −1 −1 −1 1 −1
1 1 1 1 1 1 1 −1 −1 1 1 1 −1 −1
1 1 1 1 1 −1 −1 −1 1 −1 1 −1 1 −1
−1 1 −1 −1 1 −1 1 1 1 1 1 −1 −1 1
−1 1 −1 1 1 −1 −1 1 1 1 1 1 −1 1
1 1 1 1 1 1 1 1 1 1 1 1 1 −1
1 −1 1 −1 1 1 1 −1 −1 1 −1 1 1 −1
1 1 −1 −1 −1 1 1 −1 −1 −1 1 −1 −1 1
1 −1 1 −1 1 1 1 −1 −1 1 −1 1 −1 −1
−1 −1 −1 −1 1 −1 −1 1 −1 −1 −1 −1 1 1
1 1 −1 −1 1 −1 −1 −1 −1 1 −1 1 −1 1
−1 −1 1 1 −1 1 1 −1 −1 1 −1 1 −1 −1
1 1 1 1 1 1 1 1 1 1 1 −1 −1 −1
−1 1 −1 1 −1 −1 1 1 1 1 1 1 −1 −1
1 1 −1 1 −1 1 1 1 −1 −1 1 1 −1 −1
1 1 −1 1 −1 −1 −1 1 1 −1 −1 −1 1 −1
1 1 1 1 1 1 1 1 1 1 1 1 1 1
1 −1 1 1 1 1 −1 −1 −1 1 1 1 1 1
1 1 −1 1 1 −1 1 −1 1 1 −1 −1 1 −1
−1 1 1 −1 1 −1 1 −1 1 1 1 1 −1 1
1 −1 −1 −1 −1 1 1 1 1 −1 1 1 −1 1
1 1 1 1 1 −1 1 −1 1 1 −1 −1 −1 1
−1 1 −1 −1 1 1 −1 1 1 1 −1 −1 1 −1
1 1 1 1 1 1 1 1 1 1 −1 1 −1 1
1 1 −1 1 1 −1 −1 1 1 −1 1 −1 −1 1
−1 −1 1 1 −1 1 1 1 1 1 −1 −1 1 1
−1 1 −1 1 −1 −1 1 1 1 1 1 −1 1 −1
−1 1 −1 −1 1 −1 1 −1 1 −1 −1 −1 1 1
1 1 1 −1 −1 1 1 1 −1 −1 1 1 1 1
1 1 1 −1 1 −1 −1 −1 1 1 −1 1 −1 −1
1 −1 1 1 1 −1 −1 −1 1 −1 1 −1 1 1
1 1 1 −1 −1 1 1 1 1 1 1 1 1 1
−1 −1 1 −1 −1 1 1 1}

(42) A possible 4x LTF sequence with 160 MHz bandwidth is denoted by 4xEHT_LTF_160M. 4xEHT_LTF_160M may be constructed based on 4xEHT_LTF_partA and 4xEHT_LTF_partB described in (41), and subcarrier numbers of the sequence 4xEHT_LTF_160M range from −1012 to 1012.

For example, $4xEHT\_LTF\_160M_{-1012:1012}$= {4xEHT_LTF_partA, $0_5$, 4xEHT_LTF_partB, $0_{23}$, 4xEHT_LTF_partA, $0_5$, −4xEHT_LTF_partB}.

Herein, 4xEHT_LTF_partA and 4xEHT_LTF_partB are respectively 4xEHT_LTF_partA and 4xEHT_LTF_partB described in (41); −4xEHT_LTF_partB represents negation (multiplied by −1) of all elements in the sequence 4xEHT_LTF_partB; $0_{23}$ represents 23 consecutive 0s; and $0_5$ represents five consecutive 0s.

(43) A possible 4x LTF sequence with 320 MHz bandwidth is denoted by 4xEHT_LTF_320M. 4xEHT_LTF_320M is constructed based on 4xEHT_LTF_160M described in (42) or based on 4xEHT_LTF_partA, $0_5$, 4xEHT_LTF_partB described in (41), and subcarrier numbers of the sequence 4xEHT_LTF_320M range from −2036 to 2036.

For example, $4xEHT\_LTF\_320M_{-2036:2036}$= {$4xEHT\_LTF\_160M_{-1012:1012}$, $0_{23}$, $4xEHT\_LTF\_80M_{-500:500}$, $0_{23}$, −4xEHT_LTF_partA, $0_5$, 4xEHT_LTF_partB}.

Herein, $4xEHT\_LTF\_160M_{-1012:1012}$ is $4xEHT\_LTF\_160M_{-1012:1012}$ in (42); 4xEHT_LTF_partA and 4xEHT_LTF_partB are 4xEHT_LTF_partA and 4xEHT_LTF_partB described in (41); −4xEHT_LTF_partA represents negation (that is, multiplied by −1) of all elements in the sequence 4xEHT_LTF_partA; $0_{23}$ represents 23 consecutive 0s; and $0_5$ represents five consecutive 0s.

(44) A possible 4x LTF sequence with 240 MHz bandwidth is denoted by 4xEHT_LTF_240M. 4xEHT_LTF_240M is constructed based on 4xEHT_LTF_160M described in (42) and 4xEHT_LTF_80M described in (41). For example, when an 80 MHz channel in a 320 MHz channel is missing, a 240 MHz channel is formed, and the formed 240 MHz channel may be continuous or discontinuous in frequency domain. A punctured 4x EHT LTF sequence corresponding to 320 MHz bandwidth may be used as a sequence with 240 MHz bandwidth. Subcarrier numbers of the sequence 4xEHT_LTF_240M range from −1524 to 1524.

For example, $4xEHT\_LTF\_240M_{-1524:1524}$= {$4xEHT\_LTF\_160M_{-1012:1012}$, $0_{23}$, $4xEHT\_LTF\_80M_{-500:500}$}.

4xEHT_LTF_80M$_{-500:500}$ is 4xEHT_LTF_80M$_{-500:500}$ in (41); 4xEHT_LTF_160M$_{-1012:1012}$ is 4xEHT_LTF_160M$_{-1012:1012}$ in (42); and $0_{23}$ represents 23 consecutive 0s.

4xEHT_LTF_240M$_{-1524:1524}$=
{4xEHT_LTF_partA, $0_5$, −4xEHT_LTF_partB, $0_{23}$, 4xEHT_LTF_80M$_{-500:500}$, $0_{23}$, −4xEHT_LTF_partA, $0_5$, 4xEHT_LTF_partB}.

Herein, 4xEHT_LTF_80M$_{-500:500}$, 4xEHT_LTF_partA, and 4xEHT_LTF_partB are 4xEHT_LTF_80M$_{-500:500}$, 4xEHT_LTF_partA, and 4xEHT_LTF_partB in (41); $0_5$ represents five consecutive 0s; $0_{23}$ represents 23 consecutive 0s; and −4xEHT_LTF_partA and −4xEHT_LTF_partB respectively represent negation (that is, multiplied by −1) of all elements in the sequences 4xEHT_LTF_partA and 4xEHT_LTF_partB.

(45) Sequences obtained by performing one or more of the following operations on the 4x LTF sequences with various bandwidth described in (41) to (44), for example, 4xEHT_LTF_80M$_{-500:500}$, 4xEHT_LTF_160M$_{-1012:1012}$, 4xEHT_LTF_240M$_{-1524:1524}$, and 4xEHT_LTF_320M$_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence.

Operation (3): Multiply an element at an even-numbered or odd-numbered position in a sequence by −1.

As shown in Table 16 below, Table 16 provides a comparison result between PAPR median values (a third column) of a BPSK (a modulation mode) data part and maximum PAPR values (a second column) in PAPRs that are of the sequence 4xEHT_LTF_320M described in (43) and a plurality of corresponding rotated sequences and that are on different single-RUs, various combined RUs, and entire bandwidth.

For example, an RU52 is used as an example. An 80 MHz sequence includes 16 RU52s, that is, 16 PAPRs. One sequence may be rotated to obtain four sequences. Therefore, 16*4=64 PAPRs may be obtained by considering rotated sequences. A maximum value of the 64 PAPRs is 4.62. 4xEHT_LTF_160M, 4xEHT_LTF_240M, and 4xEHT_LTF_320M are obtained based on the sequence 4xEHT_LTF_80M. PAPR values of 4xEHT_LTF_160M, 4xEHT_LTF_240M, and 4xEHT_LTF_320M on the RU52s are the same as the PAPR values of 4xEHT_LTF_80M on the RU52s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 16 that values in the second column are all less than values in the third column. That is, most of maximum PAPR values on different single-RUs, various combined RUs, and entire bandwidth under considered influence of phase rotation are less than corresponding PAPR median values of a BPSK data part. In addition, PAPRs are particularly low for important RUs such as RU4*996, RU2*996, and RU996. Therefore, it is verified that the LTF sequences with 80 MHz bandwidth, 160 MHz bandwidth, 240 MHz bandwidth, and 320 MHz bandwidth in the 4x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 16

Comparison between PAPR maximum values of 4x EHT LTF sequences on a single RU, a combined RU, and entire bandwidth under considered influence of a plurality of P-matrices and PAPR median values of a BPSK data part

| RU Size | Max PAPR | Median PAPR of BPSK Data |
|---|---|---|
| RU26 | 4.17 | 5.89 |
| RU52 | 4.62 | 6.71 |
| RU52 + RU26 | 5.37 | 7.10 |
| RU106 | 4.98 | 7.29 |
| RU106 + RU26 | 5.72 | 7.44 |
| RU242 | 5.45 | 7.94 |
| RU484 | 5.79 | 8.44 |
| RU484 + RU242 | 7.95 | 8.83 |
| RU996 | 5.80 | 8.84 |
| RU996 + RU484 | 8.00 | 9.17 |
| RU2*996 | 6.03 | 9.27 or 9.28 |
| RU2*996 + RU484 | 9.25 | 9.50 |
| RU3*996 | 8.02 | 9.54 |
| RU3*996 + RU484 | 8.17 | 9.55 |
| RU4*996 | 6.07 | 9.60 |

(46) A possible 4x LTF sequence with 80 MHz bandwidth is denoted by 4xEHT_LTF_80M. Subcarrier numbers of the sequence 4xEHT_LTF_80M range from −500 to 500.

For example, 4xEHT_LTF_80M$_{-500:500}$={4xEHT_LTF_partA, $0_5$, 4xEHT_LTF_partB}.

Herein, −500 to 500 are subcarrier indexes (the indexes may also be referred to as numbers), $0_5$ represents five consecutive 0s, 4xEHT_LTF_partA includes 498 elements, and 4xEHT_LTF_partB includes 498 elements.

In an example, 4xEHT_LTF_partA=
{1 −1 −1 −1 −1 1 −1 −1 1 −1 −1 −1 1 1
−1 −1 −1 1 −1 −1 1 −1 1 1 1 −1 1 −1
1 −1 −1 −1 −1 1 1 1 1 1 −1 −1 1 −1
1 −1 −1 −1 1 1 −1 −1 1 −1 −1 −1 1 1
1 −1 −1 1 1 −1 −1 1 −1 1 1 −1 1 −1
1 1 1 −1 1 −1 1 1 1 1 1 1 −1 −1
−1 1 −1 1 −1 −1 −1 1 −1 −1 1 1 1 1
1 1 −1 1 −1 1 1 −1 1 −1 1 −1 1 −1
1 −1 −1 1 1 1 1 1 1 1 1 1 1 1
−1 1 −1 −1 1 −1 −1 1 1 1 −1 1 −1 −1
−1 1 1 1 −1 1 1 −1 −1 1 −1 −1 −1 1
1 1 1 −1 1 1 1 1 1 1 −1 1 −1 −1
1 −1 1 −1 −1 1 1 1 1 1 −1 1 1 −1
−1 1 1 1 −1 1 1 −1 1 1 −1 −1 1 1
−1 −1 −1 −1 1 1 1 1 1 −1 1 1 1 1
1 −1 1 −1 1 1 1 1 1 1 1 1 1 1
−1 −1 −1 1 1 −1 1 1 1 1 1 1 1 1
1 1 1 1 −1 1 −1 −1 1 1 −1 −1 −1 1
1 1 1 1 −1 1 −1 1 −1 −1 1 1 1 −1
1 1 1 1 1 −1 1 1 −1 1 −1 1 −1 −1
−1 −1 −1 1 −1 −1 −1 −1 −1 1 1 1 1 −1
−1 1 1 −1 −1 1 −1 −1 1 −1 −1 −1 1 1
−1 −1 1 −1 −1 −1 −1 −1 1 1 −1 1 −1 1
1 −1 1 −1 −1 −1 −1 −1 −1 1 −1 −1 −1 −1
1 1 1 −1 1 1 −1 −1 1 −1 −1 −1 1 1
1 −1 1 −1 1 −1 −1 −1 1 −1 1 −1 1 −1
−1 −1 1 −1 −1 1 −1 1 1 −1 −1 −1 1 1

−1 −1 −1 −1 1 −1 1 1 −1 1 −1 1 1 1
1 1 1 −1 −1 1 −1 −1 −1 1 −1 1 −1 −1
−1 1 1 1 1 1 1 −1 1 −1 1 1 1 −1
1 −1 1 1 −1 1 −1 −1 1 1 −1 −1 1 1
1 −1 −1 −1 1 −1 −1 1 1 −1 −1 −1 1 −1
1 −1 −1 1 1 1 1 1 −1 −1 −1 −1 1 −1
1 −1 1 1 1 −1 1 −1 −1 1 −1 −1 −1 1
1 −1 −1 −1 1 −1 −1 1 −1 −1 −1 −1 1 −1
1 1 −1 −1 −1 1 −1 −1}

4xEHT_LTF_partB=
{−1 −1 1 −1 1 1 1 1 1 1 −1 −1 −1 −1
1 −1 −1 1 −1 −1 −1 1 1 −1 −1 −1 1 −1
−1 1 −1 1 1 1 −1 1 −1 1 −1 −1 −1 −1
1 1 1 1 1 −1 −1 1 −1 1 −1 −1 −1 1
1 −1 −1 1 −1 −1 −1 1 1 1 −1 −1 1 1
−1 −1 1 −1 1 1 −1 1 −1 1 1 1 −1 1
−1 1 1 1 1 1 1 −1 −1 −1 1 −1 1 −1
−1 −1 1 −1 −1 1 1 1 1 1 1 −1 1 −1
1 1 −1 1 −1 −1 −1 −1 1 1 −1 −1 −1 1
1 −1 1 −1 −1 1 −1 −1 −1 1 −1 1 −1 1
−1 −1 −1 1 −1 1 −1 1 1 1 −1 −1 −1 1
−1 −1 1 1 −1 1 1 1 −1 −1 −1 −1 1 −1
−1 −1 −1 −1 −1 1 −1 1 1 −1 1 −1 1 1
−1 −1 −1 −1 −1 1 −1 −1 1 1 −1 −1 −1 1
−1 −1 1 −1 −1 1 1 −1 −1 1 1 1 1 −1
−1 −1 −1 −1 1 −1 −1 −1 −1 −1 1 −1 1 −1
1 1 −1 1 1 1 1 1 −1 1 1 1 −1 −1
1 −1 1 −1 1 1 1 1 1 −1 −1 −1 1 1
−1 −1 −1 −1 −1 −1 −1 −1 1 1 1 1 1 −1
1 −1 1 −1 −1 1 1 1 −1 1 1 1 1 1
−1 1 1 −1 1 −1 1 1 1 1 1 1 1 1
−1 −1 −1 −1 1 1 1 1 −1 −1 1 1 −1 −1
1 −1 −1 1 −1 −1 −1 1 1 −1 −1 1 −1 −1
−1 −1 −1 1 1 −1 1 −1 1 1 −1 1 −1 −1
−1 −1 −1 −1 1 −1 −1 −1 −1 1 1 1 −1 1
1 −1 −1 1 −1 −1 −1 1 1 1 −1 1 −1 −1
−1 1 1 −1 1 1 −1 1 1 1 1 1 1 1
1 −1 −1 −1 −1 1 1 −1 1 −1 1 −1 1 −1
1 −1 −1 1 1 1 1 1 1 1 1 1 1 1
−1 1 1 1 −1 1 −1 1 1 1 −1 −1 −1 −1
−1 −1 1 −1 1 −1 −1 −1 1 −1 1 −1 −1 1
−1 1 1 −1 −1 1 1 −1 −1 −1 1 1 1 −1
1 1 −1 −1 1 1 1 −1 1 −1 1 1 −1 −1
−1 −1 −1 1 1 1 1 −1 1 −1 1 −1 −1 −1
1 −1 1 1 −1 1 1 1 −1 −1 1 1 1 −1
1 1 −1 1 1 1 1 −1}

(47) A possible 4x LTF sequence with 160 MHz bandwidth is denoted by 4xEHT_LTF_160M. 4xEHT_LTF_160M may be constructed based on 4xEHT_LTF_partA and 4xEHT_LTF_partB described in (46), and subcarrier numbers of the sequence 4xEHT_LTF_160M range from −1012 to 1012.

For example, 4xEHT_LTF_160M$_{-1012:1012}$=
{4xEHT_LTF_partA, $0_5$, 4xEHT_LTF_partB, $0_{23}$, 4xEHT_LTF_partA, $0_5$, −4xEHT_LTF_partB}.

Herein, 4xEHT_LTF_partA and 4xEHT_LTF_partB are respectively 4xEHT_LTF_partA and 4xEHT_LTF_partB described in (46); −4xEHT_LTF_partB represents negation (multiplied by −1) of all elements in the sequence 4xEHT_LTF_partB; $0_{23}$ represents 23 consecutive 0s; and $0_5$ represents five consecutive 0s.

(48) A possible 4x LTF sequence with 320 MHz bandwidth is denoted by 4xEHT_LTF_320M. 4xEHT_LTF_320M is constructed based on 4xEHT_LTF_160M described in (47), and subcarrier numbers of the sequence 4xEHT_LTF_320M range from −2036 to 2036.

For example, 4xEHT_LTF_320M$_{-2036:2036}$= 14xEHT_LTF_160M$_{-1012:1012}$, $0_{23}$, −4xEHT_LTF_160M$_{-1012:1012}$}.

Herein, 4xEHT_LTF_160M$_{-1012:1012}$ is 4xEHT_LTF_160M$_{-1012:1012}$ in (47); −4xEHT_LTF_160M$_{-1012:1012}$ represents negation (that is, multiplied by −1) of all elements in the sequence 4xEHT_LTF_160M$_{-1012:1012}$; and $0_{23}$ represents 23 consecutive 0s.

(49) A possible 4x LTF sequence with 240 MHz bandwidth is denoted by 4xEHT_LTF_240M. 4xEHT_LTF_240M is constructed based on 4xEHT_LTF_160M described in (47) and 4xEHT_LTF_80M described in (46), or based on −4xEHT_LTF_partA, $0_5$, 4xEHT_LTF_partB described in (46). For example, when an 80 MHz channel in a 320 MHz channel is missing, a 240 MHz channel is formed, and the formed 240 MHz channel may be continuous or discontinuous in frequency domain. A punctured 4x EHT LTF sequence corresponding to 320 MHz bandwidth may be used as a sequence with 240 MHz bandwidth. Subcarrier numbers of the sequence 4xEHT_LTF_240M range from −1524 to 1524.

For example, 4xEHT_LTF_240M$_{-1524:1524}$=
{4xEHT_LTF_160M$_{-11112}$:m12, $0_{23}$, −4xEHT_LTF_80M$_{-500:500}$}.

Herein, 4xEHT_LTF_160M$_{-1012:1012}$ is 4xEHT_LTF_160M$_{-1012:1012}$ in (47); 4xEHT_LTF_80M$_{-500:500}$ is 4xEHT_LTF_80M$_{-500:500}$ in (46); −4xEHT_LTF_80M$_{-500:500}$ represents negation (that is, multiplied by −1) of all elements in the sequence 4xEHT_LTF_80M$_{-500:500}$.

Alternatively, 4xEHT_LTF_240M$_{-1524:1524}$=
{−4xEHT_LTF_partA, $0_5$, 4xEHT_LTF_partB, $0_{23}$, 4xEHT_LTF_160M$_{-1012:1012}$}.

Herein, 4xEHT_LTF_partA and 4xEHT_LTF_partB are 4xEHT_LTF_partA and 4xEHT_LTF_partB in (46); 4xEHT_LTF_160M$_{-1012:1012}$ is 4xEHT_LTF_160M$_{-1012:1012}$ in (47); −4xEHT_LTF_partA represents negation (that is, multiplied by −1) of all elements in the sequence 4xEHT_LTF_partA; $0_{23}$ represents 23 consecutive 0s; and $0_5$ represents five consecutive 0s.

(50) Sequences obtained by performing one or more of the following operations on the 4x LTF sequences with various bandwidth described in (46) to (49), for example, 4xEHT_LTF_80M$_{-500:500}$, 4xEHT_LTF_160M$_{-1012:1012}$, 4xEHT_LTF_240M$_{-1524:1524}$, and 4xEHT_LTF_320M$_{-2036:2036}$, are also sequences to be protected in this application. After the following operations, PAPR values of these sequences on a single RU, on a combined RU, on entire bandwidth, and in a considered multi-stream scenario do not change.

Operation (1): Multiply elements in a sequence by −1.

Operation (2): Reverse an order of elements in a sequence.

Operation (3): Multiply an element at an even-numbered or odd-numbered position in a sequence by −1.

As shown in Table 17 below, Table 17 provides a comparison result between PAPR median values (a third column) of a BPSK (a modulation mode) data part and maximum PAPR values (a second column) in PAPRs that are of the sequence 4xEHT_LTF_320M described in (48) and a plurality of corresponding rotated sequences and that are on different single-RUs, various combined RUs, and entire bandwidth.

For example, an RU52 is used as an example. An 80 MHz sequence includes 16 RU52s, that is, 16 PAPRs. One sequence may be rotated to obtain four sequences. Therefore, 16*4=64 PAPRs may be obtained by considering rotated sequences. A maximum value of the 64 PAPRs is 4.64. 4xEHT_LTF_160M, 4xEHT_LTF_240M, and 4xEHT_LTF_320M are obtained based on the sequence 4xEHT_LTF_80M. PAPR values of 4xEHT_LTF_160M, 4xEHT_LTF_240M, and 4xEHT_LTF_320M on the RU52s are the same as the PAPR values of 4xEHT_LTF_80M on the RU52s.

It should be noted that there are two maximum PAPR values corresponding to an RU2*996. This is because a 160 MHz channel may include two continuous 80 MHz channels, or may include two discontinuous 80 MHz channels. Therefore, two maximum PAPR values are obtained, and two PAPR median values of a data part are also obtained.

It may be learned from Table 17 that most of values in the second column are less than values in the third column. That is, most of maximum PAPR values on different single-RUs, various combined RUs, and entire bandwidth under considered influence of phase rotation are less than corresponding PAPR median values of a BPSK data part. In addition, PAPRs are particularly low for important RUs such as RU4*996, RU2*996, and RU996. Therefore, it is verified that the LTF sequences with 80 MHz bandwidth, 160 MHz bandwidth, 240 MHz bandwidth, and 320 MHz bandwidth in the 4x mode that are generated in this application have relatively low PAPR values on a single RU, relatively low PAPR values on a combined RU, and relatively low PAPR values on entire bandwidth. In addition, a multi-stream scenario is also considered, and rotated sequences obtained after phase rotation is performed on these sequences have relatively low PAPR values on a single RU, relatively low PAPR values on a combined RU, and relatively low PAPR values on entire bandwidth.

TABLE 17

Comparison between PAPR maximum values of 4x EHT LTF sequences on a single RU, a combined RU, and entire bandwidth under considered influence of a plurality of P-matrices and PAPR median values of a BPSK data part

| RU Size | Max PAPR | Median PAPR of BPSK Data |
|---|---|---|
| RU26 | 4.20 | 5.89 |
| RU52 | 4.64 | 6.71 |
| RU52 + RU26 | 4.90 | 7.10 |
| RU106 | 5.42 | 7.29 |
| RU106 + RU26 | 5.76 | 7.44 |
| RU242 | 5.42 | 7.94 |
| RU484 | 5.71 | 8.44 |
| RU484 + RU242 | 7.85 | 8.83 |
| RU996 | 5.89 | 8.84 |
| RU996 + RU484 | 7.90 | 9.17 |
| RU2*996 | 6.17 | 9.27 or 9.28 |
| RU2*996 + RU484 | 8.47 | 9.50 |
| RU3*996 | 8.15 | 9.54 |
| RU3*996 + RU484 | 8.34 | 9.55 |
| RU4*996 | 8.44 | 9.60 |

The foregoing describes the method for transmitting a PPDU in the embodiments of this application. The following describes an apparatus for transmitting a PPDU in the embodiments of this application. The apparatus for transmitting a PPDU in the embodiments of this application includes an apparatus for transmitting a PPDU and applied to a transmit end and an apparatus for transmitting a PPDU and applied to a receive end. It should be understood that the apparatus for transmitting a PPDU and applied to a transmit end is the first communications device in the foregoing method, and has any function of the first communications device in the foregoing method; and the apparatus for transmitting a physical layer protocol data unit and applied to a receive end is the second communications device in the foregoing method, and has any function of the second communications device in the foregoing method.

In the embodiments of this application, the communications device may be divided into functional units based on the foregoing method example. For example, each functional unit may be obtained through division based on each corresponding function, or two or more functions may be integrated into one processing unit. The integrated unit may be implemented in a form of hardware, or may be implemented in a form of a software functional unit. It should be noted that in the embodiments of this application, division into the units is an example and is merely logical function division, and may be other division in an actual implementation.

Figure 9:
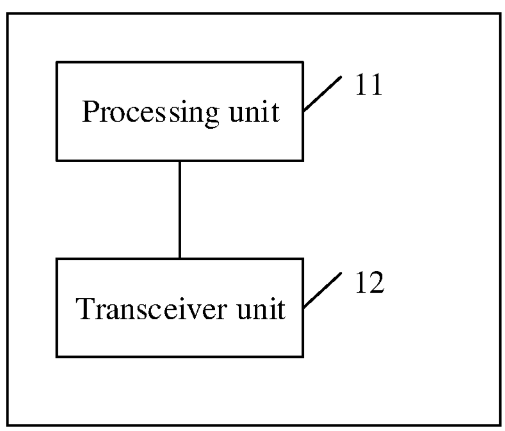
FIG. 9 is a schematic diagram of a communications apparatus applicable to an embodiment of this application.

FIG. 9 is a schematic diagram of a structure of an apparatus for transmitting a PPDU and applied to a transmit end according to an embodiment of this application. The apparatus includes a processing unit 11 and a transceiver unit 12.

The processing unit 11 is configured to generate a physical layer protocol data unit PPDU, where the PPDU includes an LTF sequence.

The transceiver unit 12 is configured to send the PPDU.

Optionally, the LTF sequence included in the PPDU may be any LTF sequence provided in (1) to (50).

The apparatus for transmitting a PPDU, applied to a transmit end, and provided in this embodiment of this application is the first communications device in the foregoing method, and has any function of the first communications device in the foregoing method. For specific details, refer to the foregoing method. Details are not described herein.

Figure 10:
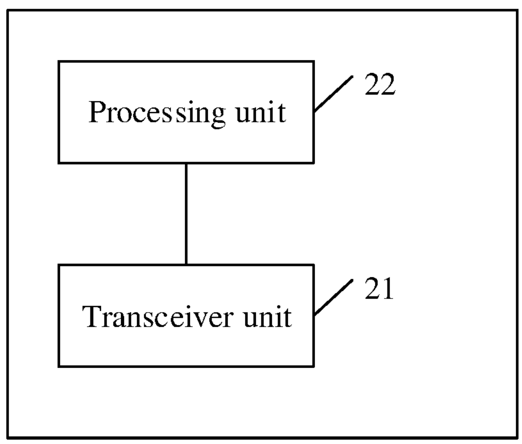
FIG. 10 is a schematic diagram of a communications apparatus applicable to an embodiment of this application.

FIG. 10 is a schematic diagram of a structure of an apparatus for transmitting a PPDU and applied to a receive end according to an embodiment of this application. The apparatus includes a transceiver unit 21 and a processing unit 22.

The transceiver unit 21 is configured to receive a PPDU, where the PPDU includes an LTF sequence.

The processing unit 22 is configured to parse the PPDU to obtain the LTF sequence.

Optionally, the LTF sequence included in the PPDU may be any LTF sequence provided in (1) to (50).

The apparatus for transmitting a PPDU, applied to a receive end, and provided in this embodiment of this application is the second communications device in the foregoing method, and has any function of the second communications device in the foregoing method. For specific details, refer to the foregoing method. Details are not described herein.

The foregoing describes the apparatus for transmitting a PPDU and applied to a transmit end and the apparatus for transmitting a PPDU and applied to a receive end in the embodiments of this application. The following describes possible product forms of the apparatus for transmitting a PPDU and applied to a transmit end and the apparatus for transmitting a PPDU and applied to a receive end. It should be understood that any form of product having the features of the apparatus for transmitting a PPDU and applied to a transmit end in FIG. 9 and any form of product having the features of the apparatus for transmitting a PPDU and applied to a receive end in FIG. 10 fall within the protection scope of this application. It should be further understood that the following description is merely an example, and does not limit a product form of the apparatus for transmitting a PPDU and applied to a transmit end and a product form of the apparatus for transmitting a physical layer protocol data unit and applied to a receive end in the embodiments of this application.

In a possible product form, the apparatus for transmitting a PPDU and applied to a transmit end and the apparatus for transmitting a PPDU and applied to a receive end in the embodiments of this application may be implemented by using a general bus architecture.

The apparatus for transmitting a PPDU and applied to a transmit end includes a processor and a transceiver that is internally connected to the processor for communication. The processor is configured to generate a PPDU, where the PPDU includes an LTF sequence. The transceiver is configured to send the PPDU. Optionally, the apparatus for transmitting a PPDU and applied to a transmit end may further include a memory. The memory is configured to store instructions executed by the processor. Optionally, the LTF sequence included in the PPDU may be any LTF sequence provided in (1) to (50).

The apparatus for transmitting a PPDU and applied to a receive end includes a processor and a transceiver that is internally connected to the processor for communication. The transceiver is configured to receive a PPDU. The processor is configured to parse the received PPDU to obtain an LTF sequence included in the PPDU. Optionally, the apparatus for transmitting a PPDU and applied to a receive end may further include a memory. The memory is configured to store instructions executed by the processor. Optionally, the LTF sequence included in the PPDU may be any LTF sequence provided in (1) to (50).

In a possible product form, the apparatus for transmitting a PPDU and applied to a transmit end and the apparatus for transmitting a PPDU and applied to a receive end in the embodiments of this application may be implemented by using a general-purpose processor.

A general-purpose processor that implements the apparatus for transmitting a PPDU and applied to a transmit end includes a processing circuit and an input/output interface that is internally connected to the processing circuit for communication. The processing circuit is configured to generate a PPDU, where the PPDU includes an LTF sequence. The input/output interface is configured to send the PPDU. Optionally, the general-purpose processor may further include a storage medium. The storage medium is configured to store instructions executed by the processing circuit. Optionally, the LTF sequence included in the PPDU may be any LTF sequence provided in (1) to (50).

A general-purpose processor that implements the apparatus for transmitting a PPDU and applied to a receive end includes a processing circuit and an input/output interface that is internally connected to the processing circuit for communication. The input/output interface is configured to receive a PPDU, where the PPDU includes an LTF sequence. The processing circuit is configured to parse the PPDU PPDU to obtain the LTF sequence included in the PPDU. Optionally, the general-purpose processor may further include a storage medium. The storage medium is configured to store instructions executed by the processing circuit. Optionally, the LTF sequence included in the PPDU may be any LTF sequence provided in (1) to (50).

In a possible product form, the apparatus for transmitting a PPDU and applied to a transmit end and the apparatus for transmitting a PPDU and applied to a receive end in the embodiments of this application may alternatively be implemented by using the following components: one or more FPGAs (field programmable gate arrays), PLDs (programmable logic devices), controllers, state machines, gate logic, discrete hardware components, any other suitable circuits, or any combination of circuits that can perform various functions described in this application.

It should be understood that the apparatus for transmitting a PPDU and applied to a transmit end and the apparatus for transmitting a PPDU and applied to a receive end in the foregoing product forms respectively have any functions of the first communications device and the second communications device in the foregoing method embodiment. Details are not described herein.

An embodiment of this application further provides a computer-readable storage medium. The computer-readable storage medium stores instructions, and when the instructions are run on a computer, the computer is enabled to perform the foregoing method for transmitting a PPDU.

An embodiment of this application further provides a computer program product. When the computer program product is run on a computer, the computer is enabled to perform the foregoing method for transmitting a PPDU.

An embodiment of this application further provides a wireless communications system, including a first communications device (for example, an AP) and a second communications device (for example, a STA). The first communications device and the second communications device may perform the foregoing method for transmitting a PPDU.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions in this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. Similar to "A and/or B", "at least one of A and B" describes an association relationship for describing associated objects and represents that three relationships may exist. For example, at least one of A and B may represent the following three cases: Only A exists, both A and B exist, and only B exists.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Clearly, persons skilled in the art can make various modifications and variations to the embodiments of this application without departing from the spirit and scope of the embodiments of this application. This application is also intended to cover these modifications and variations to embodiments of this application provided that the modifications and variations fall within the scope of protection defined by the following claims and their equivalent technologies.

What is claimed is:

1. A method for transmitting a physical layer protocol data unit, comprising:

generating, a physical layer protocol data unit (PPDU), wherein the PPDU comprises a long training field (LTF) carrying a 320 MHz 4x LTF sequence $4xEHT\_LTF\_320M_{-2036:2036}$, wherein:

$4xEHT\_LTF\_320M_{-2036:2036}$={4xEHT_LTF_partA, $0_5$, 4xEHT_LTF_partB, $0_{23}$ 4xEHT_LTF_partA, $0_5$, −4xEHT_LTF_partB, $0_{23}$, −4xEHT_LTF_partA, $0_5$, −4xEHT_LTF_partB, $0_{23}$, −4xEHT_LTF_partA, $0_5$, 4xEHT_LTF_partB}, wherein 4xEHT_LTF_partA is a sequence segment including multiples values of +1 and −1, 4xEHT_LTF_partB is a sequence segment including multiple values of +1 and −1, $0_5$ represents 5 consecutive 0s, $0_{23}$ represents 23 consecutive 0s; and sending the PPDU.

2. The method according to claim 1, wherein 4xEHT_LTF_partA includes 498 elements, and 4xEHT_LTF_partB includes 498 elements.

3. The method according to claim 1, wherein

4xEHT_LTF_partA=

{1 −1 −1 −1 −1 1 −1 −1 1 −1 −1 −1 1
−1 −1 −1 1 −1 −1 1 −1 1 1 1 −1 1 −1
1 −1 −1 −1 −1 1 1 1 1 1 −1 −1 1 −1
1 −1 −1 −1 1 1 −1 −1 1 −1 −1 −1 1 1
1 −1 −1 1 1 −1 −1 1 −1 1 1 −1 1 −1
1 1 1 −1 1 −1 1 1 1 1 1 1 −1 −1
−1 1 −1 1 −1 −1 −1 1 −1 −1 1 1 1 1
1 1 −1 1 −1 1 1 −1 1 −1 1 −1 1 −1

1 −1 −1 1 1 1 1 −1 −1 −1 −1 −1 −1 −1
−1 1 −1 −1 1 −1 −1 1 1 1 −1 1 −1 −1
−1 1 1 1 −1 1 1 −1 −1 1 −1 −1 −1 1
1 1 1 −1 1 1 1 1 1 1 −1 1 −1 −1
1 −1 1 −1 −1 1 1 1 1 1 −1 1 1 −1
−1 1 1 1 −1 1 1 −1 1 1 −1 −1 1 1
−1 −1 −1 −1 1 1 1 1 1 −1 1 1 1 1
1 −1 1 −1 1 −1 −1 1 −1 −1 −1 −1 −1 1
−1 −1 −1 1 1 −1 1 −1 1 −1 −1 −1 −1 −1
1 1 1 1 −1 1 −1 −1 1 1 −1 −1 −1 1
1 1 1 1 −1 1 −1 1 −1 −1 1 1 1 −1
1 1 1 1 1 −1 1 1 −1 1 −1 1 −1 −1
−1 −1 −1 1 −1 −1 −1 −1 −1 1 1 1 1 −1
−1 1 1 −1 −1 1 −1 −1 1 −1 −1 −1 1 1
−1 −1 1 −1 −1 −1 −1 −1 1 1 −1 1 −1 1
1 −1 1 −1 −1 −1 −1 −1 −1 1 −1 −1 −1 −1
1 1 1 −1 1 1 −1 −1 1 −1 −1 −1 1 1
1 −1 1 −1 1 −1 −1 −1 1 −1 1 −1 1 −1
−1 −1 1 −1 −1 1 −1 1 1 −1 −1 −1 1 1
−1 −1 −1 −1 1 −1 1 1 −1 1 −1 1 1 1
1 1 1 −1 −1 1 −1 −1 −1 1 −1 1 −1 −1
−1 1 1 1 1 1 1 −1 1 −1 1 1 1 −1
1 −1 1 1 −1 1 −1 −1 1 1 −1 −1 1 1
1 −1 −1 −1 1 −1 −1 1 1 −1 −1 −1 1 −1
1 −1 −1 1 1 1 1 1 −1 −1 −1 −1 1 −1
1 −1 1 1 1 −1 1 −1 −1 1 −1 −1 −1 1
1 −1 −1 −1 1 −1 −1 1 −1 −1 −1 −1 1 −1
1 1 −1 −1 −1 1 −1 −1};

4xEHT_LTF_partB=
{−1 −1 1 −1 1 1 1 1 1 1 −1 −1 −1 −1
1 −1 −1 1 −1 −1 −1 1 1 −1 −1 −1 1 −1
−1 1 −1 1 1 1 −1 1 −1 1 −1 −1 −1 −1
1 1 1 1 1 −1 −1 1 −1 1 −1 −1 −1 1
1 −1 −1 1 −1 −1 −1 1 1 1 −1 −1 1 1
−1 −1 1 −1 1 1 −1 1 −1 1 1 1 −1 1
−1 1 1 1 1 1 1 −1 −1 −1 1 −1 1 −1
−1 −1 1 −1 −1 1 1 1 1 1 1 −1 1 −1
1 1 −1 1 −1 −1 −1 −1 1 1 −1 −1 −1 1
1 −1 1 −1 −1 1 −1 −1 −1 1 −1 1 −1 1
−1 −1 −1 1 −1 1 −1 1 1 1 −1 −1 −1 1
−1 −1 1 1 −1 1 1 1 −1 −1 −1 −1 1 −1
−1 −1 −1 −1 −1 1 −1 1 1 −1 1 −1 1 1
−1 −1 −1 −1 −1 1 −1 −1 1 1 −1 −1 −1 1
−1 −1 1 −1 −1 1 1 −1 −1 1 1 1 1 −1
−1 −1 −1 −1 1 −1 −1 −1 −1 −1 1 −1 1 −1
1 1 −1 1 1 1 1 1 −1 1 1 1 −1 −1
1 −1 1 −1 1 1 1 1 1 −1 −1 −1 1 1
−1 −1 −1 −1 −1 −1 −1 −1 1 1 1 1 1 −1
1 −1 1 −1 −1 1 1 1 −1 1 1 1 1 1
−1 1 1 −1 1 −1 1 −1 −1 −1 −1 −1 1 −1
−1 −1 −1 −1 1 1 1 1 −1 −1 1 1 −1 −1
1 −1 −1 1 −1 −1 −1 1 1 −1 −1 1 −1 −1
−1 −1 −1 1 1 −1 1 −1 1 1 −1 1 −1 −1
−1 −1 −1 −1 1 −1 −1 −1 −1 1 1 1 −1 1
1 −1 −1 1 −1 −1 −1 1 1 1 −1 1 −1 −1
−1 1 1 −1 1 1 −1 1 1 1 1 1 1 1
1 −1 −1 −1 −1 1 1 −1 1 −1 1 −1 1 −1
1 −1 −1 1 −1 1 −1 −1 −1 −1 −1 −1 1 1
−1 1 1 1 −1 1 −1 1 1 1 −1 −1 −1 −1
−1 −1 1 −1 1 −1 −1 −1 1 −1 1 −1 −1 1
−1 1 1 −1 −1 1 1 −1 −1 −1 1 1 1 −1
1 1 −1 −1 1 1 1 −1 1 −1 1 1 −1 −1
−1 −1 −1 1 1 1 1 −1 1 −1 1 −1 −1 −1
1 −1 1 1 −1 1 1 1 −1 −1 1 1 1 −1
1 1 −1 1 1 1 1 −1}.

4. A method for transmitting a physical layer protocol data unit, comprising:

receiving a physical layer protocol data unit (PPDU); and parsing the received PPDU to obtain a long training field (LTF) sequence carried in a long training field of the PPDU; and estimating a channel according to the obtained LTF sequence and a specified LTF sequence, wherein the specified LTF sequence is a 320 MHz 4x LTF sequence 4xEHT_LTF_320M$_{-2036:2036}$, wherein 4xEHT_LTF_320M$_{-2036:2036}$={4xEHT_LTF_160M$_{-1012:1012}$, $0_{23}$, 4xEHT_LTF_160M$_{-1012:1012}$}= {4xEHT_LTF_partA, $0_5$, 4xEHT_LTF_partB, $0_{23}$, 4xEHT_LTF_partA, $0_5$, −4xEHT_LTF_partB, $0_{23}$, −4xEHT_LTF_partA, $0_5$, −4xEHT_LTF_partB, $0_{23}$, −4xEHT_LTF_partA, $0_5$, 4xEHT_LTF_partB}, wherein 4xEHT_LTF_partA is a sequence segment including multiples values of +1 and −1, 4xEHT_LTF_partB is a sequence segment including multiples values of +1 and −1, $0_5$ represents 5 consecutive 0s, $0_{23}$ represents 23 consecutive 0s.

5. The method according to claim 4, 4xEHT_LTF_partA includes 498 elements, 4xEHT_LTF_partB includes 498 elements.

6. The method according to claim 4, wherein

4xEHT_LTF_partA=
{1 −1 −1 −1 −1 1 −1 −1 1 −1 −1 −1 1 1
−1 −1 −1 1 −1 −1 1 −1 1 1 1 −1 1 −1
1 −1 −1 −1 −1 1 1 1 1 1 −1 −1 1 −1
1 −1 −1 −1 1 1 −1 −1 1 −1 −1 −1 1 1
1 −1 −1 1 1 −1 −1 1 −1 1 1 −1 1 −1
1 1 1 −1 1 −1 1 1 1 1 1 1 −1 −1
−1 1 −1 1 −1 −1 −1 1 −1 −1 1 1 1 1
1 1 −1 1 −1 1 1 −1 1 −1 1 −1 1 −1
1 −1 −1 1 1 1 1 −1 −1 −1 −1 −1 −1 −1
−1 1 −1 −1 1 −1 −1 1 1 1 −1 1 −1 −1
−1 1 1 1 −1 1 1 −1 −1 1 −1 −1 −1 1
1 1 1 −1 1 1 1 1 1 1 −1 1 −1 −1
1 −1 1 −1 −1 1 1 1 1 1 −1 1 1 −1
−1 1 1 1 −1 1 1 −1 1 1 −1 −1 1 1
−1 −1 −1 −1 1 1 1 1 1 −1 1 1 1 1
1 −1 1 −1 1 −1 −1 1 −1 −1 −1 −1 −1 1
−1 −1 −1 1 1 −1 1 −1 1 −1 −1 −1 −1 −1
1 1 1 1 −1 1 −1 −1 1 1 −1 −1 −1 1
1 1 1 1 −1 1 −1 1 −1 −1 1 1 1 −1
1 1 1 1 1 −1 1 1 −1 1 −1 1 −1 −1
−1 −1 −1 1 −1 −1 −1 −1 −1 1 1 1 1 −1
−1 1 1 −1 −1 1 −1 −1 1 −1 −1 −1 1 1
−1 −1 1 −1 −1 −1 −1 −1 1 1 −1 1 −1 1
1 −1 1 −1 −1 −1 −1 −1 −1 1 −1 −1 −1 −1
1 1 1 −1 1 1 −1 −1 1 −1 −1 −1 1 1
1 −1 1 −1 1 −1 −1 −1 1 −1 1 −1 1 −1
−1 −1 1 −1 −1 1 −1 1 1 −1 −1 −1 1 1
−1 −1 −1 −1 1 −1 1 1 −1 1 −1 1 1 1
1 1 1 −1 −1 1 −1 −1 −1 1 −1 1 −1 −1
−1 1 1 1 1 1 1 −1 1 −1 1 1 1 −1
1 −1 1 1 −1 1 −1 −1 1 1 −1 −1 1 1
1 −1 −1 −1 1 −1 −1 1 1 −1 −1 −1 1 −1
1 −1 −1 1 1 1 1 1 −1 −1 −1 −1 1 −1
1 −1 1 1 1 −1 1 −1 −1 1 −1 −1 −1 1
1 −1 −1 −1 1 −1 −1 1 −1 −1 −1 −1 1 −1
1 1 −1 −1 −1 1 −1 −1};

4xEHT_LTF_partB=
{−1 −1 1 −1 1 1 1 1 1 1 −1 −1 −1 −1
1 −1 −1 1 −1 −1 −1 1 1 −1 −1 −1 1 −1
−1 1 −1 1 1 1 −1 1 −1 1 −1 −1 −1 −1
1 1 1 1 1 −1 −1 1 −1 1 −1 −1 −1 1

1 –1 –1 1 –1 –1 –1 1 1 1 –1 –1 1 1
–1 –1 1 –1 1 1 –1 1 –1 1 1 1 –1 1
–1 1 1 1 1 1 1 –1 –1 –1 1 –1 1 –1
–1 –1 1 –1 –1 1 1 1 1 1 1 –1 1 –1
1 1 –1 1 –1 –1 –1 –1 1 1 –1 –1 –1 1
1 –1 1 –1 –1 1 –1 –1 –1 1 –1 1 –1 1
–1 –1 –1 1 –1 1 –1 1 1 1 –1 –1 –1 1
–1 –1 1 1 –1 1 1 1 –1 –1 –1 –1 1 –1
–1 –1 –1 –1 –1 1 –1 1 1 –1 1 –1 1 1
–1 –1 –1 –1 –1 1 –1 –1 1 1 –1 –1 –1 1
–1 –1 1 –1 –1 1 1 –1 –1 1 1 1 1 –1
–1 –1 –1 –1 1 –1 –1 –1 –1 –1 1 –1 1 –1
1 1 –1 1 1 1 1 1 –1 1 1 1 –1 –1
1 –1 1 –1 1 1 1 1 1 –1 –1 –1 1 1
1 –1 –1 –1 –1 –1 –1 –1 1 1 1 1 1 –1
1 –1 1 –1 –1 1 1 1 –1 1 1 1 1 1
–1 1 1 –1 1 –1 1 –1 –1 –1 –1 –1 1 –1
–1 –1 –1 –1 1 1 1 1 –1 –1 1 1 –1 –1
1 –1 –1 1 –1 –1 –1 1 1 –1 –1 1 –1 –1
–1 –1 –1 1 1 –1 1 –1 1 1 –1 1 –1 –1
–1 –1 –1 –1 1 –1 –1 –1 –1 1 1 1 –1 1
1 –1 –1 1 –1 –1 –1 1 1 1 –1 1 –1 –1
–1 1 1 –1 1 1 –1 1 1 1 1 1 1 1
1 –1 –1 –1 –1 1 1 –1 1 –1 1 –1 1 –1
1 –1 –1 1 –1 1 –1 –1 –1 –1 –1 –1 1 1
–1 1 1 1 –1 1 –1 1 1 1 –1 –1 –1 –1
–1 –1 1 –1 1 –1 –1 –1 1 –1 1 –1 –1 1
–1 1 1 –1 –1 1 1 –1 –1 –1 1 1 1 –1
1 1 –1 –1 1 1 1 –1 1 –1 1 1 –1 –1
–1 –1 –1 1 1 1 1 –1 1 –1 1 –1 –1 –1
1 –1 1 1 –1 1 1 1 –1 –1 1 1 1 –1
1 1 –1 1 1 1 –1}.

7. An apparatus for transmitting a physical layer protocol data unit, comprising:

a processor, configured to generate a physical layer protocol data unit (PPDU), wherein the PPDU comprises a long training field (LTF) carrying a 320 MHz 4x LTF sequence $4xEHT\_LTF\_320M_{-2036:2036}$, wherein:

$4xEHT\_LTF\_320M_{-2036:2036}$={4xEHT_LTF_partA, $0_5$, 4xEHT_LTF_partB, $0_{23}$, 4xEHT_LTF_partA, $0_5$, –4xEHT_LTF_partB, $0_{23}$, –4xEHT_LTF_partA, $0_5$, –4xEHT_LTF_partB, $0_{23}$, –4xEHT_LTF_partA, $0_5$, 4xEHT_LTF_partB}, wherein 4xEHT_LTF_partA is a sequence segment including multiple values of +1 and –1, 4xEHT_LTF_partB is a sequence segment including multiple values of +1 and –1, $0_5$ represents 5 consecutive 0s, $0_{23}$ represents 23 consecutive 0s; and a transceiver, configured to send the PPDU.

8. The apparatus according to claim 7, wherein 4xEHT_LTF_partA includes 498 elements, and 4xEHT_LTF_partB includes 498 elements.

9. The apparatus according to claim 7, wherein

4xEHT_LTF_partA=

{1 –1 –1 –1 –1 1 –1 –1 1 –1 –1 –1 1
–1 –1 –1 1 –1 –1 1 –1 1 1 1 –1 1 –1
1 –1 –1 –1 –1 1 1 1 1 1 –1 –1 1 –1
1 –1 –1 –1 1 1 –1 –1 1 –1 –1 –1 1 1
1 –1 –1 1 1 –1 –1 1 –1 1 1 –1 1 –1
1 1 1 –1 1 –1 1 1 1 1 1 1 –1 –1
–1 1 –1 1 –1 –1 –1 1 –1 –1 1 1 1 1
1 1 –1 1 –1 1 1 –1 1 –1 1 –1 1 –1
1 –1 –1 1 1 1 1 –1 –1 –1 –1 –1 –1 –1
–1 1 –1 –1 1 –1 –1 1 1 1 –1 1 –1 –1
–1 1 1 1 –1 1 1 –1 –1 1 –1 –1 –1 1
1 1 1 –1 1 1 1 1 1 1 –1 1 –1 –1
1 –1 1 –1 –1 1 1 1 1 1 –1 1 1 –1
–1 1 1 1 –1 1 1 –1 1 1 –1 –1 1 1
–1 –1 –1 –1 1 1 1 1 1 –1 1 1 1 1
1 –1 1 –1 1 –1 –1 1 –1 –1 –1 –1 –1 1
–1 –1 –1 1 1 –1 1 –1 1 –1 –1 –1 –1 –1
1 1 1 1 –1 1 –1 –1 1 1 –1 –1 –1 1
1 1 1 1 –1 1 –1 1 –1 –1 1 1 1 –1
1 1 1 1 1 –1 1 1 –1 1 –1 1 –1 –1
–1 –1 –1 1 –1 –1 –1 –1 –1 1 1 1 1 –1
–1 1 1 –1 –1 1 –1 –1 1 –1 –1 –1 1 1
–1 –1 1 –1 –1 –1 –1 –1 1 1 –1 1 –1 1
1 –1 1 –1 –1 –1 –1 –1 –1 1 –1 –1 –1 –1
1 1 1 –1 1 1 –1 –1 1 –1 –1 –1 1 1
1 –1 1 –1 1 –1 –1 –1 1 –1 1 –1 1 –1
–1 –1 1 –1 –1 1 –1 1 1 –1 –1 –1 1 1
–1 –1 –1 –1 1 –1 1 1 –1 1 –1 1 1 1
1 1 1 –1 –1 1 –1 –1 –1 1 –1 1 –1 –1
–1 1 1 1 1 1 1 –1 1 –1 1 1 1 –1
1 –1 1 1 –1 1 –1 –1 1 1 –1 –1 1 1
1 –1 –1 –1 1 –1 –1 1 1 –1 –1 –1 1 –1
1 –1 –1 1 1 1 1 1 –1 –1 –1 –1 1 –1
1 –1 1 1 1 –1 1 –1 –1 1 –1 –1 –1 1
1 –1 –1 –1 1 –1 –1 1 –1 –1 –1 –1 1 –1
1 1 –1 –1 –1 1 –1 –1};

4xEHT_LTF_partB=

{–1 –1 1 –1 1 1 1 1 1 1 –1 –1 –1 –1
1 –1 –1 1 –1 –1 –1 1 1 –1 –1 –1 1 –1
–1 1 –1 1 1 1 –1 1 –1 1 –1 –1 –1 –1
1 1 1 1 1 –1 –1 1 –1 1 –1 –1 –1 1
1 –1 –1 1 –1 –1 –1 1 1 1 –1 –1 1 1
–1 –1 1 –1 1 1 –1 1 –1 1 1 1 –1 1
–1 1 1 1 1 1 1 –1 –1 –1 1 –1 1 –1
–1 –1 1 –1 –1 1 1 1 1 1 1 –1 1 –1
1 1 –1 1 –1 –1 –1 –1 1 1 –1 –1 –1 1
1 –1 1 –1 –1 1 –1 –1 –1 1 –1 1 –1 1
–1 –1 –1 1 –1 1 –1 1 1 1 –1 –1 –1 1
–1 –1 1 1 –1 1 1 1 –1 –1 –1 –1 1 –1
–1 –1 –1 –1 –1 1 –1 1 1 –1 1 –1 1 1
–1 –1 –1 –1 –1 1 –1 –1 1 1 –1 –1 –1 1
–1 –1 1 –1 –1 1 1 –1 –1 1 1 1 1 –1
–1 –1 –1 –1 1 –1 –1 –1 –1 –1 1 –1 1 –1
1 1 –1 1 1 1 1 1 –1 1 1 1 –1 –1
1–1 1 –1 1 1 1 1 1 –1 –1 –1 1 1
–1 –1 –1 –1 –1 –1 –1 –1 1 1 1 1 1 –1
1 –1 1 –1 –1 1 1 1 –1 1 1 1 1 1
–1 1 1 –1 1 –1 1 –1 –1 –1 –1 –1 1 –1
–1 –1 –1 –1 1 1 1 1 –1 –1 1 1 –1 –1
1 –1 –1 1 –1 –1 –1 1 1 –1 –1 1 –1 –1
–1 –1 –1 1 1 –1 1 –1 1 1 –1 1 –1 –1
–1 –1 –1 –1 1 –1 –1 –1 –1 1 1 1 –1 1
1 –1 –1 1 –1 –1 –1 1 1 1 –1 1 –1 –1
–1 1 1 –1 1 1 –1 1 1 1 1 1 1 1
1 –1 –1 –1 –1 1 1 –1 1 –1 1 –1 1 –1
1 –1 –1 1 –1 1 –1 –1 –1 –1 –1 –1 1 1
–1 1 1 1 –1 1 –1 1 1 1 –1 –1 –1 –1
–1 –1 1 –1 1 –1 –1 –1 1 –1 1 –1 –1 1
–1 1 1 –1 –1 1 1 –1 –1 –1 1 1 1 –1
1 1 –1 –1 1 1 1 –1 1 –1 1 1 –1 –1
–1 –1 –1 1 1 1 1 –1 1 –1 1 –1 –1 –1
1 –1 1 1 –1 1 1 1 –1 –1 1 1 1 –1
1 1 –1 1 1 1 –1}.

10. An apparatus for transmitting a physical layer protocol data unit, comprising:

a transceiver, configured to receive a physical layer protocol data unit (PPDU); and a processor, configured to parse the received PPDU to obtain a long training field (LTF) sequence carried in a long training field of the PPDU and estimate a channel according to the obtained LTF sequence and a specified LTF sequence, wherein the specified LTF sequence is a 320 MHz 4x LTF sequence $4xEHT\_LTF\_320M_{-2036:2036}$, wherein $4xEHT\_LTF\_320M_{-2036:2036}$={4xEHT_LTF_partA, $0_5$ 4xEHT_LTF_partB, $0_{23}$ 4xEHT_LTF_partA, $0_5$−4xEHT_LTF_partB, $0_{23}$−4xEHT_LTF_partA, $0_5$, −4xEHT_LTF_partB, $0_{23}$−4xEHT_LTF_partA, $0_5$ 4xEHT_LTF_partB}, wherein 4xEHT_LTF_partA is a sequence segment including multiples values of +1 and −1, 4xEHT_LTF_partB is a sequence segment including multiples values of +1 and −1, $0_5$ represents 5 consecutive 0s, $0_{23}$ represents 23 consecutive 0s.

11. The apparatus according to claim 10, wherein 4xEHT_LTF_partA includes 498 elements, and 4xEHT_LTF_partB includes 498 elements.

12. The apparatus according to claim 10, wherein

4xEHT_LTF_partA=
{1 −1 −1 −1 −1 1 −1 −1 1 −1 −1 −1 1
−1 −1 −1 1 −1 −1 1 −1 1 1 1 −1 1 −1
1 −1 −1 −1 −1 1 1 1 1 1 −1 −1 1 −1
1 −1 −1 −1 1 1 −1 −1 1 −1 −1 −1 1 1
1 −1 −1 1 1 −1 −1 1 −1 1 1 −1 1 −1
1 1 1 −1 1 −1 1 1 1 1 1 1 −1 −1
−1 1 −1 1 −1 −1 −1 1 −1 −1 1 1 1 1
1 1 −1 1 −1 1 1 −1 1 −1 1 −1 1 −1
1 −1 −1 1 1 1 1 −1 −1 −1 −1 −1 −1 −1
−1 1 −1 −1 1 −1 −1 1 1 1 −1 1 −1 −1
−1 1 1 1 −1 1 1 −1 −1 1 −1 −1 −1 1
1 1 1 −1 1 1 1 1 1 1 −1 1 −1 −1
1 −1 1 −1 −1 1 1 1 1 1 −1 1 1 −1
−1 1 1 1 −1 1 1 −1 1 1 −1 −1 1 1
−1 −1 −1 −1 1 1 1 1 1 −1 1 1 1 1
1 −1 1 −1 1 −1 −1 1 −1 −1 −1 −1 −1 1
−1 −1 −1 1 1 −1 1 −1 1 −1 −1 −1 −1 −1
1 1 1 1 −1 1 −1 −1 1 1 −1 −1 −1 1
1 1 1 1 −1 1 −1 1 −1 −1 1 1 1 −1
1 1 1 1 1 −1 1 1 −1 1 −1 1 −1 −1
−1 −1 −1 1 −1 −1 −1 −1 −1 1 1 1 1 −1
−1 1 1 −1 −1 1 −1 −1 1 −1 −1 −1 1 1
−1 −1 1 −1 −1 −1 −1 −1 1 1 −1 1 −1 1
1 −1 1 −1 −1 −1 −1 −1 −1 1 −1 −1 −1 −1
1 1 1 −1 1 1 −1 −1 1 −1 −1 −1 1 1
1 −1 1 −1 1 −1 −1 −1 1 −1 1 −1 1 −1
−1 −1 1 −1 −1 1 −1 1 1 −1 −1 −1 1 1
−1 −1 −1 −1 1 −1 1 1 −1 1 −1 1 1 1
1 1 1 −1 −1 1 −1 −1 −1 1 −1 1 −1 −1
−1 1 1 1 1 1 1 −1 1 −1 1 1 1 −1
1 −1 1 1 −1 1 −1 −1 1 1 −1 −1 1 1
1 −1 −1 −1 1 −1 −1 1 1 −1 −1 −1 1 −1
1 −1 −1 1 1 1 1 1 −1 −1 −1 −1 1 −1
1 −1 1 1 1 −1 1 −1 −1 1 −1 −1 −1 1
1 −1 −1 −1 1 −1 −1 1 −1 −1 −1 −1 1 −1
1 1 −1 −1 −1 1 −1 −1};

4xEHT_LTF_partB=
{−1 −1 1 −1 1 1 1 1 1 1 −1 −1 −1 −1
1 −1 −1 1 −1 −1 −1 1 1 −1 −1 −1 1 −1
−1 1 −1 1 1 1 −1 1 −1 1 −1 −1 −1 −1
1 1 1 1 1 −1 −1 1 −1 1 −1 −1 −1 1
1 −1 −1 1 −1 −1 −1 1 1 1 −1 −1 1 1
−1 −1 1 −1 1 1 −1 1 −1 1 1 1 −1 1
−1 1 1 1 1 1 1 −1 −1 −1 1 −1 1 −1
−1 −1 1 −1 −1 1 1 1 1 1 1 −1 1 −1
1 1 −1 1 −1 −1 −1 −1 1 1 −1 −1 −1 1
1 −1 1 −1 −1 1 −1 −1 −1 1 −1 1 −1 1
−1 −1 −1 1 −1 1 −1 1 1 1 −1 −1 −1 1
−1 −1 1 1 −1 1 1 1 −1 −1 −1 −1 1 −1
−1 −1 −1 −1 −1 1 −1 1 1 −1 1 −1 1 1
−1 −1 −1 −1 −1 1 −1 −1 1 1 −1 −1 −1 1
−1 −1 1 −1 −1 1 1 −1 −1 1 1 1 1 −1
−1 −1 −1 −1 1 −1 −1 −1 −1 −1 1 −1 1 −1
1 1 −1 1 1 1 1 1 −1 1 1 1 −1 −1
1 −1 1 −1 1 1 1 1 1 −1 −1 −1 1 1
−1 −1 −1 −1 −1 −1 −1 −1 1 1 1 1 1 −1
1 −1 1 −1 −1 1 1 1 −1 1 1 1 1 1
−1 1 1 −1 1 −1 1 −1 −1 −1 −1 −1 1 −1
−1 −1 −1 −1 1 1 1 1 −1 −1 1 1 −1 −1
1 −1 −1 1 −1 −1 −1 1 1 −1 −1 1 −1 −1
−1 −1 −1 1 1 −1 1 −1 1 1 −1 1 −1 −1
−1 −1 −1 −1 1 −1 −1 −1 −1 1 1 1 −1 1
1 −1 −1 1 −1 −1 −1 1 1 1 −1 1 −1 −1
−1 1 1 −1 1 1 −1 1 1 1 1 1 1 1
1 −1 −1 −1 −1 1 1 −1 1 −1 1 −1 1 −1
1 −1 −1 1 −1 1 −1 −1 −1 −1 −1 −1 1 1
−1 1 1 1 −1 1 −1 1 1 1 −1 −1 −1 −1
−1 −1 1 −1 1 −1 −1 −1 1 −1 1 −1 −1 1
−1 1 1 −1 −1 1 1 −1 −1 −1 1 1 1 −1
1 1 −1 −1 1 1 1 −1 1 −1 1 1 −1 −1
−1 −1 −1 1 1 1 1 −1 1 −1 1 −1 −1 −1
1 −1 1 1 −1 1 1 1 −1 −1 1 1 1 −1
1 1 −1 1 1 1 1 −1}.

* * * * *